US006992587B2

(12) United States Patent
Maeda et al.

(10) Patent No.: US 6,992,587 B2
(45) Date of Patent: Jan. 31, 2006

(54) APPARATUS AND METHOD FOR MANAGING ARTICLES

(75) Inventors: Satomi Maeda, Kanagawa (JP); Tsukasa Sako, Kanagawa (JP); Noriko Masuzawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 165 days.

(21) Appl. No.: 10/786,872

(22) Filed: Feb. 24, 2004

(65) Prior Publication Data

US 2004/0164844 A1 Aug. 26, 2004

(30) Foreign Application Priority Data

| | | | |
|---|---|---|---|
| Feb. 25, 2003 | (JP) | .............................. | 2003-047953 |
| Feb. 28, 2003 | (JP) | .............................. | 2003-054245 |
| Mar. 27, 2003 | (JP) | .............................. | 2003-088198 |
| Mar. 28, 2003 | (JP) | .............................. | 2003-090705 |

(51) Int. Cl.
*G08B 13/14* (2006.01)

(52) U.S. Cl. .................... 340/572.1; 340/505; 235/384

(58) Field of Classification Search ............ 340/572.1; 235/384

See application file for complete search history.

(56) References Cited

U.S. PATENT DOCUMENTS

| | | | | |
|---|---|---|---|---|
| 5,051,565 | A * | 9/1991 | Wolfram | 235/384 |
| 6,108,636 | A * | 8/2000 | Yap et al. | 705/5 |
| 6,158,658 | A * | 12/2000 | Barclay | 235/384 |
| 6,259,367 | B1 * | 7/2001 | Klein | 340/572.1 |
| 6,698,653 | B1 * | 3/2004 | Diamond et al. | 235/375 |
| 6,744,811 | B1 * | 6/2004 | Kantschuk | 375/222 |
| 2002/0121975 | A1 * | 9/2002 | Struble et al. | 340/571 |
| 2003/0095032 | A1 * | 5/2003 | Hoshino et al. | 340/5.92 |

FOREIGN PATENT DOCUMENTS

| | | |
|---|---|---|
| JP | 10-49756 | 2/1998 |
| JP | 2000-113077 A | 4/2000 |
| JP | 2001-39533 A | 2/2001 |
| JP | 2001-134729 A | 5/2001 |
| JP | 2002-163301 A | 6/2002 |

* cited by examiner

*Primary Examiner*—Jeffery Hofsass
*Assistant Examiner*—George A. Bugg
(74) *Attorney, Agent, or Firm*—Morgan & Finnegan, LLP

(57) ABSTRACT

To easily and correctly manage a plurality of articles, a capture device 12 captures articles to which radio tags having different IDs are attached, and the tag IDs of the radio tags of the articles are received using a tag ID reception card 10. A captured image is associated with a received tag ID and entered. A plurality of articles are managed in a group using captured images and received tag IDs.

17 Claims, 44 Drawing Sheets

8

| ID TABLE | | | |
|---|---|---|---|
| ID | NAME | GROUP | THUMBNAIL IMAGE |
| 0001 | null | null | 0003. bmp |
| 0002 | null | null | 0001. bmp |
| 0003 | GLASSES | 1 | 0002. bmp |
| 0004 | WALLET | 1 | 0002. bmp |
| ⋮ | ⋮ | ⋮ | ⋮ |

| ARTICLE LIST I | | |
|---|---|---|
| ID | ARTICLE INFORMATION | GROUP INFORMATION |
| 0001 | ARTICLE A | I |
| 0002 | ARTICLE B | I |
| 0003 | ARTICLE C | I |
| 0004 | ARTICLE D | I |
| 0005 | ARTICLE E | I |

| ARTICLE LIST II | | |
|---|---|---|
| ID | ARTICLE INFORMATION | GROUP INFORMATION |
| 0001 | ARTICLE A | II |
| 0002 | ARTICLE B | II |
| 0006 | ARTICLE F | II |
| 0007 | ARTICLE G | II |
| 0008 | ARTICLE H | II |
| 0009 | ARTICLE I | II |

FIG. 39

| NAME | CLASS | STATUS | DETECTION STATUS | TAG ID |
|---|---|---|---|---|
| WALLET | WALLET | ON | NONE | 1234 |
| NOTEBOOK | NOTEBOOK | ON | NONE | 3456 |
| CARD CASE A | CARD | CLASS ON | NONE | 5678 |
| CARD CASE B | CARD | CLASS ON | NONE | 7890 |
| KEY | KEY | ON | NONE | 9012 |
| : | : | : | : | : |

FIG. 40

| TIME | SPECIFIED DAY | CONTENTS | NECESSARY ARTICLE | NECESSARY CLASS |
|---|---|---|---|---|
| 8 : 00 | MON, TUE, WED, THU, FRI. | WORK | WALLET, NOTEBOOK, KEY | CARD |
| 10 : 00 | 2002/12/31 | PLAY WITH FRIENDS | WALLET, KEY | |
| : | : | : | : | : |

FIG. 42

| NAME | CLASS | STATUS | DETECTION STATUS | TAG ID |
|---|---|---|---|---|
| WALLET | WALLET | ON | NONE | 1234 |
| NOTEBOOK | NOTEBOOK | ON | NONE | 3456 |
| CARD CASE A | CARD | CLASS ON | NONE | 5678 |
| CARD CASE B | CARD | CLASS ON | NONE | 7890 |
| KEY | KEY | ON | NONE | 9012 |

FIG. 44

| CHECK NUMBER | CLASS |
|---|---|
| 4234 | ARTICLE A, ARTICLE B |
| 5334 | ARTICLE A, ARTICLE C |

APPARATUS AND METHOD FOR MANAGING ARTICLES

FIELD OF THE INVENTION

The present invention relates to an apparatus and method for managing articles, and more specifically to the management articles using a radio tag attached to the article.

BACKGROUND OF THE INVENTION

A method for reducing a load required for management of articles can be an article managing method for use with a radio ID reception apparatus which receives ID from a radio tag attached to an article. This article managing method is described in the Japanese Patent Laid-Open No. 10-49756. In this technology, a dedicated radio tag is generated for each article, an entering operation is performed using the radio tag without picking up an article in a package, and an entry list is switched for each destination of the article, thereby managing the article.

The Japanese Patent Laid-Open No. 2001-39533 discloses a sorting apparatus using a radio tag, and the technology of checking whether or not a plurality of collected articles have been correctly sorted in the same destinations.

Furthermore, the Japanese Patent Laid-Open No. 2000-113077 discloses the technology of managing articles by providing a radio tag for article identification and for a section storing the article.

However, in the above-mentioned technologies, a table in which ID corresponding to an article is associated with its destination and sorting section has to be input using a computer, etc., thereby requiring a laborious operation and easily causing an input mistake. Additionally, the technologies have a position condition of using each of the apparatuses in a specified place where the apparatus is mounted.

Furthermore, the Japanese Patent Laid-Open No. 2002-163301 discloses the method for using the list after dynamically changing the list by a prediction of action using a schedule, etc.

However, the technology disclosed by the Japanese Patent Laid-Open No. 2002-163301 has reduced the laborious inputting operation by dynamically generating an article to be managed based on the prediction of action of a person, but it has the disadvantage of lack of correctness because it is based on a prediction.

An article is managed by generating a management target list and appropriately referring to or checking it. Normally, a list for management of an article is generated and edited by manual input on a personal computer.

However, in generating a management target list, since a user has to input the information about each article only using a ten-key, a switch, etc., the inputting operation is complicated and inapparent. Therefore, for example, when an inventory is taken, information about a merchandise name, a display position, a priced article, ID, etc. is additionally entered and changed in a laborious operation, and a mistake is often made by an operation mistake and misunderstanding.

There is also a well-known system of identifying an article using a bar code. In this system, a bar code is applied to an article, or a bar code is printed on the package of an article. Then, an optical character reader of a cash register reads the bar code to identify the price of an article or a merchandise name, and the sales volume, the inventory, the distribution, etc. are managed based on the data.

However, in this system, it is necessary for a user to manually move each article just on the optical character reader, or to align the optical character reader with the bar code so that the bar code scanning operation can be performed. Therefore, the reading direction and the operability are restricted, and the operation efficiency is very poor. As a result, a radio tag has been used as a system for automatically identifying an article. For example, a radio tag is applied to an article or merchandise to identify the presence/absence of transmission from the radio tag to protect against a shoplifter, etc. Furthermore, for example, the Japanese Patent Laid-Open No. 2001-134729 discloses a function of preventing a conflict to identify each signal without interference among a plurality of radio tags.

However, although each signal can be identified without interference, there is no determining with ease using radio whether or not the combination of articles is appropriate. Therefore, whether or not an article and other articles are correctly prepared, whether or not there is a missing item, etc. cannot be determined using radio tags.

SUMMARY OF THE INVENTION

The present invention has been developed to solve the above-mentioned problems individually or collectively, and aims at easily and correctly managing a plurality of articles.

To attain the above-mentioned objectives, the preferred embodiments of the present invention disclose a managing apparatus for managing articles, comprising: a receiver, arranged to receive an ID of a radio tag attached to an article; a database, arranged to store an ID of a radio tag and an image of an article associated with each other; and a managing section, arranged to refer to an ID of a radio tag received in one receiving operation, and the database, and generate an article list of entered information about an article associated with the received ID.

Another objective of the present invention is to solve the disadvantage of a laborious inputting operation and an input mistake in the article management, and improve the correctness of the article management.

To attain the objective, the preferred embodiments of the present invention disclose a managing apparatus for managing articles, comprising: a receiver, arranged to receive an ID of a radio tag attached to an article; a database, arranged to store an ID of a radio tag and an image of an article associated with each other; a managing section, arranged to refer to an ID of a radio tag received in one receiving operation, and the database, and generate an article list of entered information about an article associated with the received ID; and when instructed to edit the article list, the managing section retrieves an article list containing an ID of a radio tag received by the receiver, and edits the article list based on a retrieval result.

A further objective of the present invention is to easily performing the data inputting operation and editing operation in the article management.

To attain the objective, the preferred embodiments of the present invention disclose when a piece of article data activated by the class information is matching data, the comparator assumes that another piece of article data activated by the class information is also matching data.

Furthermore, using the radio system, the present invention aims at easily determining whether or not the combination of articles is appropriate.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

FIG. 39 shows the configuration of the article data table;

FIG. 40 shows the configuration of the schedule table;

FIG. 42 shows the article data table updated in the schedule active period;

FIG. 44 shows the configuration of the data table provided for the radio tag retrieval apparatus according to the eighth embodiment of the present invention.

DETAILED DESCRIPTION OF THE PREFERRED EMBODIMENTS

The embodiments of the present invention are described below in detail by referring to the attached drawings.

[First Embodiment]

[Hardware Configuration]

Figure 1:
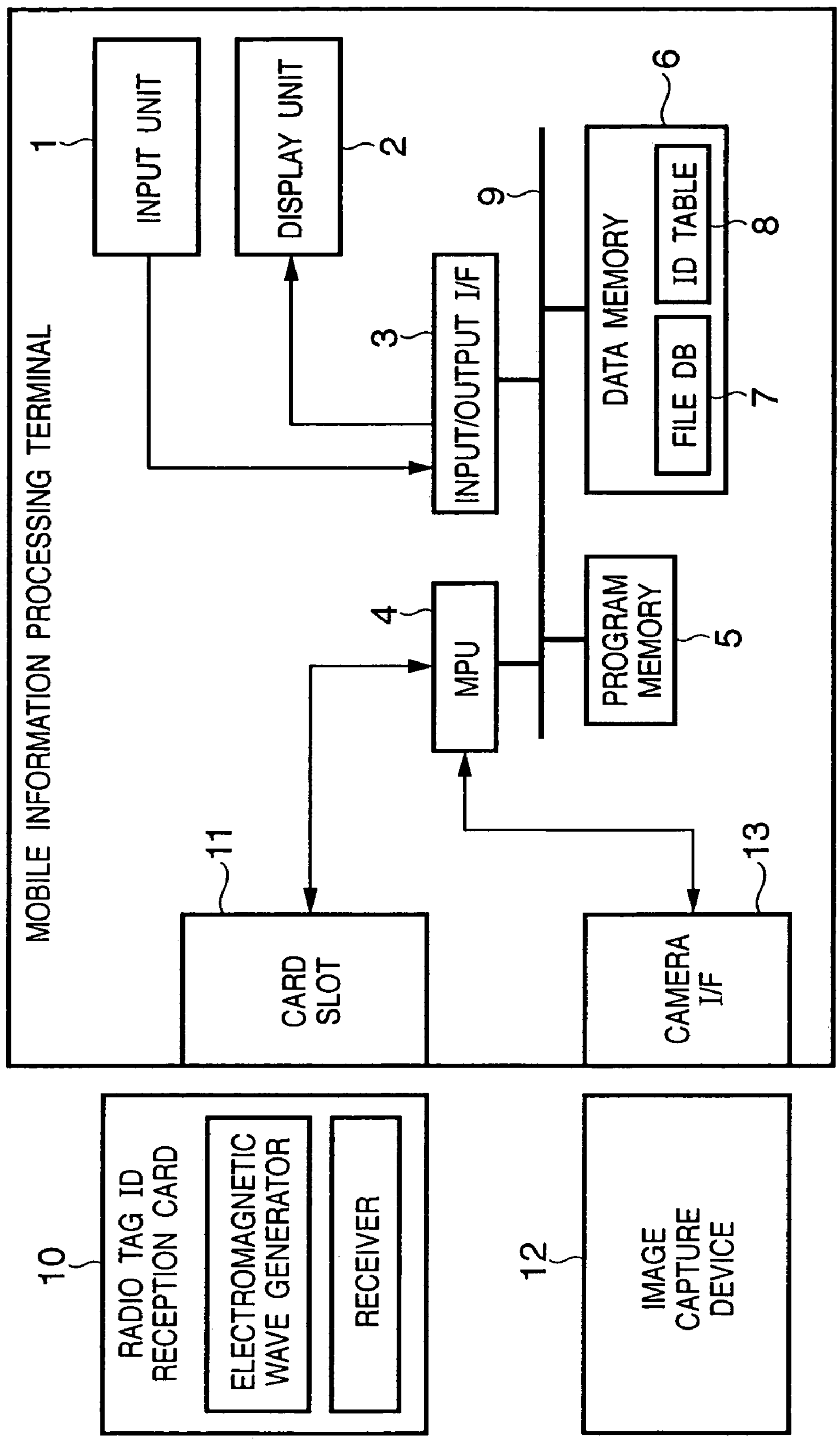
FIG. 1 is a block diagram showing the configuration of the hardware of the mobile information processing terminal according to the first embodiment of the present invention.

FIG. 1 is a block diagram showing the configuration of the hardware of the mobile information processing terminal forming configuring the article management apparatus according to the first embodiment of the present invention.

In FIG. 1, an input section 1 receives operation input of a user, and receives an input signal from the operation using a cursor key of a hardware key, a shutter button, a determination button; a communications button, a capture-display mode switch button, etc. The details of the keys and buttons are described later. A display unit 2 displays the input by the input section 1, the data in data memory 6, the user interface for an operation, etc. An input/output interface (input/output I/F) 3 inputs and outputs a data read from the input section 1, data output to the display unit 2, and input/output of other signals in the program processing described later. A micro processing unit (MPU) 4 performs arithmetic, logical determination, etc. for various processes, processes input from a card slot 11 and a camera interface (camera I/F) 13, and simultaneously outputs an instruction to control each component connected to a system bus 9.

The card slot 11 which is one of the input interfaces connected to the MPU 4 is an input interface for expansion of the function by inserting various function cards. In the first embodiment, the insertion of a radio tag ID reception card 10 is assumed. Similarly, the camera interface 13 is an input interface for input of captured data from a capture device 12 such as a digital camera which can be connected to the end.

Program memory 5 stores a program for control by the MPU 4 including the procedure described later. The program memory 5 can be ROM, and RAM on which a program is loaded from an external storage device. Data memory 6 stores data generated in various processes. The data memory 6 is configured by, for example, RAM, a hard disk, and non-volatile memory such as compact flash® memory, etc. A file database (file DB) 7 is a non-volatile area for storage of data input to the data memory 6 as a data file. An ID table 8 is a non-volatile area for storage of link data for association of each piece of data in the file DB 7.

The system bus 9 transfers an address signal indicating each component to be controlled by the MPU 4, a control signal for control of each component described above, data communicated among the components.

The radio tag ID reception card 10 is used in receiving a tag ID (identification) signal from a radio tag, and includes an electromagnetic wave generator and a receiver. It is desired that the receiver has the directivity in substantially the same direction as the capturing direction of the capture device 12, and has the reception directivity at an angle substantially corresponding to the capture vision of the capture device 12. To satisfy these conditions, it is desired that the direction of the card slot 11 is substantially the same as the capturing direction of the capture device 12. Furthermore, it is also desired that the capturing function and the radio tag ID receiving function are incorporated in a unit into a card and the body of the capture device 12.

The capture device includes a lens for forming an optical image, and an image pickup device such as a CCD, a CMOS, etc. for converting an optical image formed by a lens into an electric signal.

A digitizer is incorporated as a part of the input section 1 into the LCD panel of the display unit 2 for touch input and pen input. As described above, an article management apparatus is configured by the mobile information processing terminal, the radio tag ID reception card 10, and the capture device 12 according to the first embodiment of the present invention.

[Process of Article Management Apparatus]

Figure 2:
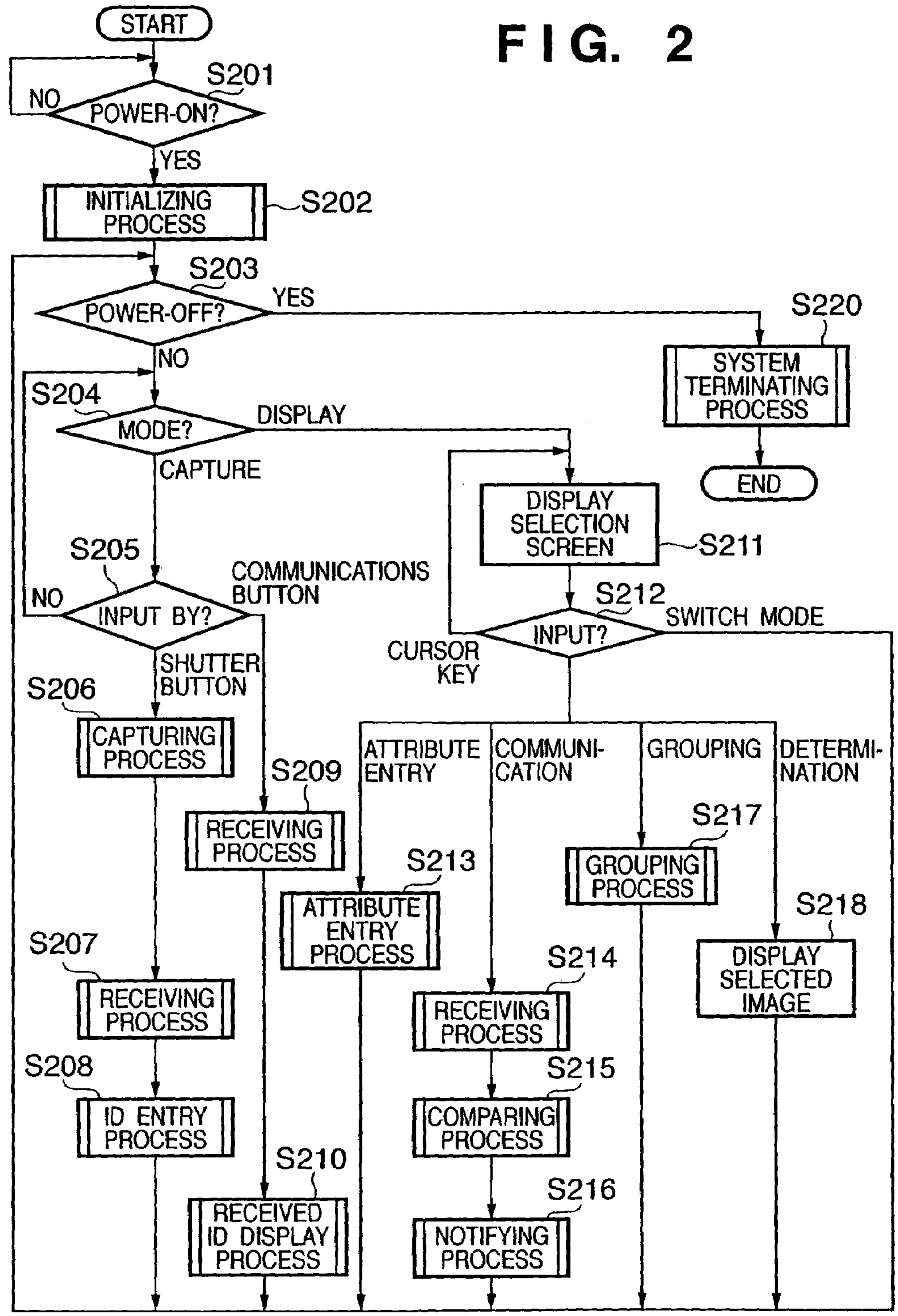
FIG. 2 is a flowchart of the system processing performed by the mobile information processing terminal according to the first embodiment of the present invention.

FIG. 2 is a flowchart showing the flow of the process performed by the mobile information processing terminal according to the first embodiment of the present invention.

When power is applied, the system is activated (S201), and the initializing process such as the initialization of RAM and an interface, the display of an initial screen on the display unit 2, etc. is performed (S202).

Then, the ON/OFF state of the power source is determined (S203). If it is determined that the power is turned off, then the system terminating process is performed by, for example, storing various data stored in the RAM and set data in the file database 7 as a data file, etc. (S220), thereby terminating the system.

On the other hand, if it is determined that the power is turned on, then it is determined which is entered, a capture mode or a display mode, based on the operation contents of the capture-display mode switch button (input section 1)(S204). If it is determined that the capture mode is-entered as a result of the determination, then input by the communications button or the shutter button (input section 1) is awaited (S205).

When it is determined in step S205 that the communications button is pressed, the receiving process is activated (S209), the tag ID of the radio tag in the reception range is received, and the received tag ID is stored in the data memory 6. Then, the received ID display process is activated (S210), and an image and a character string corresponding to the received tag ID are extracted from the data memory 6 and displayed on the display unit 2, thereby returning control to step S203.

If it is determined in step S205 that the shutter button is pressed, then the capturing process is activated (S206), and the capturing process is performed by the capture device. 12. Then, the receiving process is activated (S207), and the tag ID of the radio tag in the reception range is received. Then, after the ID entry process is activated (S208) and the received tag ID is entered in the data memory 6, the control is passed to step S203.

If it is determined in step S204 that the display mode is entered, a selection screen is displayed on the display unit 2 (S211), and an operation input by a user through the input section 1 is awaited (S212).

If it is determined in step S212 that operation input has been made through the cursor key, the selection screen corresponding to the operation input through the cursor key is displayed again (S212), and operation input is awaited again (S212).

If it is determined in step S212 that the capture-display mode switch button has been operated, then control is returned to step S203.

If it is determined in step S212 that a combination of buttons indicating attribute entry (for example, the shutter button and the determination button) has been pressed, the attribute entry process is activated (S213), the attribute information is additionally entered to the ID of the selected image on the selection screen, and control is returned to step S203.

If it is determined in step S212 that the communications button has been pressed, then the receiving process is activated (S214), the tag ID of the radio tag in the reception range is received, the comparing process is activated (S215), the ID corresponding to the image selected on the selection screen is compared with the received tag ID, the notifying process is activated (S216), the comparison result is displayed on the display unit 2 for notification to the user, and then control is returned to step S203.

If it is determined in step S212 that a combination of buttons (for example, the shutter button and a specific cursor key) indicating the group ON/OFF has been pressed, then the grouping process is activated (S217), the grouping process or group releasing process is performed depending on the selection state of the selection screen, and then control is returned to step S203.

If it is determined in step S212 that the determination button has been pressed, the image selected on the selection screen is displayed (all screens are displayed if necessary) on the display unit 2 (S218), and then control is returned to step S203.

After each process is activated as described above, each process is obviously terminated after necessary process is terminated although the termination of each process is not described here.

Receiving Process

Figure 3:
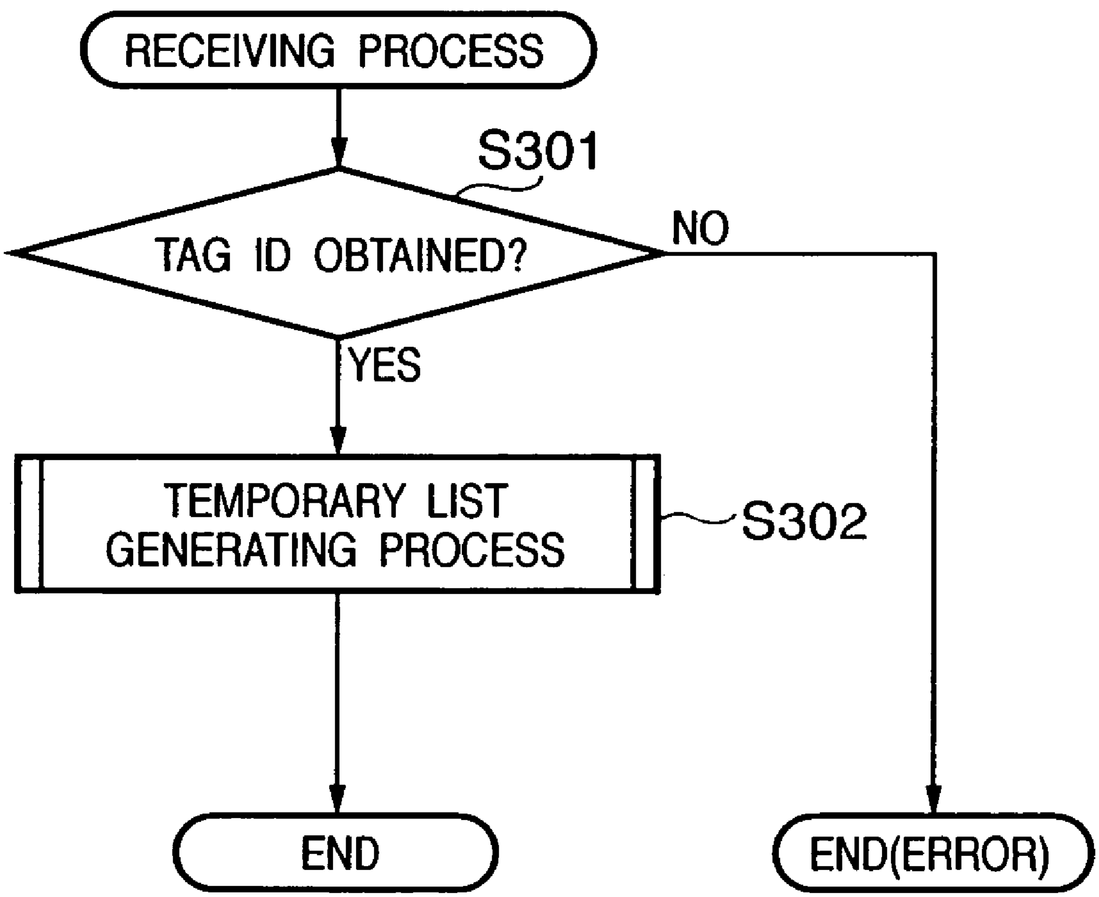
FIG. 3 is a flowchart showing in detail the receiving process performed by the mobile information processing terminal according to the first embodiment of the present invention.

FIG. 3 is a flowchart showing the detail of the receiving process performed by the mobile information processing terminal according to the first embodiment of the present invention.

As shown in FIG. 3, if the receiving process is activated, it is determined whether or not a tag ID of a radio tag has been obtained (S301). If a tag ID has been obtained, then the temporary list generating process is activated (S302), and a temporary received ID list storing the obtained tag ID is generated, thereby terminating the receiving process.

On the other hand, if no tag ID is obtained in step S301, then the subsequent processes are not performed, an error notification is returned, and the receiving process is terminated.

ID Entry Process

Figure 4:
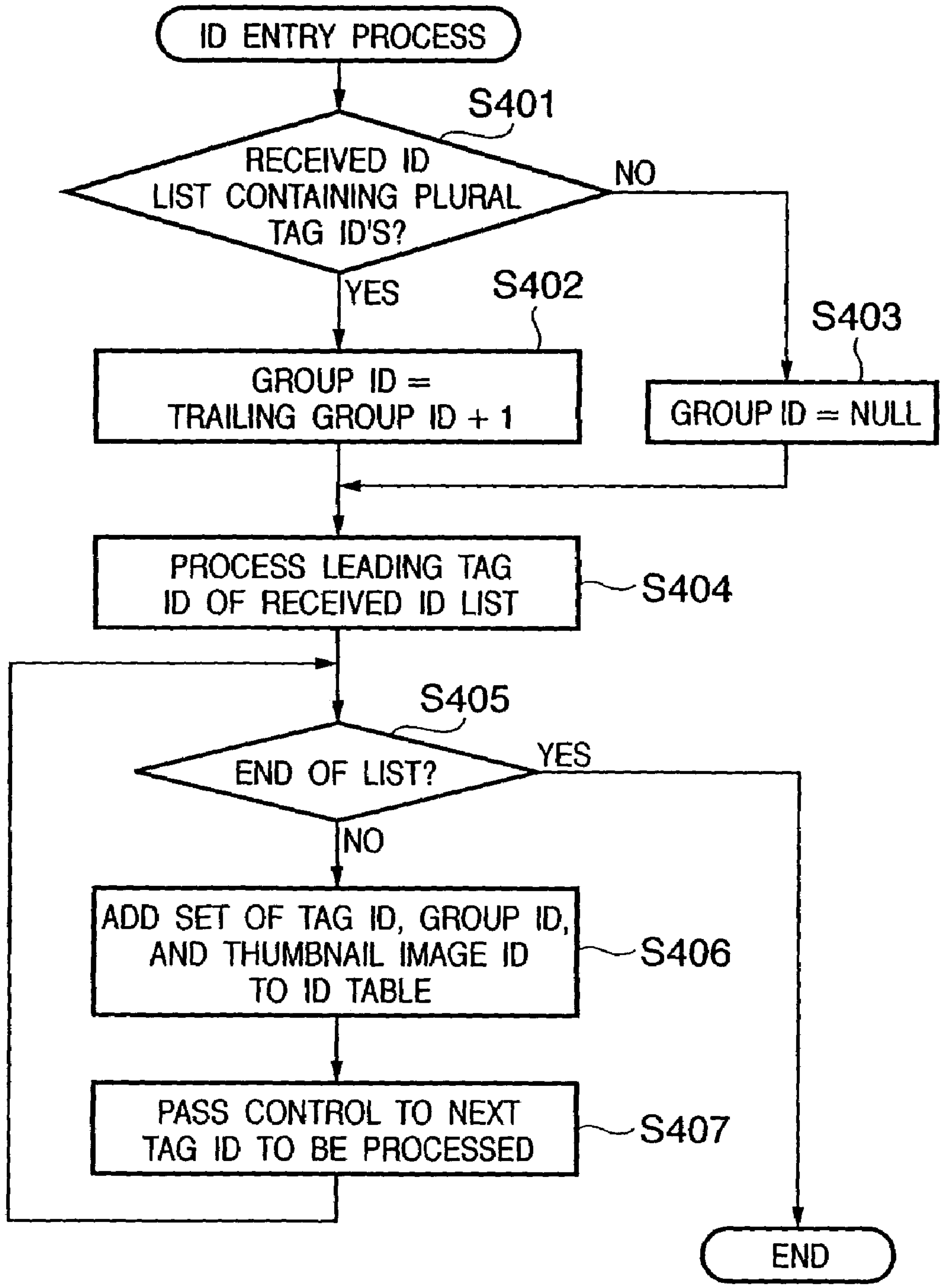
FIG. 4 is a flowchart showing in detail the ID entry process performed by the mobile information processing terminal according to the first embodiment of the present invention.

FIG. 4 is a flowchart showing the detail of the ID entry process performed by the mobile information processing terminal according to the first embodiment of the present invention.

As shown in FIG. 4, when the ID entry process is activated, the temporary received ID list generated in step S302 is referred to (S401). If there are a plurality of tag IDs of the temporary received ID list, then the ID table 8 of the data memory 6 is referred to, and the ID obtained by incrementing the trailing ID of the group ID is newly set as a new group ID (S402). For example, if the trailing group ID is Oxla, the new group ID is Oxlb. On the other hand, if there is one tag ID of the temporary received ID list, "null" is set as the group ID (S403).

Then, a process target is set in the leading tag ID of the received ID list (S404). It is determined whether or not the process of the received ID list has been completed (S405). If it has not been completed, then the tag ID to be processed, a set of the ID (for example, the unique file name) of the thumbnail image for reference to captured image data, and a group ID is added to the ID table 8 (S406). Then, control is passed to the next tag ID to be processed in the received ID list (S407), then control is returned to step S405, and the processes in steps S405 to S407 are repeated until the processes of the tag IDs of the received ID list are completed. If it is determined that the processes of the tag IDs of the received ID list have been completed, the entire process is terminated.

The captured image is stored as a thumbnail image in the file DB 7 of the data memory 6. If the storage capacity of the data memory 6 is sufficiently large, the captured image is stored as is in the file DB 7. Otherwise, it can be reduced as necessary into a thumbnail image for display.

Attribute Entry Process

Figure 5:
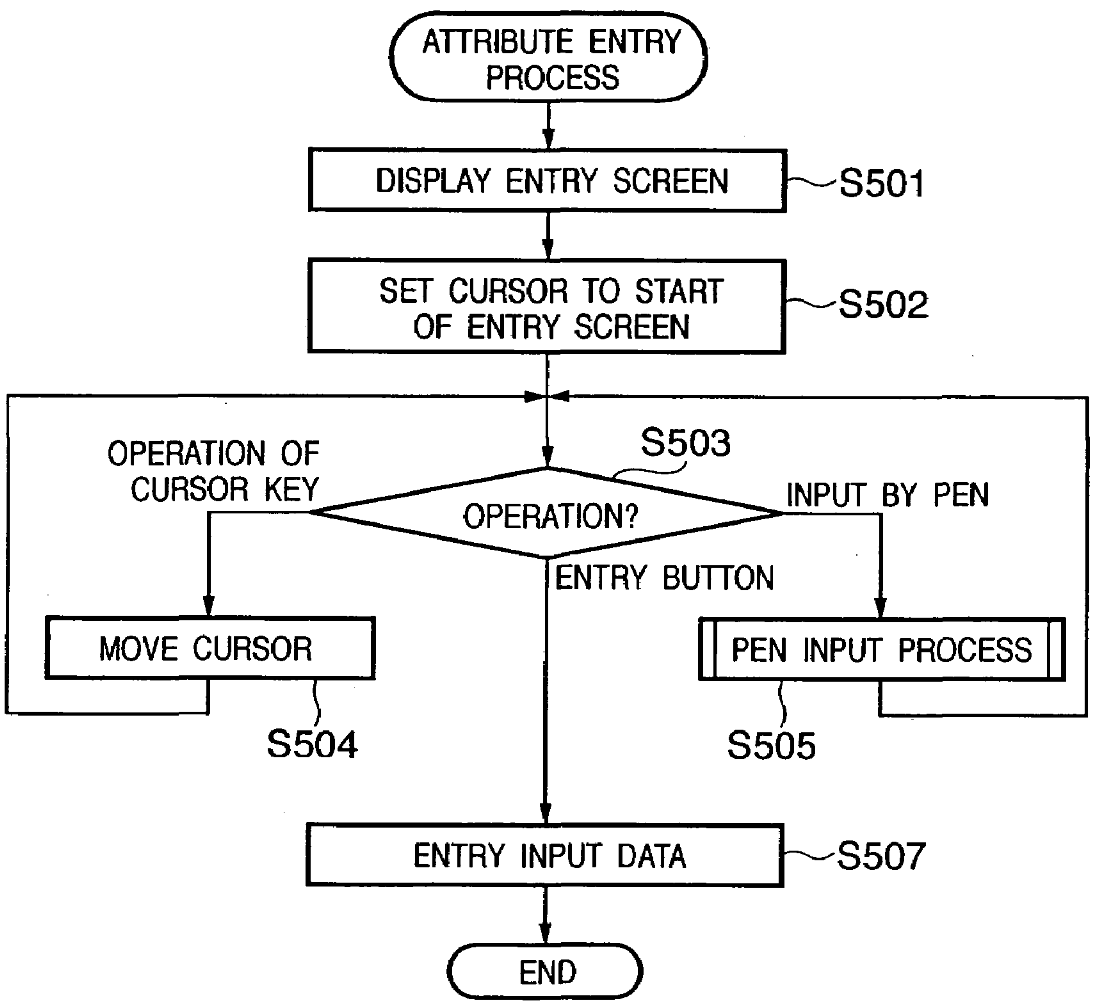
FIG. 5 is a flowchart showing in detail the attribute entry process performed by the mobile information processing terminal according to the first embodiment of the present invention.

FIG. 5 is a flowchart showing the detail of the attribute entry process performed by the mobile information processing terminal according to the first embodiment of the present invention.

As shown in FIG. 5, when the attribute entry process is activated, the entry screen (described later in detail) is displayed on the display unit 2 (S501), and the cursor is set at the start of the entry screen (S502).

Then, the operation of the input section 1 is awaited (S503). When the cursor key is operated, the cursor is moved on the entry screen (S504), and control is passed to step S503. If the pen is operated, then the pen input process is activated (S505), and the pen input is received. The cursor is operated or the pen input is repeated until the entry button is pressed. If the entry button is pressed, the input data (attribute information) is entered in the data memory 6 by referring to the ID table 8 (S507), thereby terminating the attribute entry process.

Received ID Display Process

Figure 6:
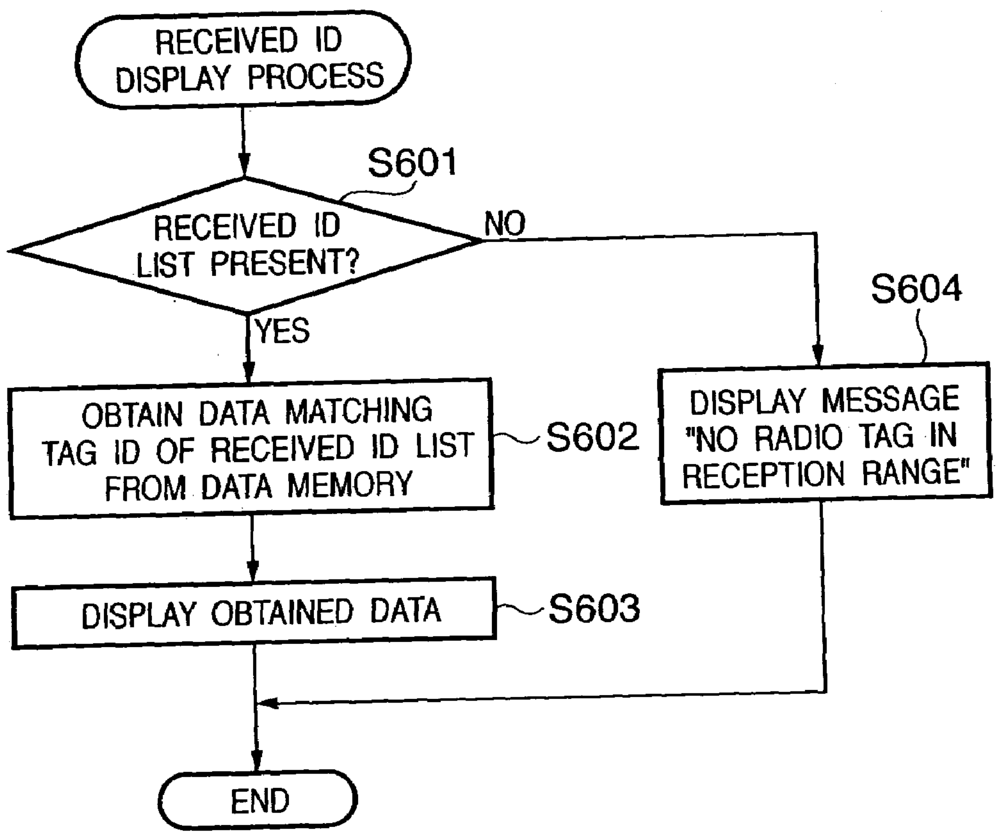
FIG. 6 is a flowchart showing in detail the received ID display process performed by the mobile information processing terminal according to the first embodiment of the present invention.

FIG. 6 is a flowchart showing the detail of the received ID display process performed by the mobile information processing terminal according to the first embodiment of the present invention.

As shown in FIG. 6, when the received ID display process is activated, it is determined whether or not there is a received ID list (S601). If there is a received ID list, then the data matching the tag ID recorded in the received ID list is obtained from the data memory 6 by referring to the ID table 8 (S602), the obtained data is displayed on the display unit 2 (S603), and the received ID display process is terminated.

If there is no received ID list, a message such as "No radio tag is detected in the reception range." is displayed on the display unit 2 (S604), and the received ID display process is terminated.

Comparing Process

Figure 7:
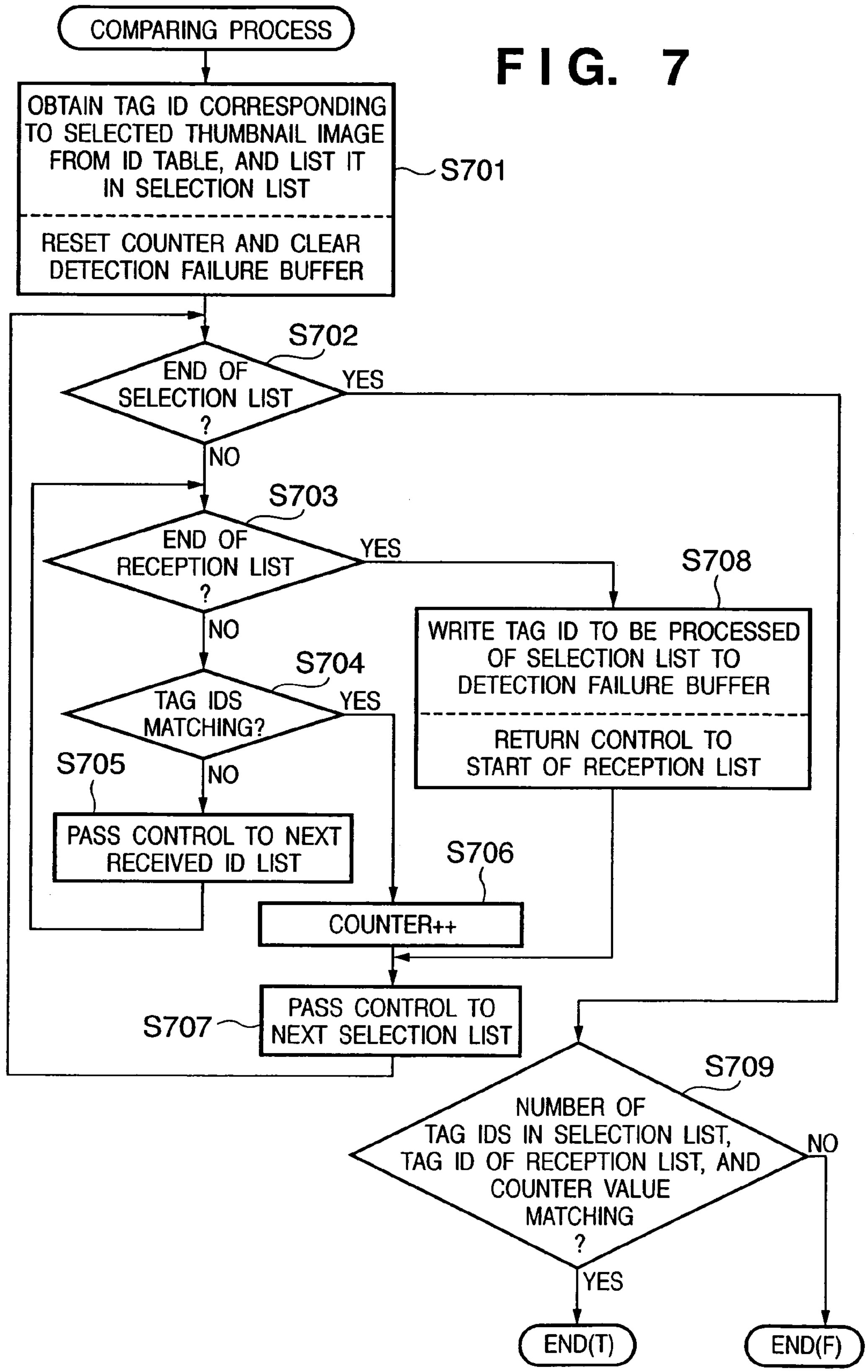
FIG. 7 is a flowchart showing in detail the comparing process performed by the mobile information processing terminal according to the first embodiment of the present invention.

FIG. 7 is a flowchart showing the detail of the comparing process performed by the mobile information processing terminal according to the first embodiment of the present invention.

As shown in FIG. 7, when the comparing process is activated, a tag ID corresponding to the thumbnail image selected on the selection screen is obtained from the ID table 8 to generate a selection list, the counter is reset to 0, and the detection failure buffer of the data memory 6 is cleared (S701).

Then, it is determined whether or not the process corresponding to the tag ID listed in the selection list has been completed (S702). If it has not been completed, then it is determined whether or not the process corresponding to the tag ID listed in the received ID list has been completed (S703). If it has not been completed, then the tag ID to be processed in the selection list is compared with the tag ID to be processed in the received ID list (S704). If they match each other, then the counter value is incremented by 1 (S706), control is passed to the next tag ID to be processed in the selection list (S707), and control is returned to step S702. If the tag IDs to be processed do not match each other in step S704, then control is passed to the next tag ID to be processed in the received ID list (S705), and control is returned to step S703. Then, if it is determined in step S703 that the process has been completed on all tag IDs listed in the received ID list, then the tag ID to be processed in the selection list is written to the detection failure buffer, the ID to be processed in the received ID list is returned to the start of the list (S708), and control is passed to step S707.

If it is determined in step S702 that the process has been completed on all tag IDs listed in the selection list, then the number of tag IDs in the selection list, the number of tag IDs in the reception list, and the counter value are compared (S709). If they match one another, then "True" is returned, thereby terminating the process. If in step S709, the number of tag IDs in the selection list, the number of tag IDs in the reception list, and the counter value do not match one another, then "False" is returned, thereby terminating the process.

Notifying Process

Figure 8:
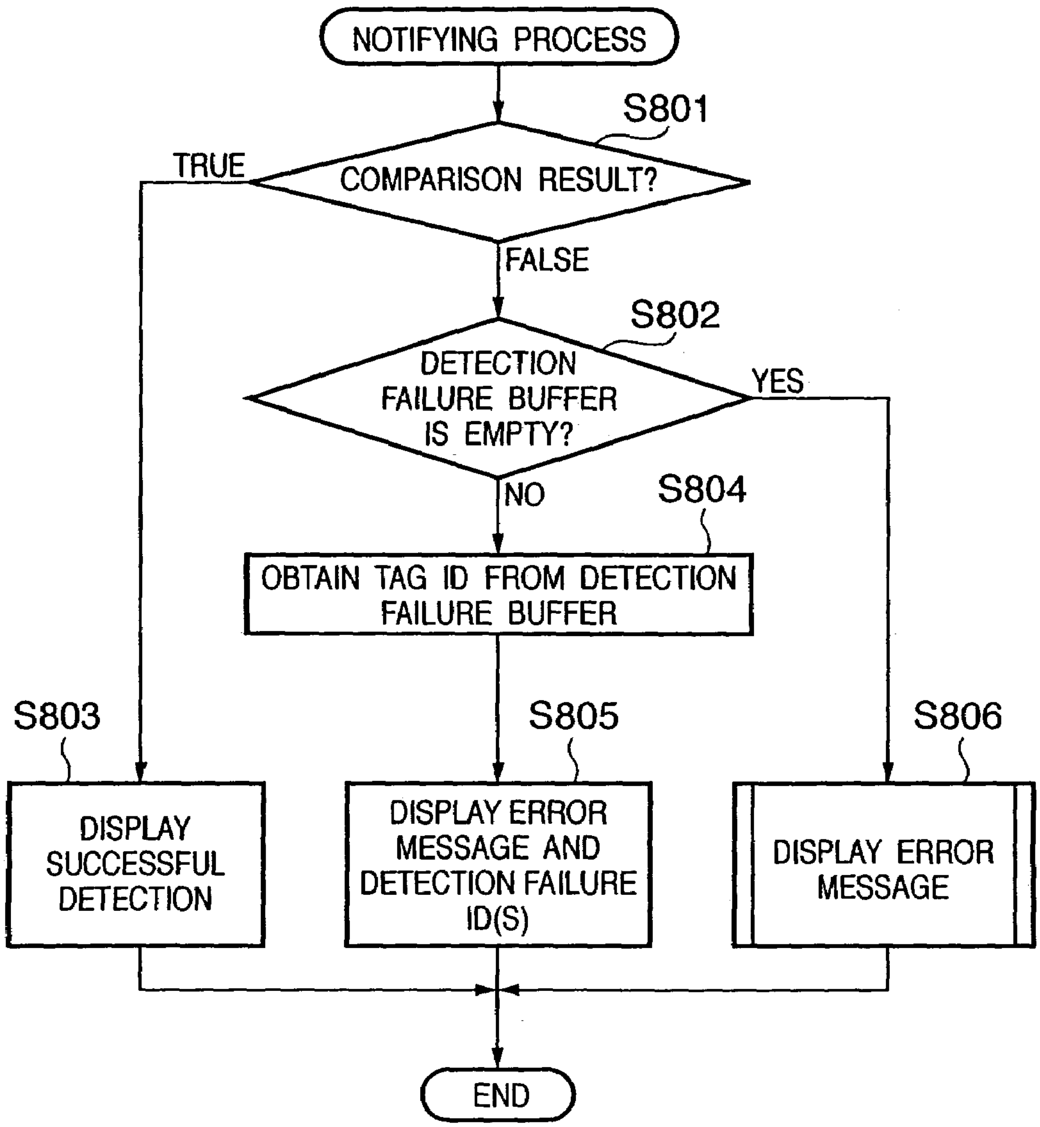
FIG. 8 is a flowchart showing in detail the notifying process performed by the mobile information processing terminal according to the first embodiment of the present invention.

FIG. 8 is a flowchart showing the detail of the notifying process performed by the mobile information processing terminal according to the first embodiment of the present invention.

As shown in FIG. 8, if the result of the comparing process is true when the notifying process is activated, then a message such as "All specified tag IDs have been correctly detected." is displayed on the display unit 2, thereby terminating the notifying process.

On the other hand, if the result of the comparing process is false, it is determined whether or not the detection failure buffer is available (S802). If it is not available, then the tag ID stored in the detection failure buffer is obtained as a detection failure ID (S804), an error message such as "The following tag ID has not been detected. "5A236C3B" is displayed on the display unit 2 (S805), thereby terminating the notifying process. The error message "5A236C3B" is an example, and any detection failure ID(s) is displayed here.

If it is determined in step S802 that the detection failure buffer is available, an error message such as "An unspecified tag ID has been received." is displayed on the display unit 2 (S806), thereby terminating the notifying process.

[Outline of the Apparatus]

Figure 9A:
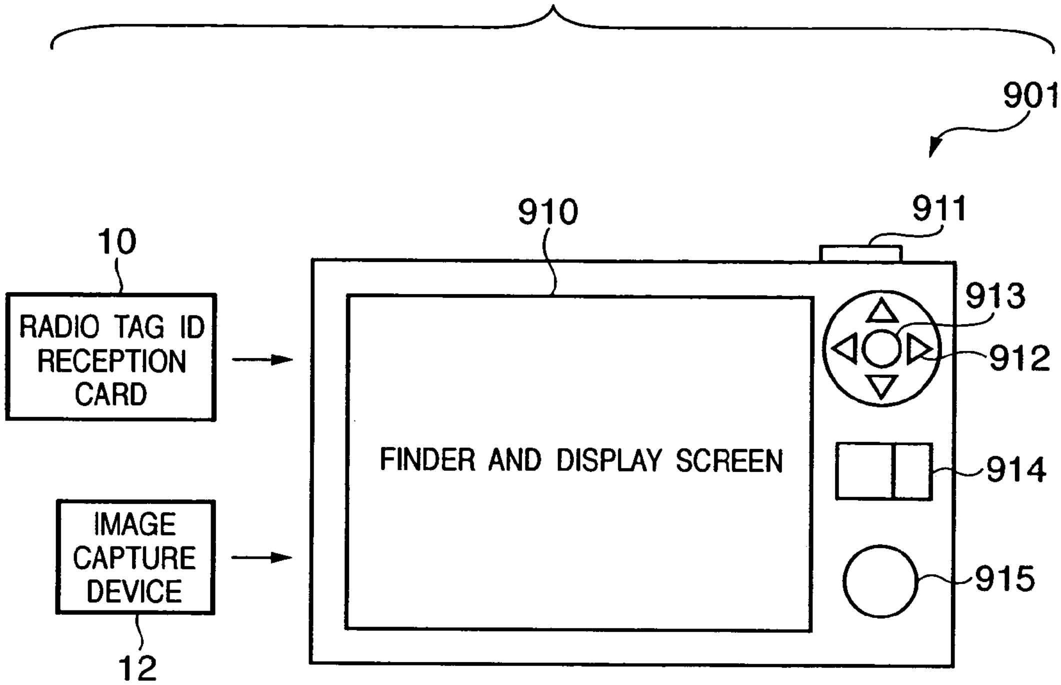
FIG. 9A shows the appearance of the mobile information processing terminal according to the first embodiment of the present invention.

FIG. 9A shows the outline of the mobile information processing terminal according to the first embodiment of the present invention.

As shown in FIG. 9A, a mobile information processing terminal 901 can connect the radio tag ID reception card 10 and the capture device 12, and comprises a finder display screen 910 which can also be the display unit 2, and hardware buttons (input section 1) including a shutter button 911, a cursor key 912, a determination button 913, a display-capture mode switch button 914, and a communications button 915.

Figure 9B:
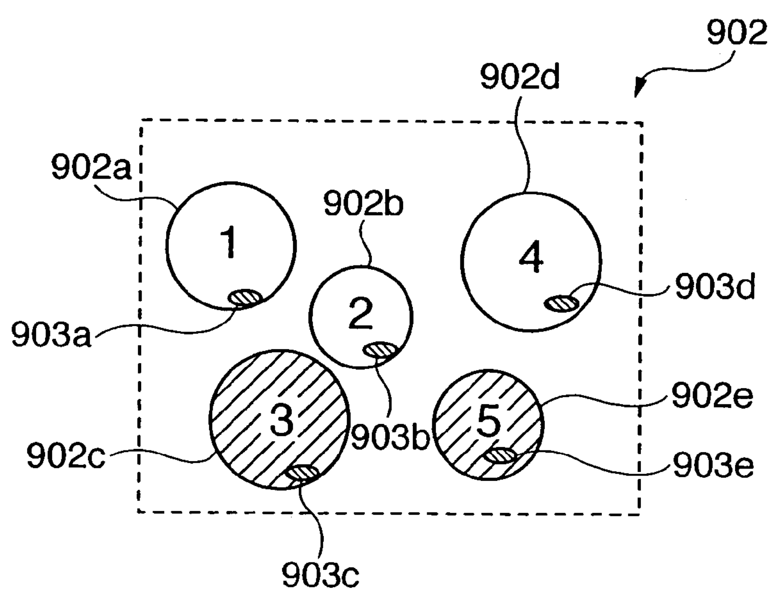
FIG. 9B shows an example of a group of collectively captured articles.

FIG. 9B shows an example of a collectively captured article group 902, and articles 902*a* to 902*e* is assigned radio tags 903*a* to 903*e* having different tag IDs. In the first embodiment, a small radio tag having a unique tag ID can be assigned to any article.

[Structure of Database]

Figures 10A, 10B:
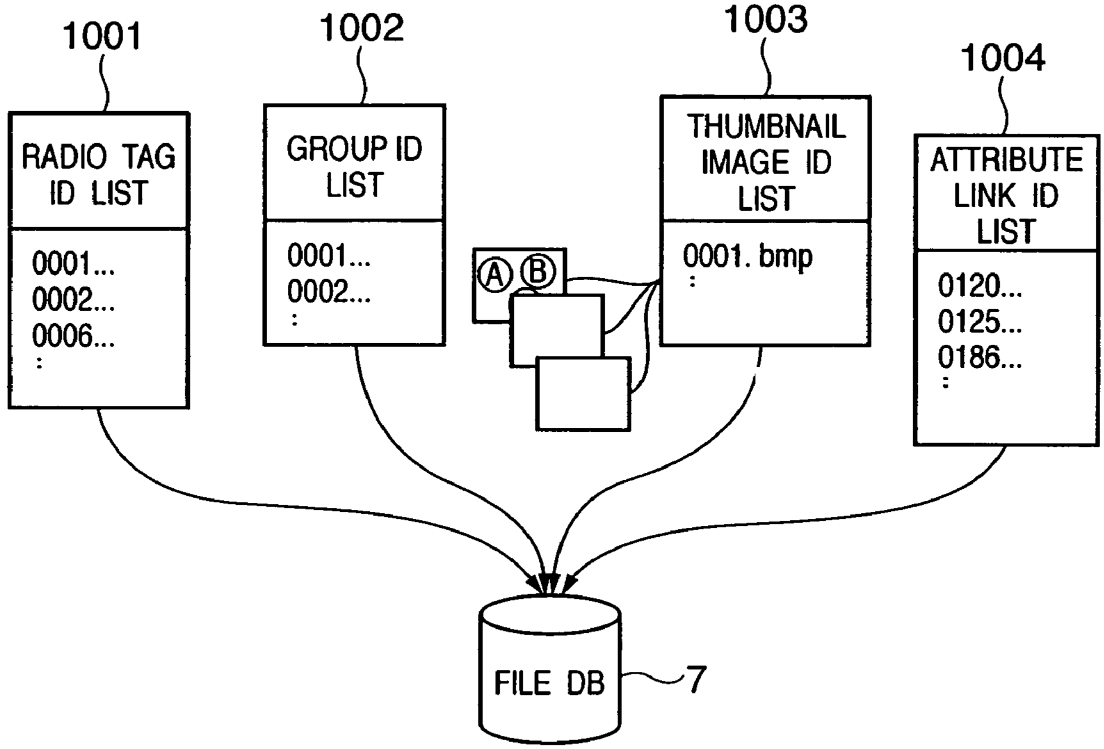
FIG. 10A shows the structure of the database of the mobile information processing terminal according to the first embodiment of the present invention.
FIG. 10B is an explanatory view of the ID table.

FIG. 10A shows the structure of a database of the mobile information processing terminal according to the first embodiment of the present invention.

As shown in FIG. 10A, the data memory 6 of the mobile information processing terminal stores various ID lists such as a radio tag ID list 1001, a group ID list 1002, a thumbnail image ID list 1003, an attribute link ID list 1004, etc. FIG. 10B shows an example of the ID table 8 which associates them with one another.

[Capture and ID Entry]

Figure 11A:
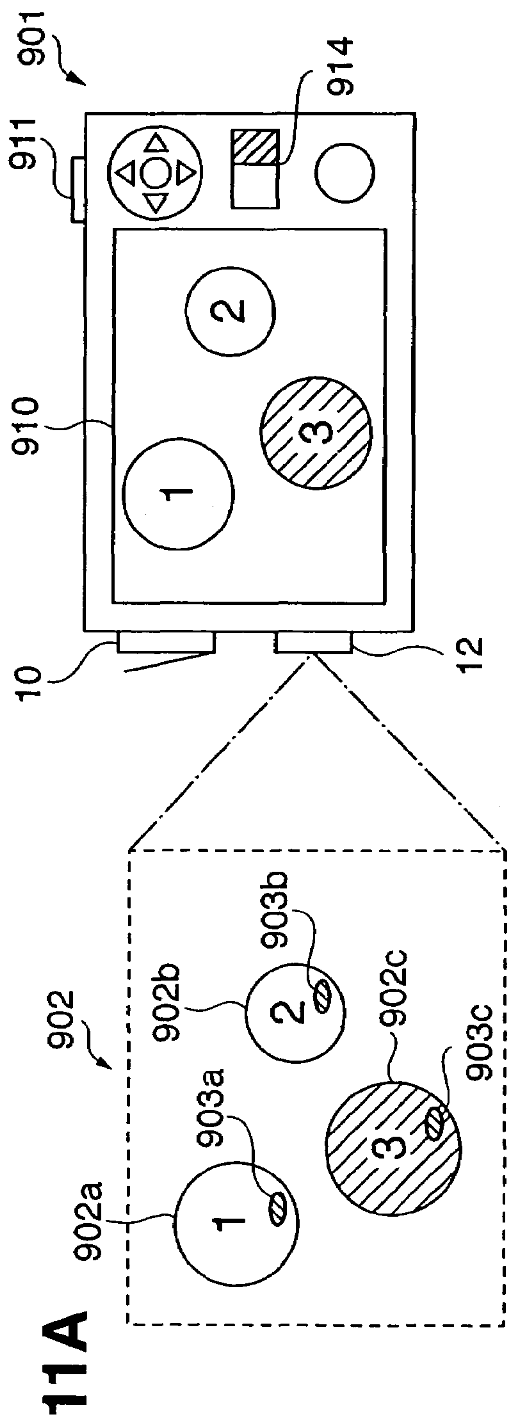
FIGS. 11A and 11B are explanatory views showing the capturing operation and the outline of the ID entry of the mobile information processing terminal according to the first embodiment of the present invention.
Figure 11B:
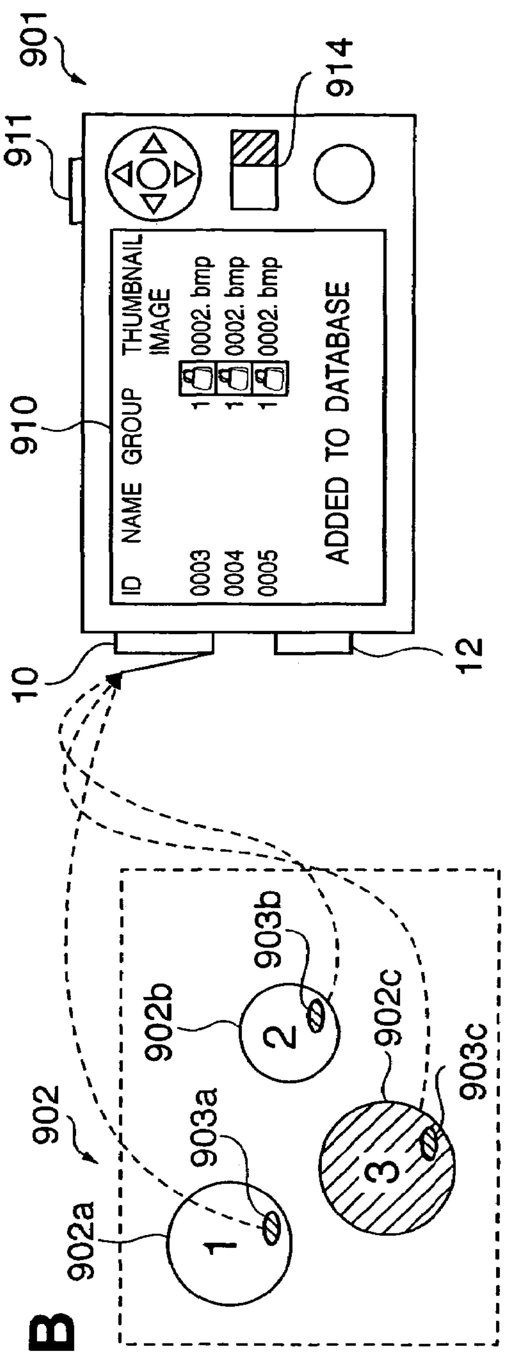

FIGS. 11A and 11B are explanatory views showing the outline of the capturing process performed by the mobile information processing terminal and the ID entry according to the first embodiment of the present invention.

As shown in FIG. 11A, if the shutter button 911 is pressed when the capture mode is set by the display-capture mode switch button 914, then the capture device 12 captures the article group 902, and the captured image is displayed on the finder display screen 910.

After the article group 902 is captured, the receiving process is activated, the tag IDs of the radio tags 903*a* to 903*c* are received, and the received tag IDs and the thumbnail images of the captured image are displayed on the finder display screen 910 and stored in the data memory 6.

[Display of Received ID List]

Figure 12A:
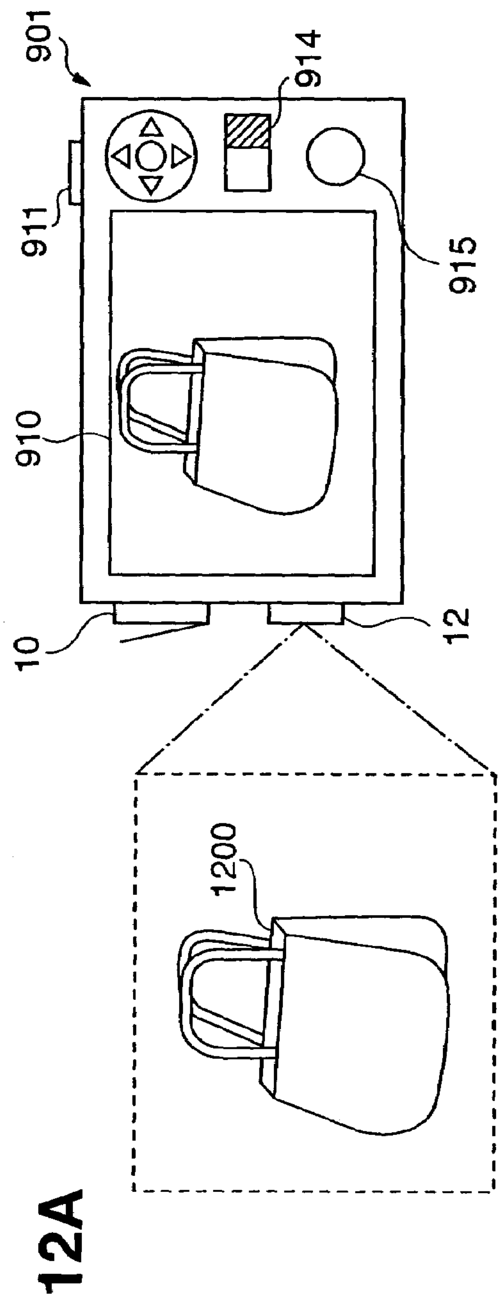
FIGS. 12A and 12B are explanatory views showing the outline of the received ID list of the mobile information processing terminal according to the first embodiment of the present invention.
Figure 12B:
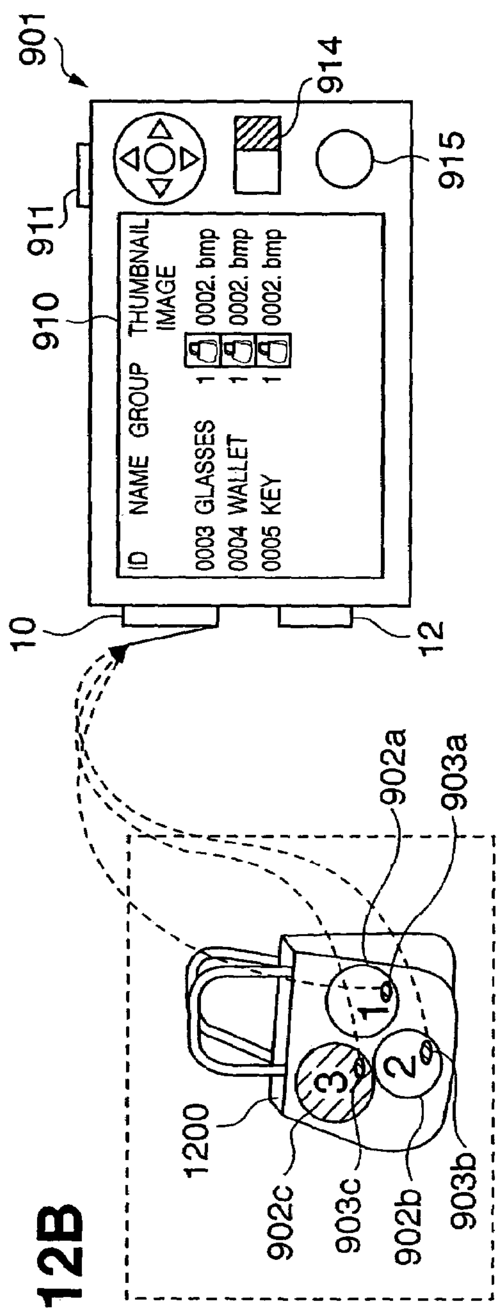

FIGS. 12A and 12B are explanatory views of the outline of the display of the received ID list performed by the mobile information processing terminal according to the first embodiment of the present invention.

As shown in FIGS. 12A and 12B, if the communications button 915 is pressed with a subject 1200 displayed on the finder display screen 910 when the capture mode is set by the display-capture mode switch button 914, then the tag IDs of the radio tags 903*a* to 903*c* which are close to the subject 1200 (that is, in the display range of the finder display screen 910) and are in the reception range are received as shown in FIG. 12B. The data corresponding to the successfully received radio tags 903*a* to 903*c* is obtained from the data memory 6, and displayed on the finder display screen 910.

[Selection Screen]

Figure 13A:
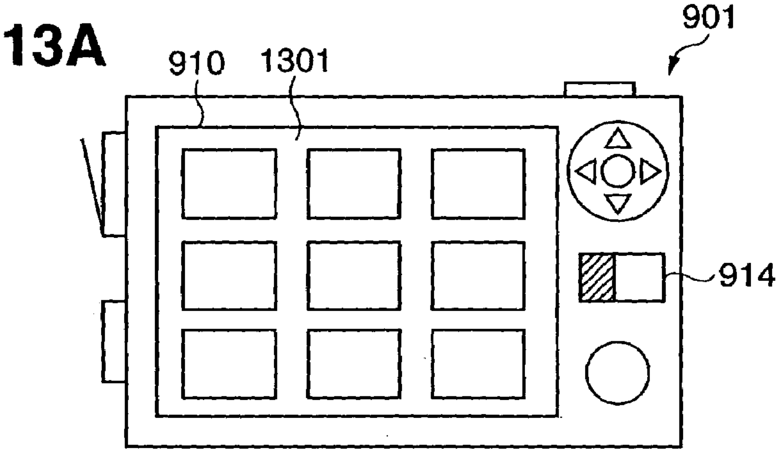
FIGS. 13A to 14C show an example of displaying the selection screen and the operation after the display on the mobile information processing terminal according to the first embodiment of the present invention.
Figure 13B:
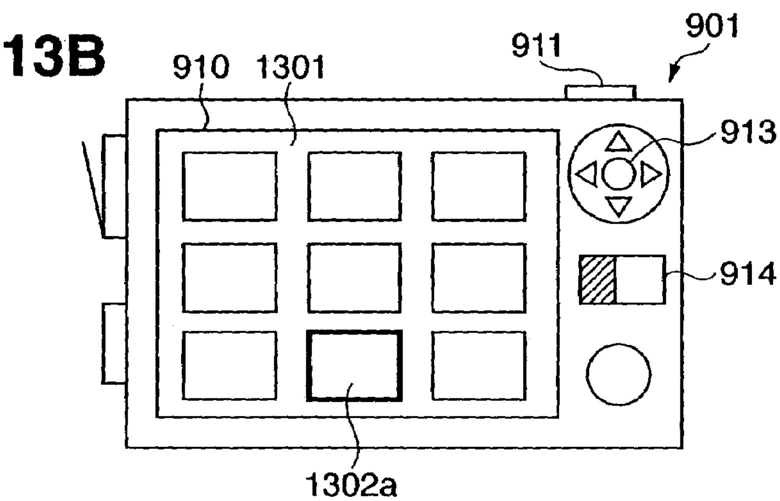
Figure 13C:
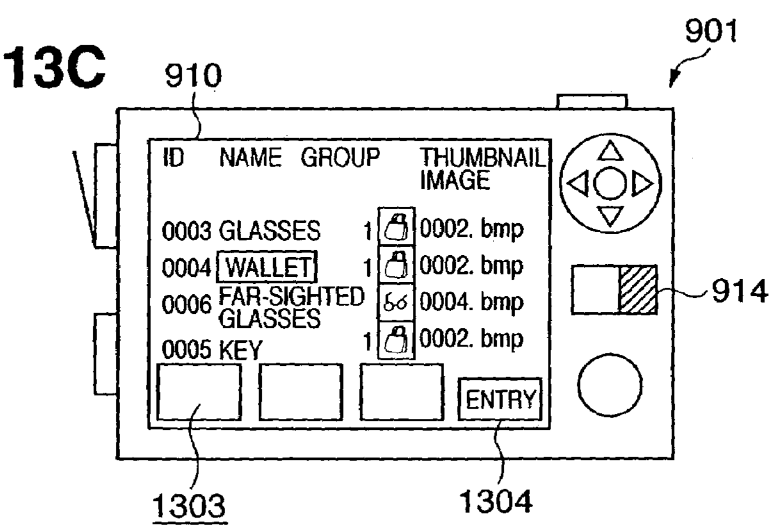

FIGS. 13A to 13C are examples of the display of the selection screen on the mobile information processing terminal and show the operation after the display according to the first embodiment of the present invention.

As shown in FIG. 13A, the mobile information processing terminal displays a selection screen 1301 on the finder display screen 910 when the display mode is set by the display-capture mode switch button 914. Then, as shown in FIG. 13B, if the determination button 913 and the shutter button 911 are pressed substantially at the same time with any thumbnail image 1302*a* selected, then the screen is switched into an attribute entry screen 1303 as shown in FIG. 13C, and the user inputs attribute information on the attribute entry screen 1303. If an entry button 1304 on the attribute entry screen 1303 is pressed after the user inputs the attribute information, then the input attribute information is determined. The attribute entry screen 1303 is described later in detail.

Figure 14A:
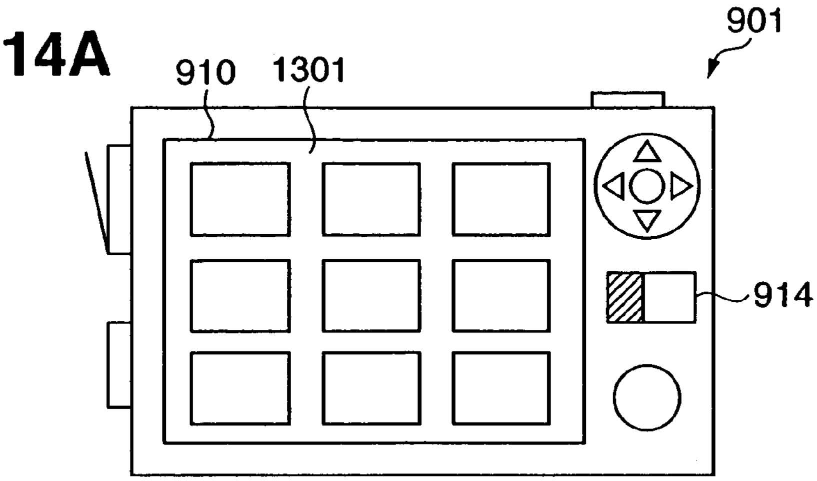
Figure 14B:
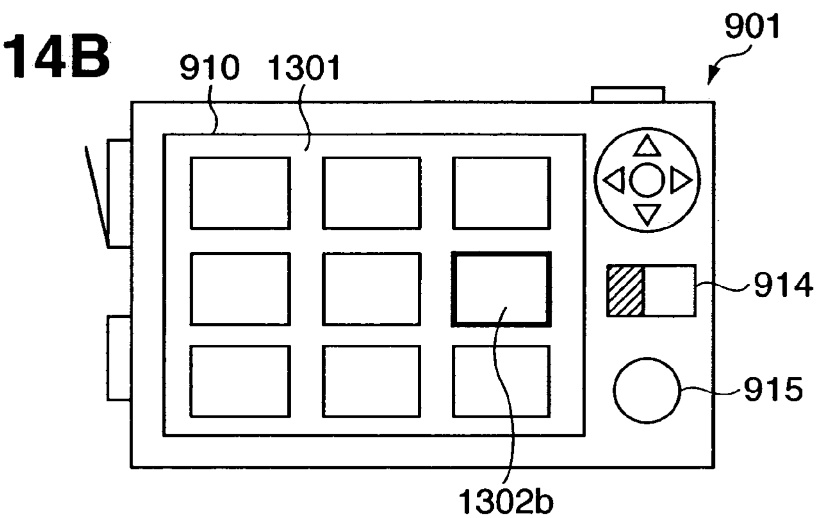
Figure 14C:
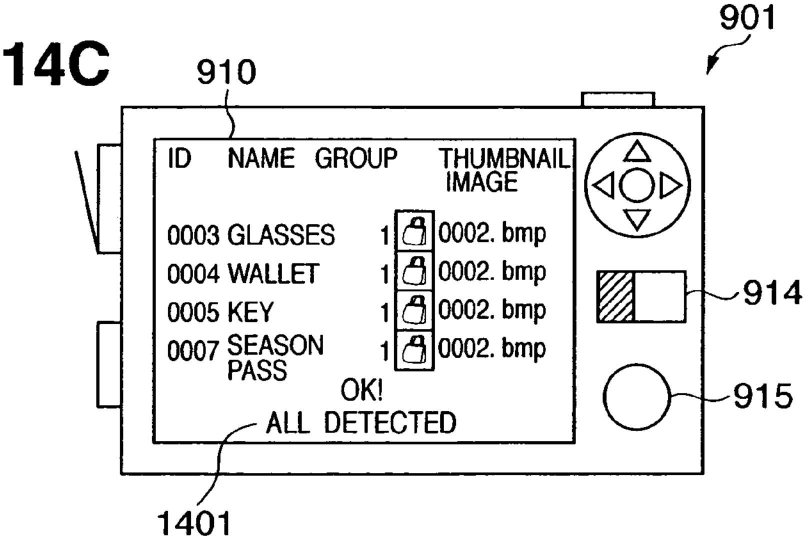

FIGS. 14A to 14C are examples of the display of the selection screen on the mobile information processing terminal and show the operation after the display according to the first embodiment of the present invention.

As shown in FIG. 14A, the mobile information processing terminal displays a selection screen 1301 on the finder display screen 910 when the display mode is set by the display-capture mode switch button 914. Then, as shown in FIG. 14B, when the communications button 915 is pressed with any thumbnail image 1302*b* selected, the reception of the tag IDs of the radio tags 903 in the reception range is started, and the tag ID corresponding to the thumbnail image 1302*b* is extracted from the data memory 6, the extracted tag ID is compared with the tag ID detected in the receiving process, and the result is given as a notification.

In the first embodiment, a notification is displayed on a notification screen 1401 shown in FIG. 14C. That is, the notification screen 1401 containing a list of extracted tag IDs and a message indicating the status of the comparison result is displayed on the finder display screen 910. The display example shown in FIG. 14C shows the case in which the tag ID corresponding to the selected thumbnail image 1302*b* matches the detected tag ID, and the message indicates that all tag IDs have been detected. However, if they do not completely match, that is, if the detection result indicates insufficient or excess tag IDs, then the corresponding error messages are displayed.

In the first embodiment, data and a message are displayed as a notifying method, but a notification can be given by light by, for example, turning on or blinking an LED lamp, etc., or given by a tone such as a beep (electronic tone), etc.

[Attribute Entry Screen]

Figure 15:
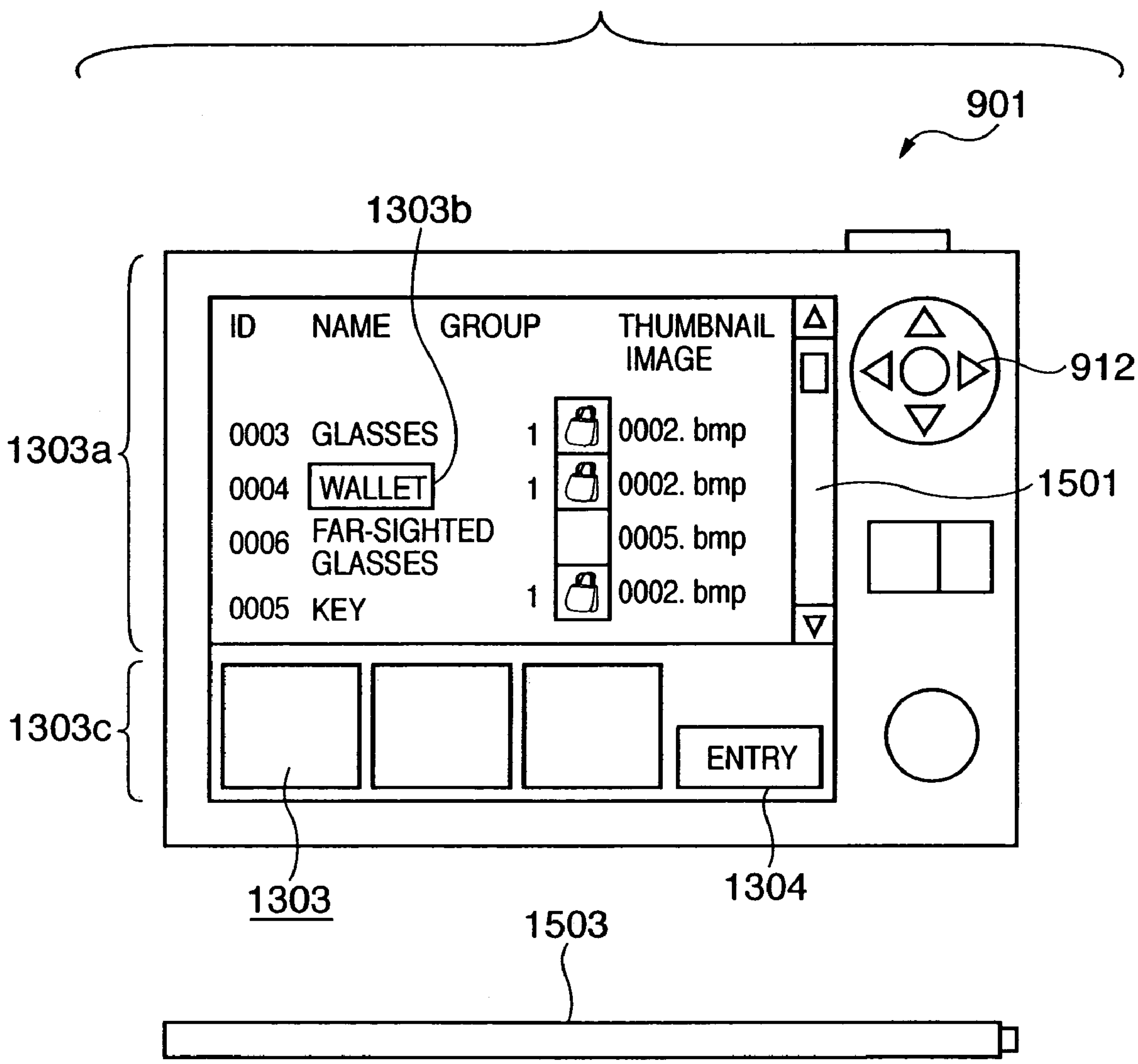
FIG. 15 shows an example of the attribute entry screen displayed on the mobile information processing terminal according to the first embodiment of the present invention.

FIG. 15 shows an example of the attribute entry screen displayed by the mobile information processing terminal according to the first embodiment of the present invention.

As shown in FIG. 15, the attribute entry screen 1303 comprises an entry screen 1303*a* displaying specified data in the ID table 8, an input area 1303*b* indicated by a cursor moved in a cell unit by the operation of the cursor key 912 on the entry screen 1303*a*, a pen input area 1303*c* for input of a character string in the input area 1303*b* by entering a character string using a stylus 1503, an entry button 1304 for entry of a character string input to the pen input area 1303*c* in the data memory 6, etc.

The display areas of the entry screen 1303*a* and the pen input area 1303*c* are fixed, and when the number of pieces of data displayed on the entry screen 1303*a* exceeds a predetermined value, a scroll bar 1501 is displayed at the right end on the screen.

[Second Receiving Process]

Figure 16:
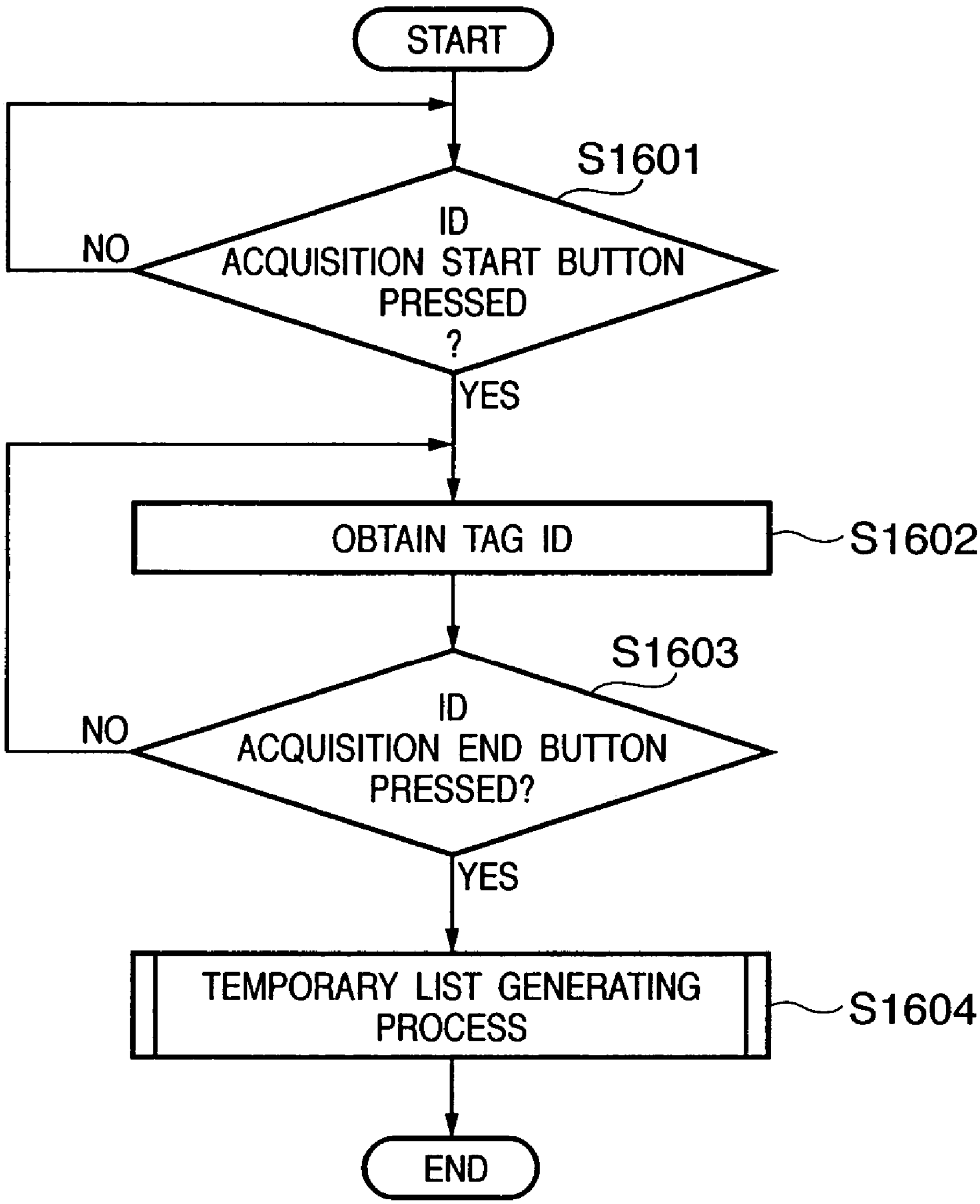
FIG. 16 is a flowchart showing in detail another receiving process performed by the mobile information processing terminal according to the first embodiment of the present invention.

FIG. 16 is a flowchart showing the detail of another receiving process performed by the mobile information processing terminal according to the first embodiment of the present invention.

As shown in FIG. 16, when the receiving process is activated, an ID acquisition start button (described later) is awaited (S1601). When the ID acquisition start button is pressed, the tag ID of the radio tag 903 is obtained (S1602). Then, an ID acquisition end button (described later) is awaited (S1603). When the ID acquisition end button is pressed, the temporary list generating process is activated (S1604), the temporary received ID list storing the obtained tag ID is generated, thereby terminating the receiving process.

Figure 17:
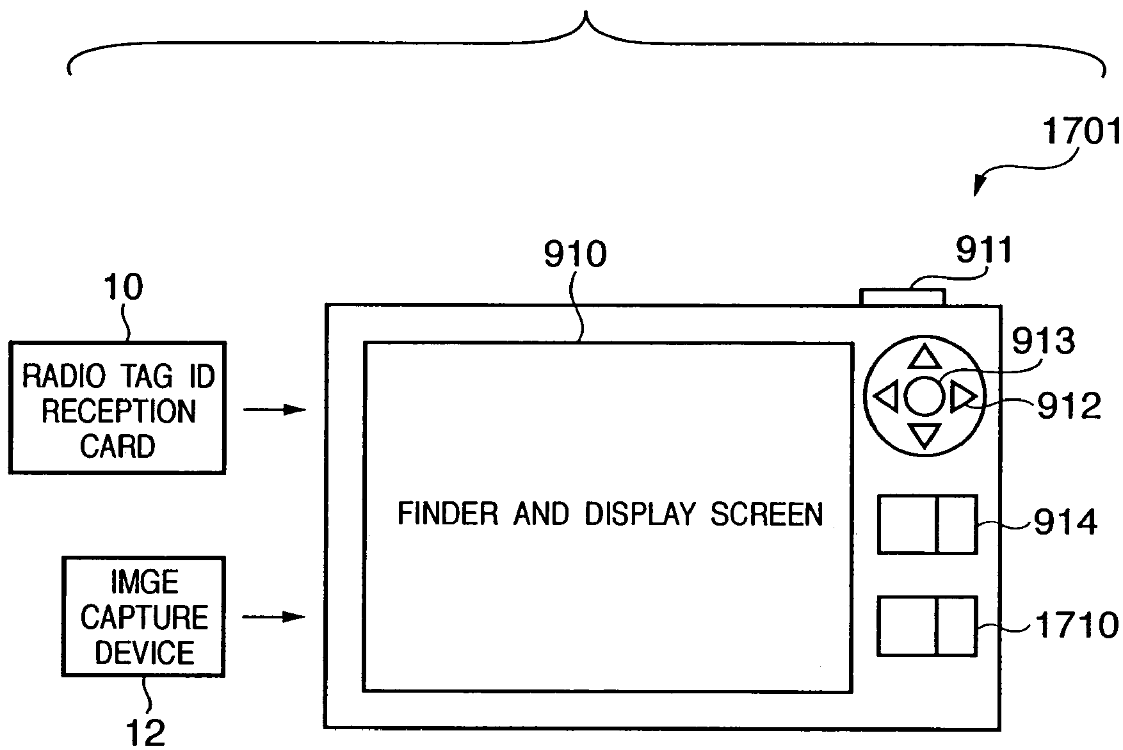
FIG. 17 shows the appearance of the mobile information processing terminal in the other receiving process shown in FIG. 16.

FIG. 17 shows the outline of the mobile information processing terminal corresponding to another receiving process shown in FIG. 16. In FIG. 17, the same portion also shown in FIGS. 1, 9A and 9B is assigned the same reference numeral, and the detailed explanation is omitted here.

A mobile information processing terminal 1701 shown in FIG. 17 comprises an ID acquisition start-end button 1710 instead of the communications button 915 of the mobile information processing terminal 901 shown in FIG. 9A.

[First Operation Example]

The first example of the operation of the mobile information processing terminal according to the first embodiment of the present invention is described below by referring to the attached drawings.

Assume that the mobile information processing terminal 901 shown in FIG. 9A is provided with the radio tag ID reception card 10 and the capture device 12, for example, as shown in FIG. 11A. Then, the mobile information processing terminal 901 is powered up to activate the system, the initializing process in step S202 shown in FIG. 2 is completed after the power-up, and it is determined in step S204 that the capture mode has been entered.

When the shutter button 911 shown in FIG. 11A is pressed, control is passed to step S206 shown in FIG. 2, and the image of the subject displayed on the finder display screen 910 is captured. Then, in step S207 shown in FIG. 2, the receiving process is activated, and the tag ID of the radio tag 903 is received. At this time, as shown in FIG. 11B, the tag ID of the radio tag 903 near the captured subject, that is, in the reception range from the position of the mobile information processing terminal 901 at the capturing time is obtained.

Thus, when the tag ID of the radio tag 903 is received, a received ID list is generated in step S302 shown in FIG. 3, the ID entry process is activated in step S208 shown in FIG. 2, and the process shown in FIG. 4 is performed. That is, if it is determined in step S401 shown in FIG. 4 that there are a plurality of received tag IDs, then a new group ID is determined in step S402, and a set of the received tag ID, the group ID, and the ID of the thumbnail image of the captured image is added to the ID table 8 in step S406.

[Second Operation Example]

Then, the second example of the operation of the mobile information processing terminal according to the first embodiment of the present invention is explained below by referring to the attached drawings.

In this example, as in the first example of the operation, it is assumed that the mobile information processing terminal 901 is powered up to activate the system, and it is determined that the capture mode is entered after the initializing process.

When the communications button 915 shown in FIG. 12A is pressed, control is passed to step S209 shown in FIG. 2, the receiving process is activated, and the tag ID of the radio tag 903 near the subject displayed on the finder display screen 910 is received. At this time, the article group 902 provided with the radio tag 903 is located near the subject, that is, in the bag 1200, in this case. Therefore, it is impossible to visually recognize the article group 902. However, since the article group 902 is in the reception range (displayed on the finder display screen 910) of the radio tag ID reception card 10, the tag ID of the radio tag 903 can be obtained.

As a result, the received ID display process is activated in step S210 shown in FIG. 2, and the data matching the tag ID of the received ID list is obtained from the data memory 6 by referring to the ID table 8 in step S602 shown in FIG. 6. Then, the data corresponding to the received tag ID, that is, the above-mentioned obtained data, is displayed as shown in FIG. 12B in step S603 shown in FIG. 6.

[Third Operation Example]

The third example of the operation of the mobile information processing terminal according to the first embodiment is explained below by referring to the attached drawings.

In this example, it is assumed that it is determined in step S204 that the display mode has been entered after the power-up and the initializing process.

In step S211 shown in FIG. 2, the selection screen 1301 shown in FIG. 13A is displayed. If the user selects the thumbnail image on the selection screen 1301 using the cursor key 912, and presses the determination button 913 and the shutter button 911 shown in FIG. 13B substantially at the same time, then the attribute entry process is activated in step S213 shown in FIG. 2, and the attribute entry screen 1303 as shown in FIG. 15 is displayed in step S501 shown in FIG. 5. The entry screen 1303*a* in the attribute entry screen 1303 shows as a list the data associated with the selected thumbnail image by obtaining the data from the data memory 6 by referring to the ID table 8. The data input on the attribute entry screen 1303 is stored in the data memory 6 by referring to the ID table 8.

When the attribute entry screen 1303 is displayed, the cursor (input area 1303*b*) is set at the start of the entry screen 1303*a* in step S502 shown in FIG. 5, and the cursor (input area 1303*b*) can be moved by the cursor key 912. If the user inputs data to the pen input area 1303*c* shown in FIG. 15 using the stylus 1503, and presses the entry button 1304 on the attribute entry screen 1303, then the character string input in the pen input area 1303*c* is stored in the data memory 6 and displayed on the input area 1303*b* in step S507 shown in FIG. 5.

[Fourth Operation Example]

The fourth example of the operation of the mobile information processing terminal according to the first embodiment is explained below by referring to the attached drawings.

In this example, as in the third operation example, it is assumed that it is determined in step S204 that the display mode has been entered after the power-up and the initializing process.

In step S211 shown in FIG. 2, the selection screen 1301 shown in FIG. 14A is displayed. If the user selects the thumbnail image on the selection screen 1301 using the cursor key 912, and presses the communications button 915 shown in FIG. 14B, then the receiving process is activated in step S214 shown in FIG. 2, and a received ID list of received tag IDs is generated in step S302 shown in FIG. 3. Then, the receiving process is activated in step S215 shown in FIG. 2, and the data corresponding to the selected thumbnail image is obtained from the data memory 6 by referring to the ID table 8, thereby generating a selection list in step S701 shown in FIG. 7.

In the processes in and after step S702 shown in FIG. 7, the tag IDs in the selection list and the received ID list are compared one by one with each other. If they match each other, the counter value is incremented by 1 in step S706. If a tag ID of the selection list does not match any tag ID of the received ID list, then the tag ID of the selection list is stored in step S708 in the detection failure buffer. Thus, when the comparing process is completed on all tag IDs, the number of tag IDs of the selection list, the number of tag IDs of the reception list, and the counter value are checked in step S709. If they match one another, "True" is returned, thereby terminating the process.

In the example shown in FIG. 14C, all tag IDs match, and "True" is returned, and the data of the data memory 6 corresponding to the detected tag ID and the message indicating that all tag IDs have been detected are displayed.

[Fifth Operation Example]

The fifth example of the operation of the mobile information processing terminal according to the first embodiment is described below by referring to the attached drawings.

This is an example of the operation performed with the mobile information processing terminal 1701 shown in FIG. 17 provided with the radio tag ID reception card 10 and the capture device 12. In this example, it is assumed that the capture mode is determined to be entered in step S204 after the power-up and the initializing process.

When the shutter button 911 shown in FIG. 17 is pressed, the image of the subject displayed on the finder display screen 910 is captured. Then, after the receiving process is activated in step S207 shown in FIG. 2 and it is determined in step S1601 shown in FIG. 16 that the ID acquisition start button 1710 has been pressed, the tag. ID of the radio tag 903 is obtained in step S1602 shown in. FIG. 16 until it is determined in step S1603 that the ID acquisition end button 1710 has been pressed. The method for obtaining the tag ID at this time is, for example, obtaining a tag ID received after the ID acquisition start button 1710 has been pressed until the ID acquisition end button 1710 is pressed, etc. The user can obtain a tag ID received by making the mobile information processing terminal 1701 approaching each article of the article group 902 after the ID acquisition start button 1710 has been pressed until the ID acquisition end button 1710 is pressed.

When the tag ID is received as described above, the received ID list is generated in step S302 shown in FIG. 3, the ID entry process is activated, and then the process shown in FIG. 4 is performed. Practically, when there are a plurality of received tag IDs, an ID of a new group is generated by referring to the ID table 8 in step S402 shown in FIG. 4, and a set of the received tag ID, the generated group ID, and the ID of the thumbnail image of the captured image is added to the ID table 8 in step S406. It is obvious that the thumbnail image is associated with the thumbnail image ID list 1003 shown in FIG. 10A and stored in the file DB 7.

As described above, in the first embodiment of the present invention, a plurality of articles assigned the radio tags 903 having different tag IDs are captured as an image by the capture device 12, the tag IDs of the radio tags 903 assigned to a plurality of articles are received using the radio tag ID reception card 10, the group ID indicating that the plurality of received tag IDs belong to the same group is added as an attribute to each of the received tag IDs, and the added group ID is associated with the captured image (thumbnail image) and stored in the data memory 6. Therefore, tag IDs corresponding to a plurality of articles can be entered without inputting in advance the tag IDs corresponding to the plurality of articles, and the plurality of articles can be easily grouped. Thus, general articles can be easily and correctly managed.

Additionally, a plurality of thumbnail images of an image captured by the capture device 12 are displayed to allow a user to select one of the plurality of thumbnail images, all tag IDs associated with the thumbnail image selected by the user are extracted from the data memory 6, all the extracted tag IDs are compared with the tag IDs newly received by the radio tag ID reception card 10, and the comparison (matching) result is transmitted to the user. Therefore, the articles corresponding to the newly received tag IDs can be easily checked as to whether or not they have been entered in the data memory 6. Thus, for example, a combination of a personal belonging such as a handbag, etc. and the contents is entered in the data memory 6 so that it can be checked as described above whether or not necessary things are included in the handbag without opening the handbag, and a notification of a check result can be given to the user by light, tone, message display, etc., thereby applying the technology in preventing necessary things from being left behind.

Similarly, it can be checked whether or not there is an article provided with a radio tag in a specified place (room, bag, etc.) while the user is traveling, thereby applying the technology in detecting a lost article.

Furthermore, in managing a factory, a radio tag can be assigned to each part of a complete article so that the tag ID of the radio tag assigned to each part can be entered in the data memory 6 with the tag ID associated with a picture of the complete article, thereby managing the article. For example, when parts are kept in a package, they can be checked whether or not necessary parts are correctly prepared.

The above-mentioned example of the present invention is an application to a mobile information processing terminal, but the present invention is not limited to the application to a mobile information processing terminal, but can also be applied to a fixed or portable information processing device such as a desktop computer, a notebook-sized personal computer, etc. Furthermore, the radio tag can be used with a built-in battery, or can be a tag having no built-in battery.

According to the first embodiment, since additional information can be added later to entered attribute information or unnecessary information can be deleted from the entered information, an article to be managed can be easily amended by adding, changing, and deleting information.

[Second Embodiment]

[Configuration of the Apparatus]

Figure 18A:
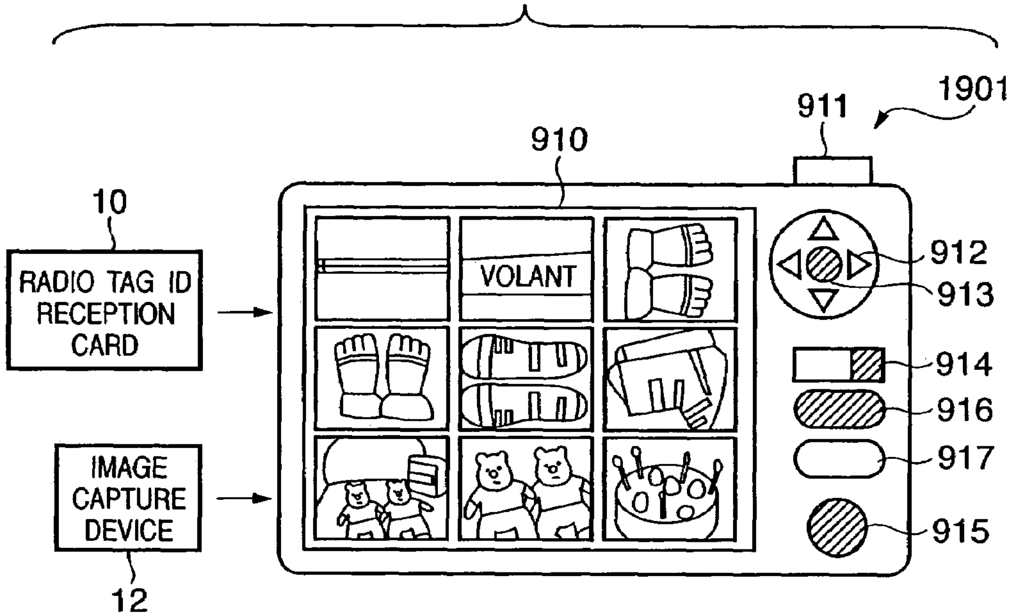
FIG. 18A shows the appearance of the information processing device according to the second embodiment of the present invention.

FIG. 18A shows the outline of the information processing device according to the second embodiment.

As shown in FIG. 18A, an information processing device 1901 comprises the display screen 910, and hardware buttons including the shutter button 911 for a capturing operation, the cursor key 912 for selection, the determination button 913, the capture-display mode switch button 914, a group button 916 for group edition in performing a grouping process and a group releasing process, an attribute entry button 917 for addition of an attribute to image data, and the communications button 915. As shown in FIG. 18A, the display screen 910 can index-display a plurality of captured images so that the user can select each of the index-displayed images using the cursor key 912.

Figure 18B:
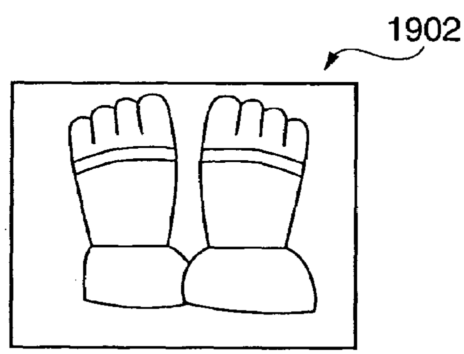
FIGS. 18B and 18C show an example of an image captured by the information processing device.

FIG. 18B shows an example of an image captured by the information processing device 1901, and a subject is assigned a radio tag. In this case, a tag ID of the radio tag is obtained by the radio tag ID reception card 10 when an image is captured, and a captured image 1902 and a tag ID associated with the captured image 1902 are stored in the data memory 6.

Figure 18C:
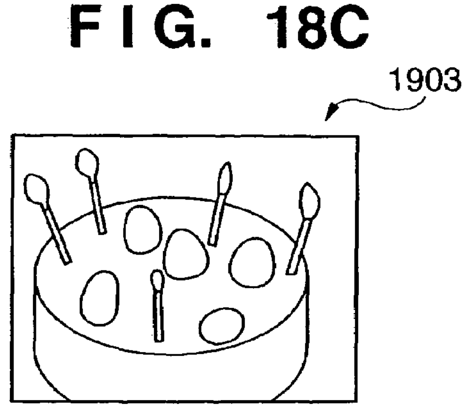

FIG. 18C shows an example of an image captured by the information processing device 1901, and a subject is not assigned a radio tag. In this case, since no tag ID is obtained when an image is captured, a captured image 1903 is stored in the data memory 6 with a tag ID to be associated with the captured image 1903 defined as null.

[Grouping Process]

Figure 19:
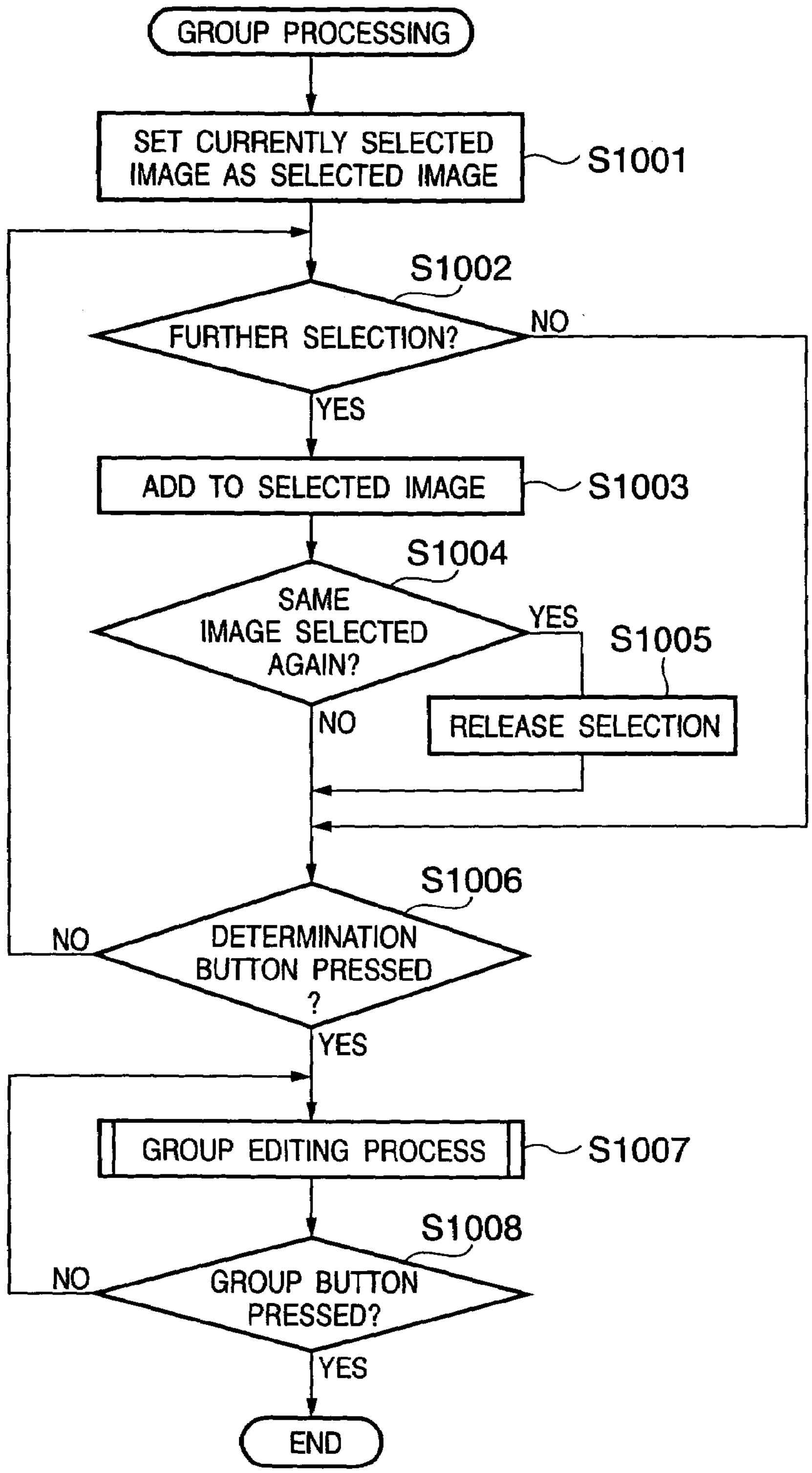
FIG. 19 is a flowchart showing in detail the grouping process performed by the information processing device according to the second embodiment of the present invention.

FIG. 19 is a flowchart showing in detail a grouping process performed by the information processing device according to the second embodiment of the present invention, and corresponds to the grouping process (S217) shown in FIG. 2.

As shown in FIG. 19, when the grouping process is activated, the currently selected images are set as selected images (S1001), and it is determined whether or not any image has been further selected (S1002). If any image has been further selected, it is added to the selected images (S1003). Then, it is determined whether or not any image set as a selected image has further been selected as a selected image (S1004). If YES, then the image is deleted from the selected images (S1005). Then, the processes from step S1002 to step S1005 are repeated until the determination button 913 is pressed by the determination in step S1006.

If the determination button 913 is pressed, then the group editing process is activated (S1007), the group editing process is repeated until the group button 916 is pressed by the determination in step S1008, and the grouping process terminates when the group button 916 is pressed.

Group Editing Process

Figure 20:
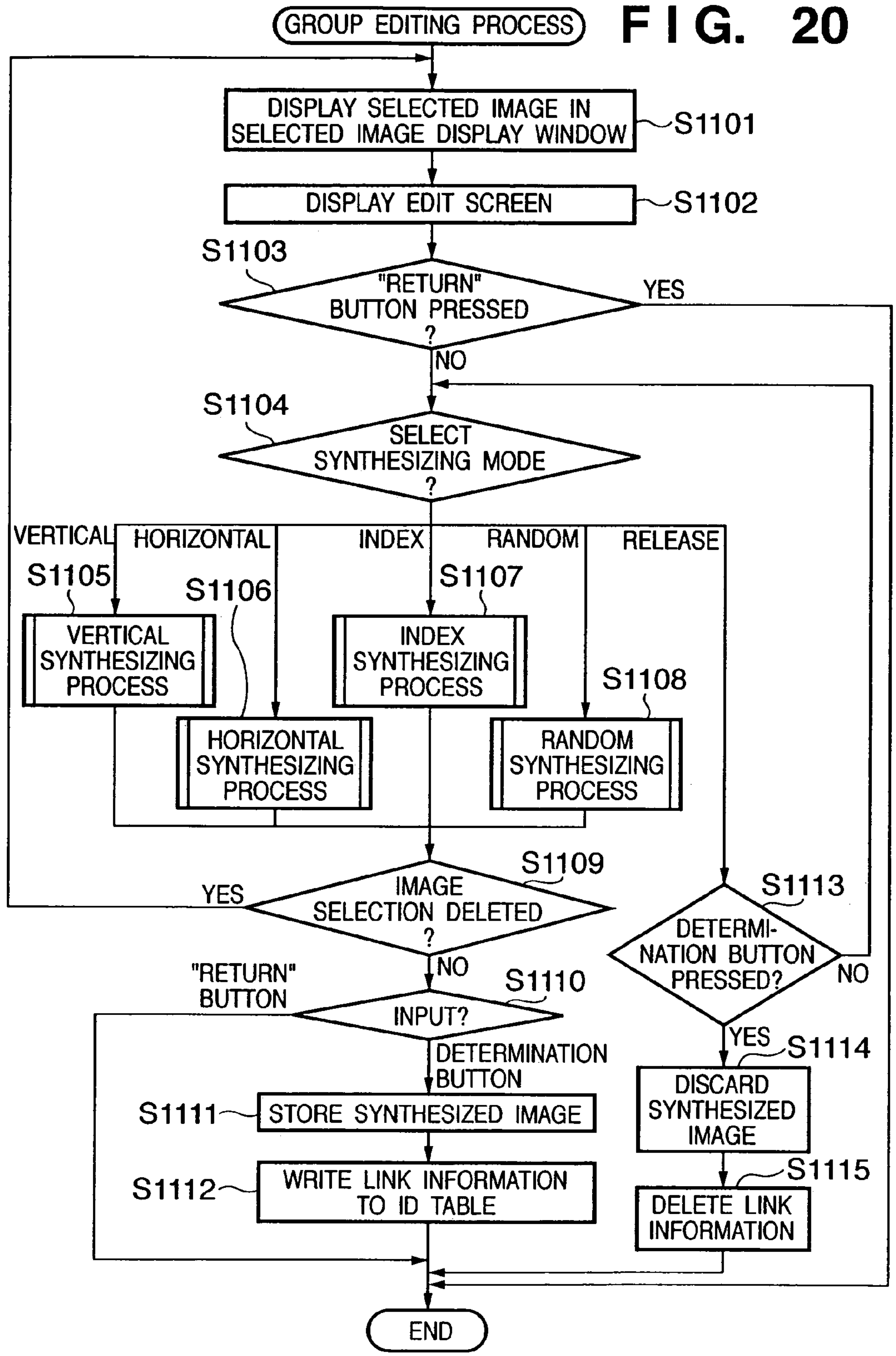
FIG. 20 is a flowchart showing in detail the group editing process performed by the information processing device according to the second embodiment of the present invention.

FIG. 20 is a flowchart showing in detail the group editing process performed by the information processing device according to the second embodiment of the present invention.

Figure 21:
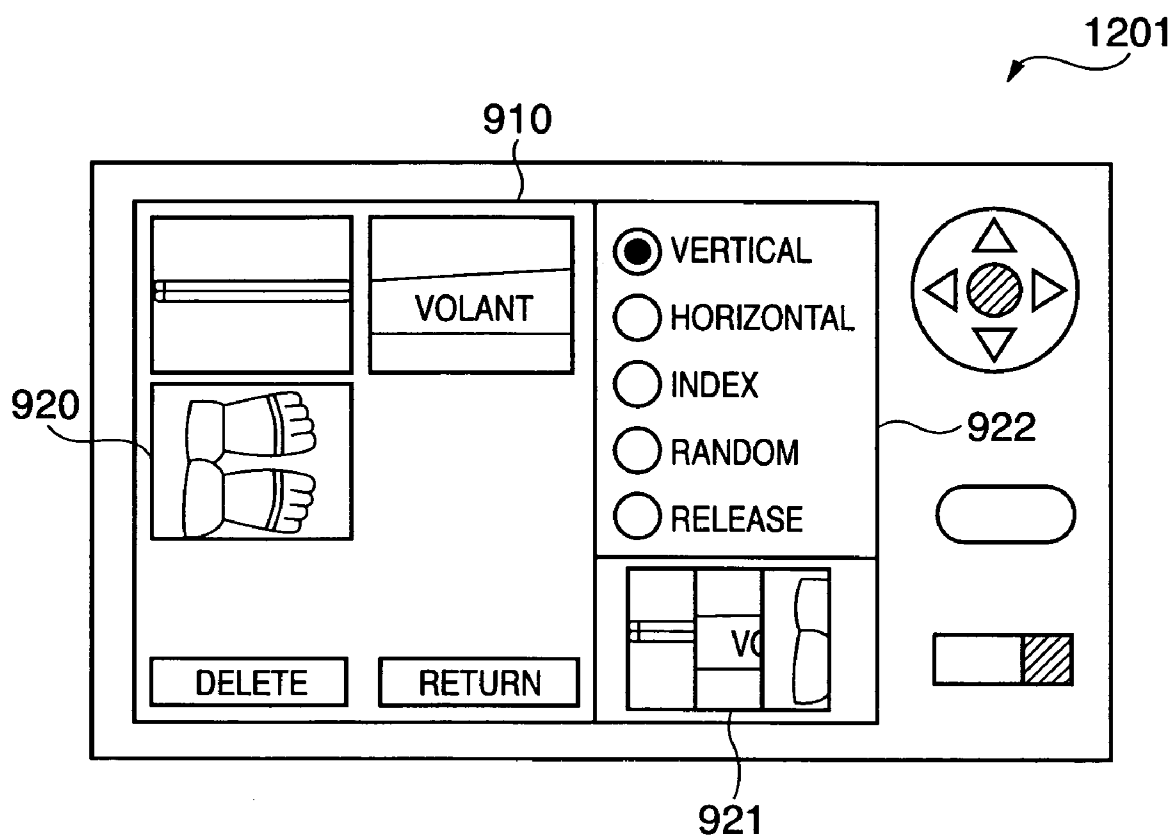
FIG. 21 shows an example of an edit screen.
Figure 22:
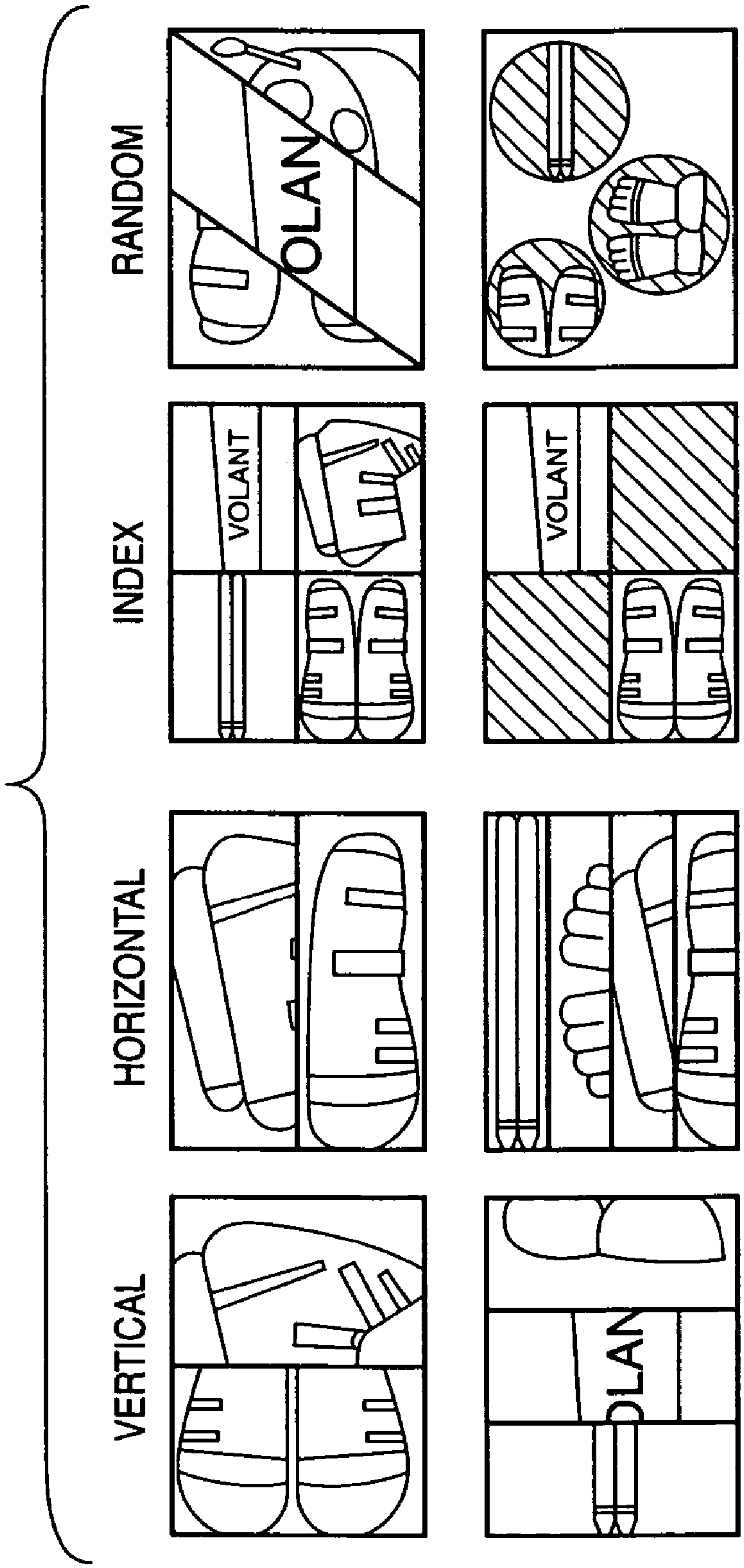
FIG. 22 is an explanatory view of the synthesizing process.

As shown in FIG. 20, when the group editing process is activated, a selected image is displayed in a selected image display window 920 shown in FIG. 21 (S1101), and an edit screen as shown in FIG. 21 is displayed (S1102). The edit screen can be a synthesizing mode menu 922 and a synthesizing sample display window 921 which can be selected by the cursor key 912.

Then, it is determined whether or not a "return" button which is a software key displayed below the selected image display window 920 has been pressed (S1103). If it has been pressed, the group editing process is terminated without performing the subsequent processes. If it has not been pressed, the processes in and after step S1104 are performed.

If the synthesizing mode "vertical" is selected in step S1104, a vertical synthesizing process is activated (S1105), each selected image is vertically divided depending on the number of selected images, and a synthesized image is generated by synthesizing a divided image of a selected image.

If the synthesizing mode "horizontal" is selected in step S1104, a horizontal synthesizing process is activated (S1106), each selected image is horizontally divided depending on the number of selected images, and a synthesized image is generated by synthesizing a divided image of a selected image.

If the synthesizing mode "index" is selected in step S1104, an index synthesizing process is activated (S1107), each selected image is reduced depending on the number of selected images, and a synthesized image is generated by equally synthesizing a reduced image. In this case, since a selected image is equally synthesized, there can be an area containing no image in a synthesized image.

If a synthesizing mode "random" is selected in step S1104, a random synthesizing process is activated (S1108), and a synthesized image is generated by assigning each selected image to an irregular partial area in a method programmed in advance. The random synthesizing process can be performed by, for example, combining images reduced or cut out circularly or into irregular polygons, or by overlapping images cut out into strips having a predetermined pixel width.

If a synthesizing mode "release" is selected in step S1104, and the determination button 913 is pressed in step S1113, then the synthesized image is discarded (S1114), and the link information about the group is deleted from the data memory 6 (S1115), thereby terminating the group editing process. If a button other than the determination button 913 is pressed in step S1113, then control is passed to step S1104, and the process of the selected synthesizing mode is performed.

If any synthesizing process in steps S1105 to S1108 is completed, a synthesized image is displayed in the synthesizing sample display window 921, and a deletion button is pressed with any image in the selected image display window 920 selected, then control is returned to step S1101, a selected image excluding a deleted image is displayed, and the subsequent processes are performed. If any image is not selected in the selected image display window 920, the deletion button is disabled. An image deleted from the selected image display window 920 is not only deleted from a target to be edited, but also deleted from a list of currently selected images.

Then, if a "return" button is pressed in step S1110, the group editing process is terminated without performing the subsequent processes. If the determination button 913 is pressed, the synthesized image displayed in the synthesizing sample display window 921 is stored in the data memory 6 (S1111), the link information indicating the relationship between the synthesized image and the corresponding image in the data memory 6 is written to the ID table 8, and the group editing process is terminated.

Grouping

Figure 23A:
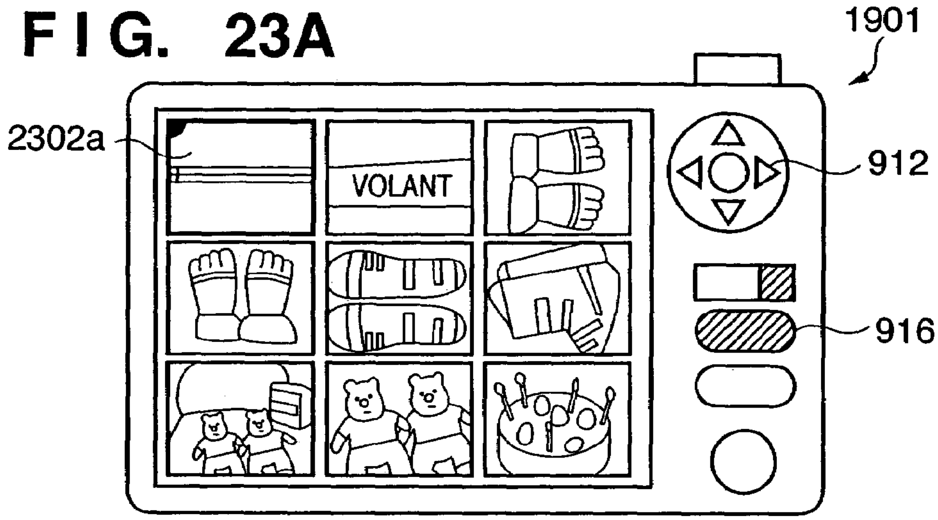
FIGS. 23A to 23D show an example of a grouping operation performed by the information processing device according to the second embodiment of the present invention.
Figure 23B:
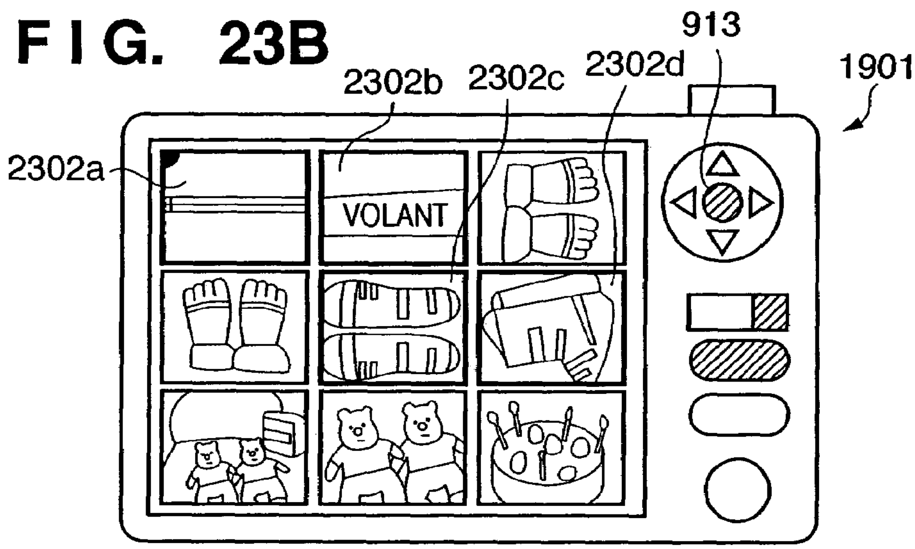
Figure 23C:
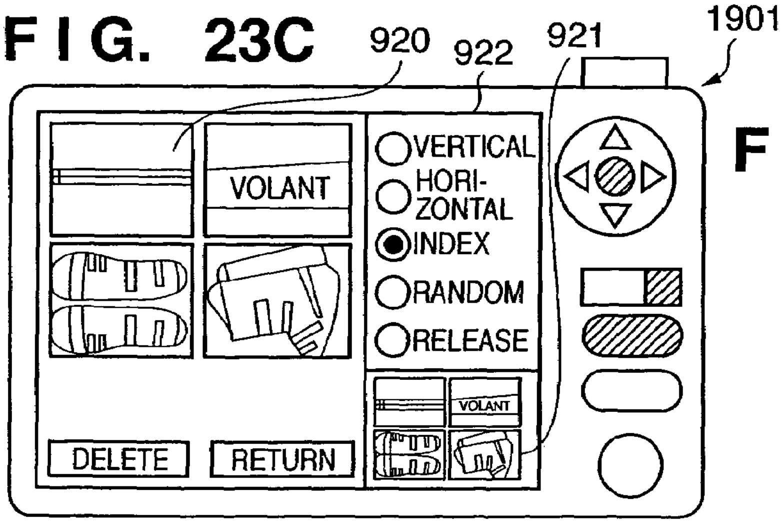

FIGS. 23A to 23C show examples of a grouping operation performed by the information processing device 1901 according to the second embodiment of the present invention.

As shown in FIG. 23A, when any image being displayed on the display screen 910 is selected, the selection state of the image is displayed by enclosing it by a bold frame, etc. In FIG. 23A, the image indicated by a symbol 2302*a* is the first selected image.

Figure 23D:
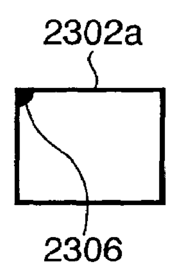

When the group button 916 is pressed, the second and subsequent images can be selected. As shown in FIG. 23B, second to fourth selected images 2302*b* to 2303*d* are added to the selected images. At this time, the first selected image 2302*a* is displayed with an identification drawing 2306 for discrimination from an added selected image as shown in FIG. 23D.

When the determination button 913 is then pressed, the group editing screen as shown in FIG. 23C is displayed, and the group editing process is performed on the screen. In FIG. 23C, four selected images are displayed in the selected image display window 920, and "index" is selected on the synthesizing mode menu 922. As a result, a synthesized sample image processed in the index synthesizing process is displayed in the synthesizing sample display window 921.

Another Example of Grouping Operations

Figure 24A:
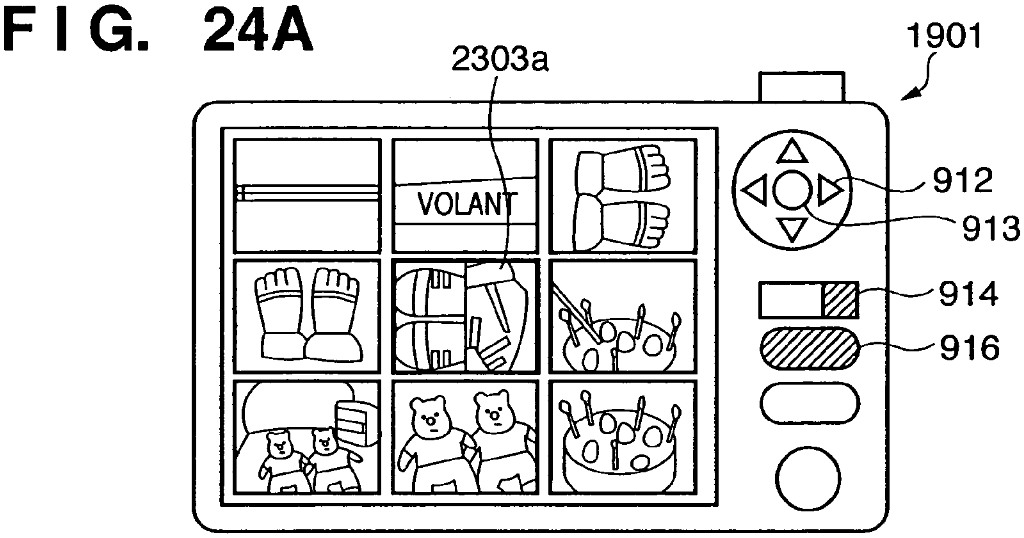
FIGS. 24A to 24C show another example of a grouping operation performed by the information processing device according to the second embodiment of the present invention.
Figure 24B:
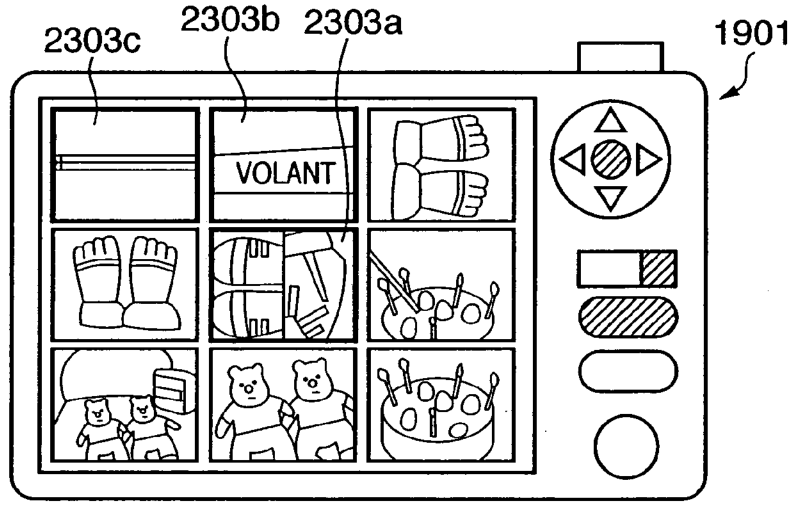
Figure 24C:
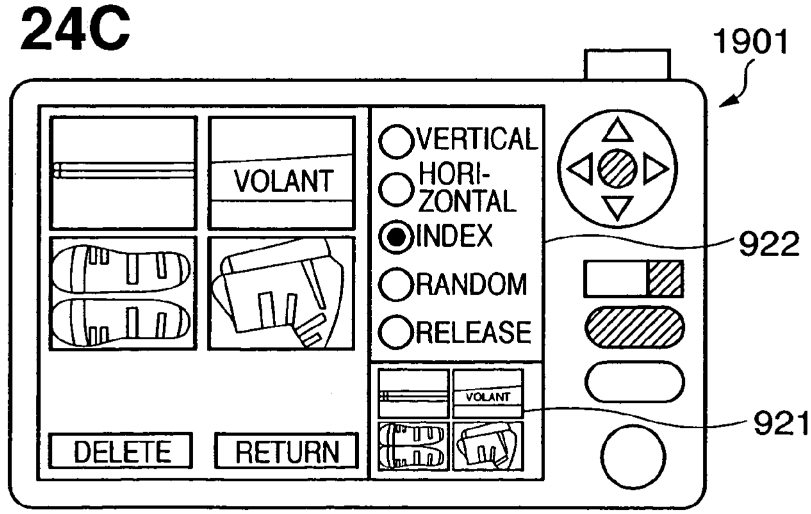

FIGS. 24A to 24C show another example of a grouping operation performed by the information processing device 1901 according to the second embodiment of the present invention.

As shown in FIG. 24A, it is assumed that an image 2303*a* selected from the image being displayed on the display screen 910 is an already grouped synthesized image. At this time, as in FIG. 23B, the group button 916 is first pressed to select additional images 2303*b* and 2303*c* (FIG. 24B), and then the determination button 913 is pressed. As a result, as shown in FIG. 24C, four images, that is, the images forming part of the first selected image 2303*a* which is a synthesized image, and the images 2303*b* and 2303*c* additionally selected in FIG. 24B, are displayed on the group editing screen. In this example, the index synthesizing process is selected, and a synthesized image obtained by performing the index synthesizing process on the four images is displayed on the synthesized sample display window 921.

Group Releasing Operation

Figure 25A:
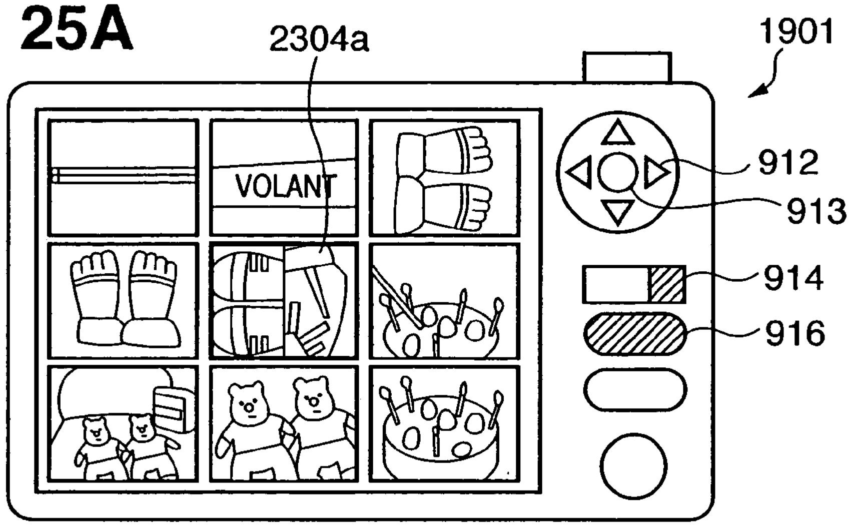
FIGS. 25A to 25C show an example of a group releasing operation performed by the information processing device according to the second embodiment of the present invention.
Figure 25B:
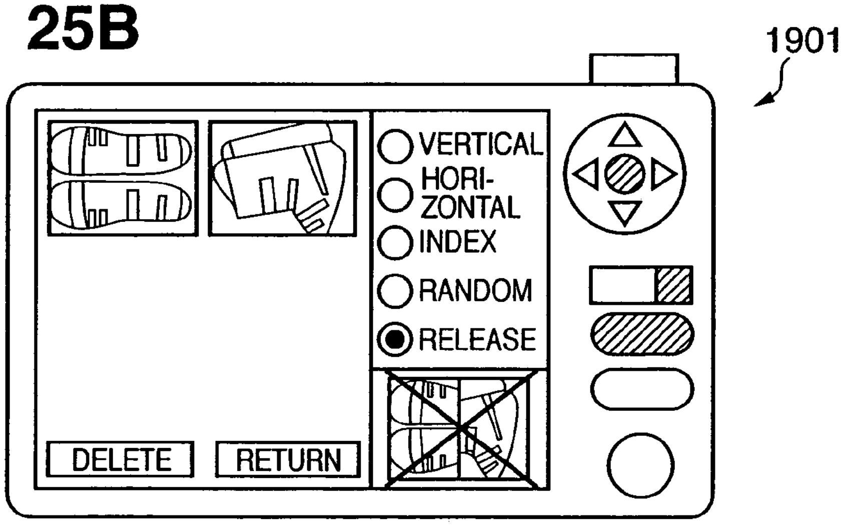
Figure 25C:
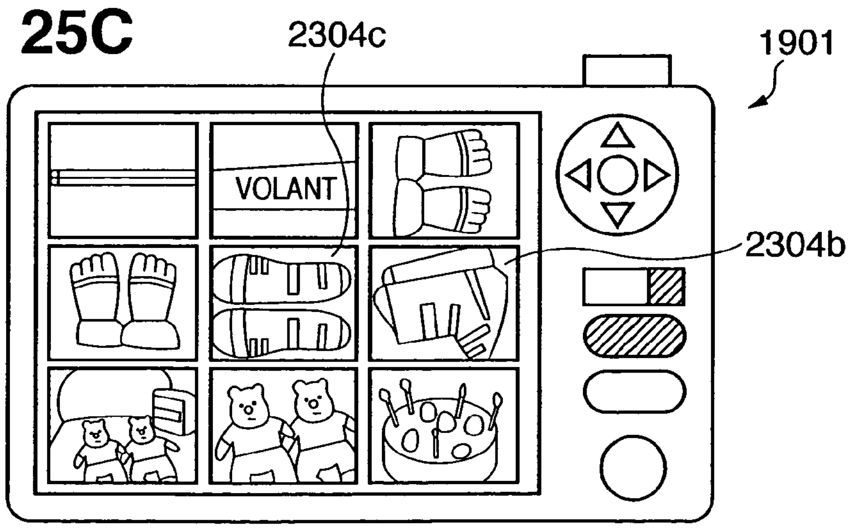

FIGS. 25A to 25C show an example of a group releasing operation performed by the information processing device 1901 according to the second embodiment of the present invention.

As shown in FIG. 25A, it is assumed that an image 304*a* selected from the image being displayed on the display screen 910 is an already grouped synthesized image. At this time, when the group button 916 is pressed, the group editing screen is displayed as shown in FIG. 25B, and the images forming the selected image 2304*a* which is a synthesized image are displayed in the selected image display window 920. At this time, if the determination button 913 is pressed with "release" selected on the synthesizing mode menu 922, then the 2304*a* is discarded, and the corresponding link information in the ID table 8 is deleted, thereby terminating the edit screen. As a result, as shown in FIG. 25C, the synthesized image 2304*a* is deleted, and the two images, that is, the group-released images 2304*b* and 2304*c*, are displayed on the display screen.

Another Example of Group Releasing Operation

Figure 26A:
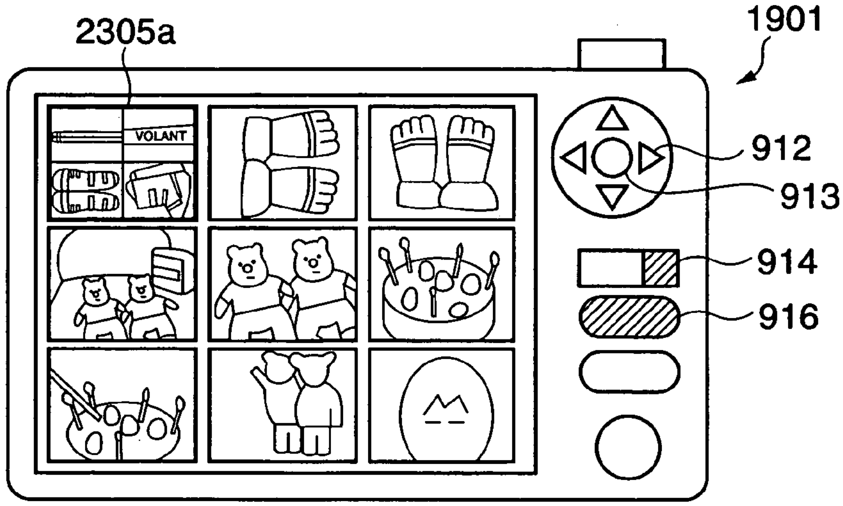
FIGS. 26A to 26C show another example of a group releasing operation performed by the information processing device according to the second embodiment of the present invention.
Figure 26B:
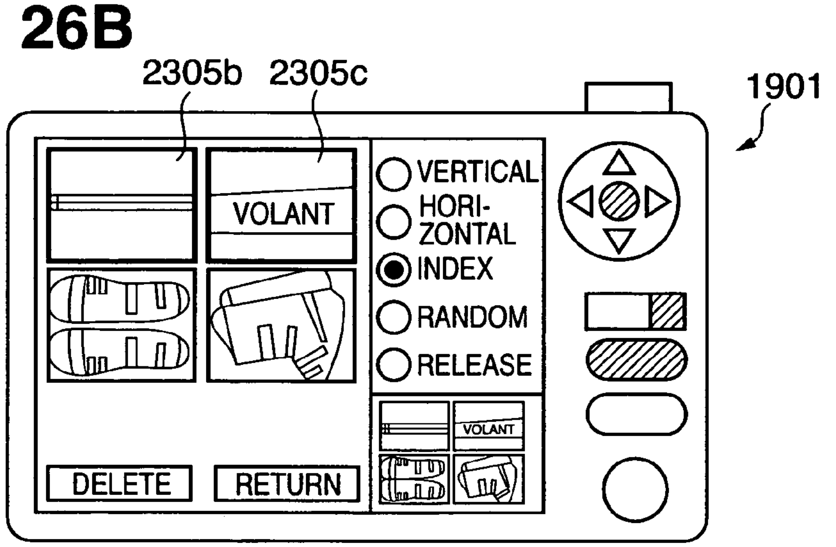
Figure 26C:
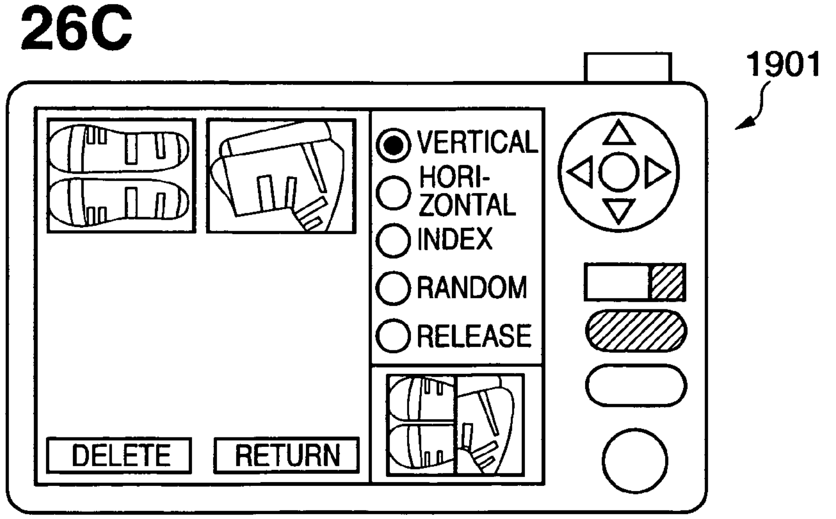

FIGS. 26A to 26C show another example (partial group releasing operation) of a group releasing operation performed by the information processing device 1901 according to the second embodiment of the present invention.

As shown in FIG. 26A, it is assumed that an image 2305*a* selected from the image being displayed on the display screen 910 is an already grouped synthesized image. At this time, when the group button 916 is pressed, the group editing screen is displayed as shown in FIG. 26B, and the images forming the selected image 2305*a* which is a synthesized image are displayed in the selected image display window 920. At this time, arbitrary images (images 2305*b* and 2305*c* in FIG. 26B) are selected from the images displayed in the selected image display window 920 are selected, and the deletion button is pressed. As a result, as shown in FIG. 26C, the images selected from the selected image display window 920 are deleted. If the determination button 913 is pressed, as shown in FIG. 26C, the remaining images excluding the deleted images 2305*b* and 2305*c* are grouped according to the selection on the synthesizing mode menu 922, and a synthesized image is generated. Although not shown in the attached drawings, when control is returned to the display screen 910, the images 2305*b* and 2305*c* deleted from the group (group-released) are displayed as individual images. It is obvious that the remaining image group (images not group-released) is defined a group and the link information is written to the ID table 8.

[Structure of Database]

Figure 27:
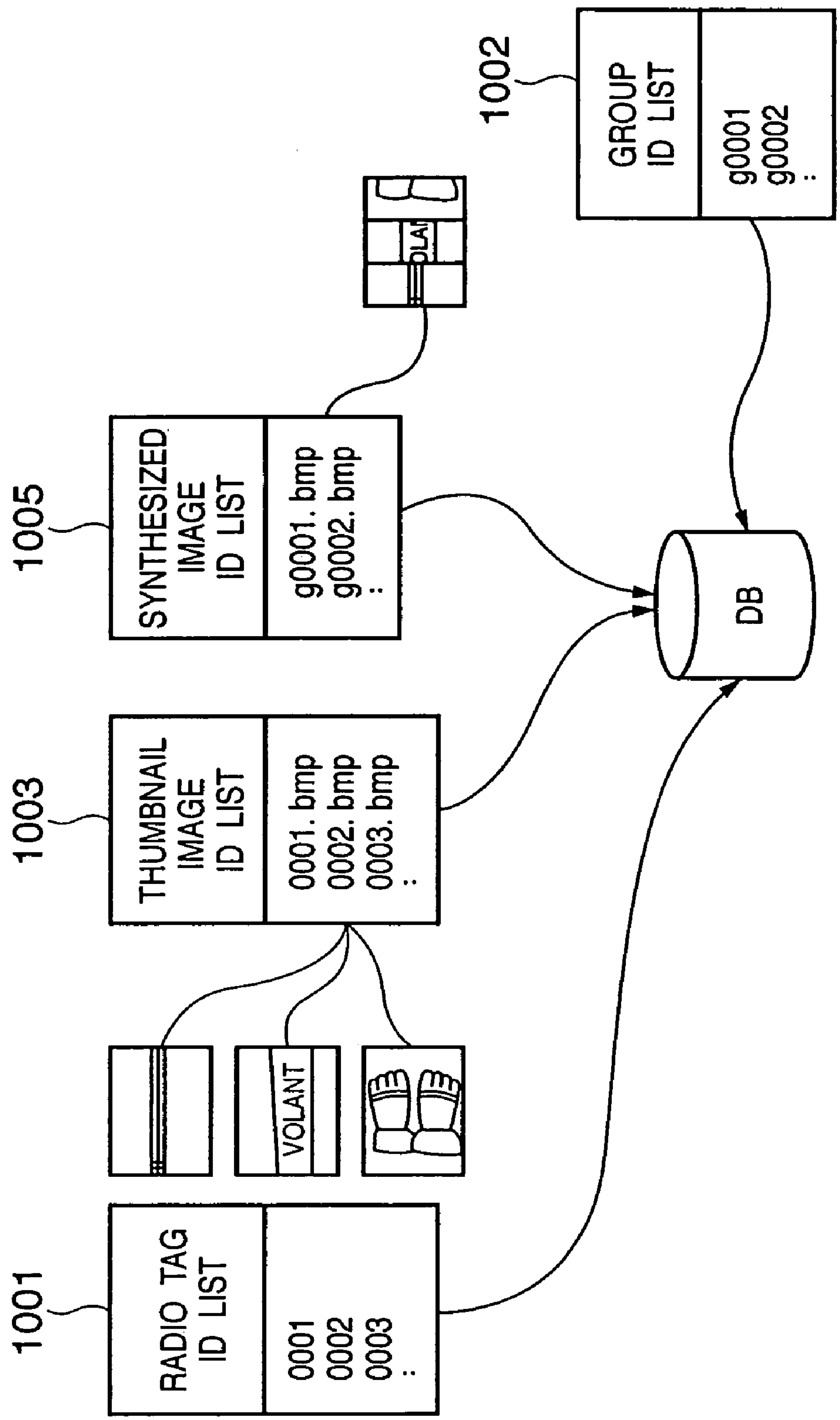
FIG. 27 shows the structure of the database of the information processing device according to the second embodiment of the present invention.

FIG. 27 shows the structure of a database of the information processing device 1901 according to the second embodiment of the present invention. As shown in FIG. 27, the database of the information processing device 1901 includes a synthesized image list 1005 for a typical example. Other lists are similar as shown in FIG. 10A, and the detailed explanation is omitted here. As described above, the ID of each image forming the synthesized image entered in the synthesized image list 1005 is entered in the ID table 8. Furthermore, each synthesized image is associated one to one with the group ID list 1002. For example, it is assumed that they have the same IDs.

As described above, according to the second embodiment, it is possible to arrange and manage a large amount of data in a database using an image as an index. That is, it is not necessary to enter each article of a large number of general articles in a database, but an article can be easily entered in a database using a tag ID of a radio tag, and common attribute information among captured images can be simultaneously assigned. Therefore, articles can be easily grouped.

Furthermore, according to the second embodiment, since attribute information can be added or deleted later, articles to be managed can be easily added, changed, or deleted.

It is also possible to arrange images and easily detect related image group by selecting, grouping, and managing a plurality of related or arbitrarily related images, and setting a typical thumbnail image to display the typical thumbnail image only. However, to confirm the contents of a plurality of grouped images, it is necessary to once develop each of the grouped images. Furthermore, a typical thumbnail image is a single image, and it is hard to predict a grouped image from the typical thumbnail image.

In this connection, in the second embodiment, a plurality of arbitrary images entered in a database can be grouped, and a synthesized image with which an image forming part of a group can be predicted is generated. Thus, it is easy to retrieve an image forming part of a group, and each time a change is made to a group, a new synthesized image is generated and the data is updated, thereby realizing easier data management.

[Third Embodiment]

The third embodiment of the article management according to the present invention is described below. In the third embodiment of the present invention, the configurations similar to those of the first and second embodiments are assigned the same reference numerals, and the detailed explanation is omitted here.

[System Configuration]

Figure 28:
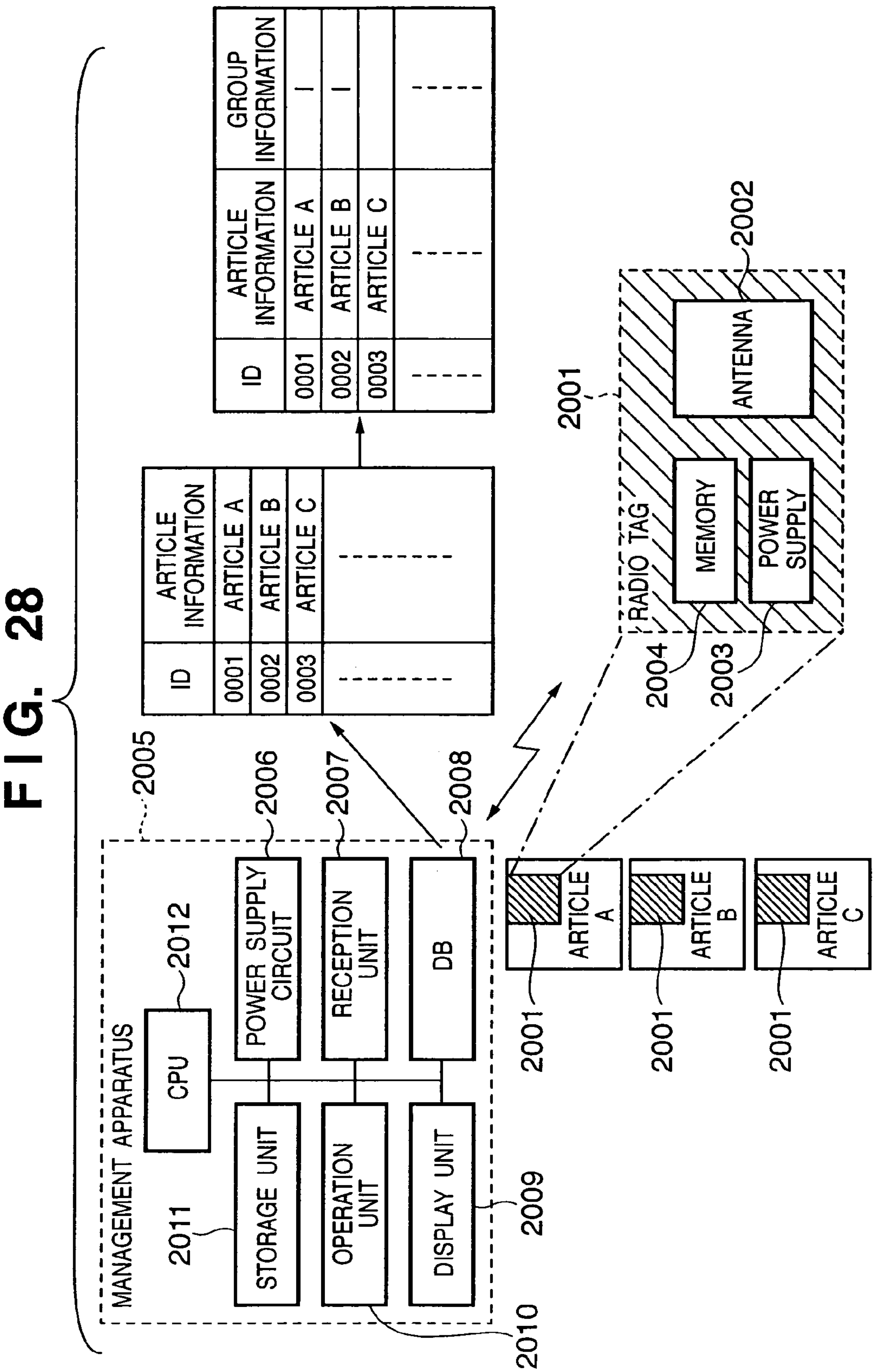
FIG. 28 is a block diagram showing the configuration of the article management system according to the third embodiment of the present invention.

FIG. 28 is a block diagram showing the configuration of the article management system according to the third embodiment of the present invention.

In FIG. 28, a radio tag 2001 provided for each of the articles A, B, C, . . . comprises an antenna 2002, a power supply unit 2003 for supplying power to each circuit in the radio tag 2001 by the power received through the antenna 2002, and memory 2004 storing ID information to be transmitted through the antenna 2002. The radio tag 2001 corresponds to the radio communications device display the present invention.

A management apparatus 2005 receives a tag ID from the radio tag 2001, and manages each article. The management apparatus 2005 comprises a power supply circuit 2006 for supplying power to the radio tag 2001, a reception unit 2007 for receiving a tag ID from the radio tag 2001, a database (DB) 2008 for storing a tag ID and article information (merchandise name, etc.) which are one to one associated with each other, a display unit 2009 for displaying information extracted from the DB 2008 based on the tag ID received from the radio tag 2001, an operation unit 2010 for use by an operator in operating the management apparatus 2005, a storage unit 2011 for storing information, etc. edited according to the ID information stored in the DB 2008, and a CPU 2012 for controlling the entire management apparatus 2005. It is desired that the storage unit 2011 is non-volatile memory such as battery-backed RAM, etc. Furthermore, the storage unit 2011 and the DB 2008 can be assigned to non-volatile memory such as a hard disk, etc.

[Operation of System]

Figure 29:
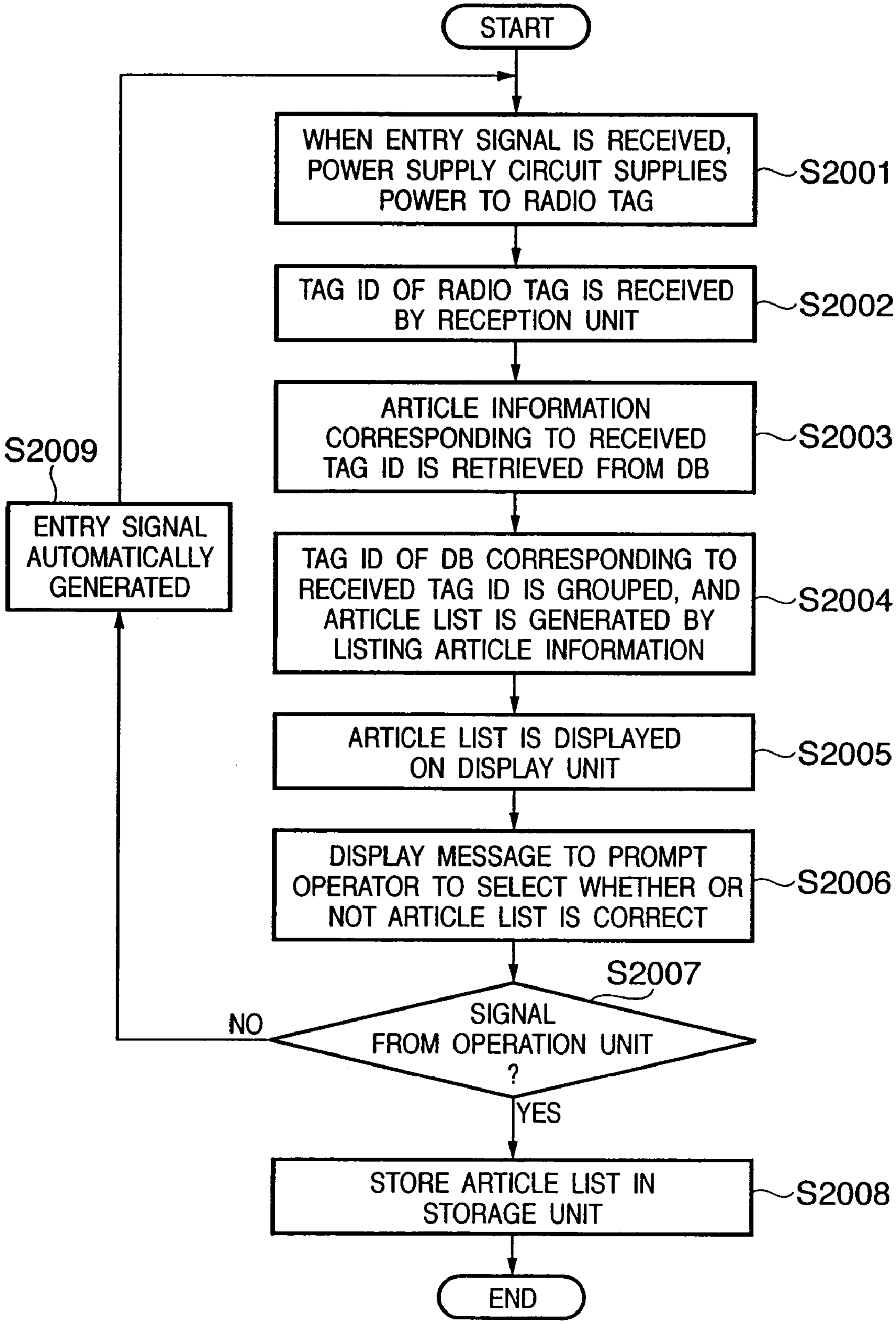
FIG. 29 is a flowchart for explanation of the operation of the article management system according to the third embodiment of the present invention.

FIG. 29 is a flowchart for explanation of the operation of the article management system according to the third embodiment of the present invention, and shows the process performed by the CPU 2012 of the management apparatus 2005.

When the CPU 2012 receives an entry signal from the operation unit 2010, it supplies power to a plurality of radio tags 2001 from the power supply circuit (S2001). When each radio tag 2001 in a predetermined range from the management apparatus 2005 receives power, it transmits a tag ID. Therefore, the CPU 2012 receives tags ID from a plurality of radio tags 2001 through the reception unit 2007 (S2002).

The CPU 2012 compares the received tag ID with the data of the DB 2008, and retrieves article information about the tag ID matching the received tag ID (S2003). Then, the group information is added to the tag ID in the DB 2008 matching the received tag ID, the resultant data is temporarily stored in the storage unit 2011, an article list containing the article information is generated according to the article information retrieved in step S2003 (S2004), and the generated article list is displayed on the display unit 2009 (S2005). At this time, the CPU 2012 displays on the display unit 2009 a message asking the operator whether or not the articles to be entered are described in the article list without excess or shortage (S2006).

After displaying the message, the CPU 2012 receives a YES signal or a NO signal from the operation unit 2010 operated by the operator (S2007). If a YES signal is received, list information is generated with a tag ID, corresponding group information, and article information associated with one another, and is stored in the storage unit 2011 (S2008). That is, the list information containing the article information corresponding to the tag ID of the radio tag 2001 received by the reception unit 2007 is generated. When there are a plurality of tag IDs received, plural pieces of article information are listed, and the plural pieces of information are grouped as list information, and stored in the storage unit 2011.

If a NO signal is received, an entry signal is automatically generated (S2009), control is returned to step S2001, and the same processes are repeatedly performed. That is, the operator selects "NO" after adding or deleting an article when there is excess or shortage of articles to be grouped, thereby allowing the management apparatus 2005 to perform a series of processes to generate an appropriate article list.

Electric power is supplied to the radio tag 2001 and a tag ID is received for a predetermined time after an entry signal is generated. These processes are not performed again unless an entry signal is generated. The management apparatus 2005 generates an article list by processing a tag ID received in one receiving operation and an article corresponding to the tag ID as a group.

As described above, according to the third embodiment of the present invention, when there are a plurality of radio tags 2001, the tag IDs of them is collectively received and easily grouped, and an article list can be generated. Practically, the list can be effectively applied in the following cases. For example, when a user travels for pleasure or on business, the user can collectively detect tag IDs from the radio tags of articles as belongings in the travel and generate an article list so that the user can collectively detect the tag IDs of the radio tags of the belongings and compare them with the tag IDs in the article list when the user is on his or her way back from the travel, thereby preventing any of the belongings to be left behind. Furthermore, a user can collectively detect tag IDs of the radio tags applied to articles to be stored in storage such as a refrigerator, and generate an article list so that the user can collectively detect tag IDs from radio tags applied to the articles in storage when going out for shopping or placing an order of articles, thereby generating an article list of deficient articles by comparing the tag IDs between the lists, and purchasing or ordering necessary articles based on the lists.

The process of entering article information such as merchandise names, etc. can be performed by entering the merchandise name or the image of an article with the tag ID corresponding to each article associated with each other using the entry of the attribute information explained above by referring to the first embodiment. Furthermore, using the grouping process explained above by referring to the second embodiment, a synthesized image indicating a plurality of articles to be grouped is generated, and the image can be entered in the DB 2008. If the image entered in the DB 2008 is added to the article list and displayed together (S2005), then the operator can easily and correctly determine whether or not the article list is correct.

[Fourth Embodiment]

In the fourth embodiment, an example of releasing a group explained above by referring to the third embodiment is explained. The configuration of the article management system in the fourth embodiment is similar to that explained by referring to the third embodiment, the same component is assigned the same reference numeral, and the detailed explanation is omitted here.

Figure 30:
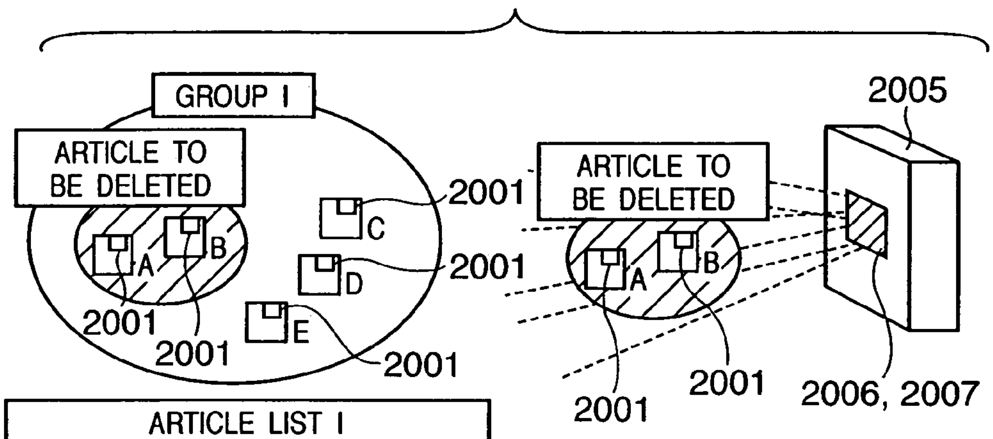
FIG. 30 is an explanatory view of the article management according to the fourth embodiment of the present invention.
Figure 30:
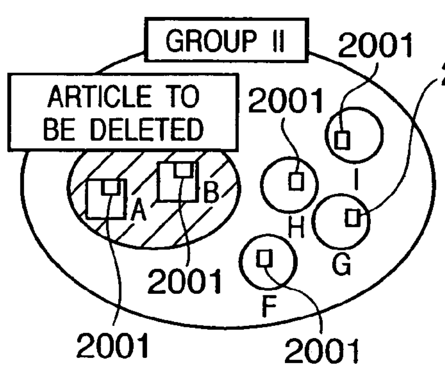

As shown in FIG. 30, assume that the articles A, B, C, D, and E are grouped as group 1, the articles A, B, F, G, H, and I are grouped as group II, and an article list is generated. These groups and the article list are generated in the processes explained by referring to the third embodiment. In the fourth embodiment, for example, the articles A and B are to be deleted from the article list.

Figure 31:
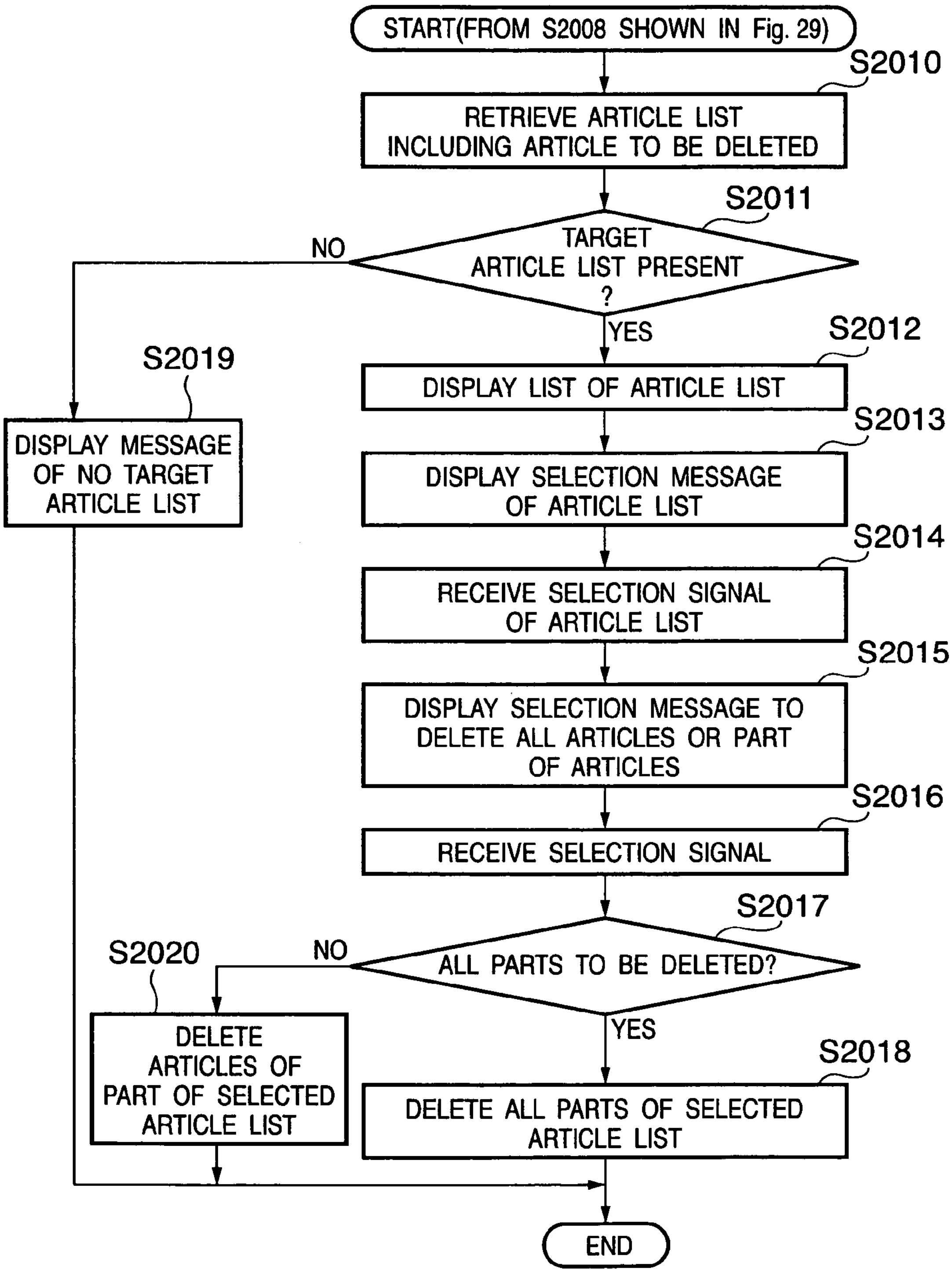
FIG. 31 is a flowchart for explanation of the operation of the article management system according to the fourth embodiment of the present invention.

FIG. 31 is a flowchart of the operation performed by the article management system according to the fourth embodiment of the present invention.

In the status in which the storage unit 2011 stores an article list including a tag ID with its corresponding group ID and article information associated with one another (step S2008 shown in FIG. 29), the CPU 2012 receives through the reception unit 2007 the tag IDs from the radio tags 2001 attached to the articles A and B to be deleted by the operator, and retrieves an article list including the articles A and B from the storage unit 2011 (S2010, S2011). When there are no article list including the articles A and B, the message indicating there is no target article list is displayed on the display unit 2009 (S2019).

When there is an article list including the articles A and B, for example, when a retrieval result indicates that the article lists I and II include the articles A and B, the CPU 2012 list the article lists I and II on the display unit 2009 (S2012). Furthermore, to allow the display unit 2009 to select a single or a plurality of article lists being listed, a message prompting to select one or them is displayed (S2013). For example, an article list I is selected by an operator, and the CPU 2012 receives a group selection signal for selection of the article list I from the operation unit 2010 (S2014).

Then, the CPU 2012 displays on the display unit 2009 a message prompting to select deleting all articles entered in the selected article list I, or deleting only the articles A and B in the article list I (S2015). After displaying the message, the CPU 2012 receives a delete selection signal from the operation unit 2010 operated by an operator, and determines a delete selection signal (S2016, S2017). When all articles entered in the article list I are deleted, all information about the articles entered in the article list I is deleted from the storage unit 2011 (S2018). When only the articles A and B are deleted from the article list I, only the information about the articles A and B entered in the article list I is deleted from the storage unit 2011 (S2020).

When an article list II is selected in step S2014, the operations similar to those described above are performed on the article list II.

As described above, in the fourth embodiment, a part of articles entered in an article list can be easily released, or all articles entered in an article list can be easily released. Practically, the embodiment can be effectively applied to the following cases. For example, when a person travels for pleasure or on business, he or she prepares an article list of belongings as described above by referring to the third embodiment, and when any article is lost at the destination of a trip or a business trip (for example, when consumable items are used up or provided for the destination of a business trip), the articles can be easily deleted from the article list. Thus, without an influence of lost articles, the person can perform the function of preventing a thing left behind explained above by referring to the third embodiment. In addition, when an article is taken out from a refrigerator and used, the tag ID of the radio tag of the article is detected, and the article can be deleted from the article list. Thus, the articles in the refrigerator, etc. can be easily managed.

[Fifth Embodiment]

The fifth embodiment shows an example of retrieving and integrating groups explained above by referring to the third embodiment. The configuration of the article management system according to the fifth embodiment is similar to as that explained by referring to the third embodiment, and the same component is assigned the same reference numeral, and the detailed explanation is omitted here.

Figure 32:
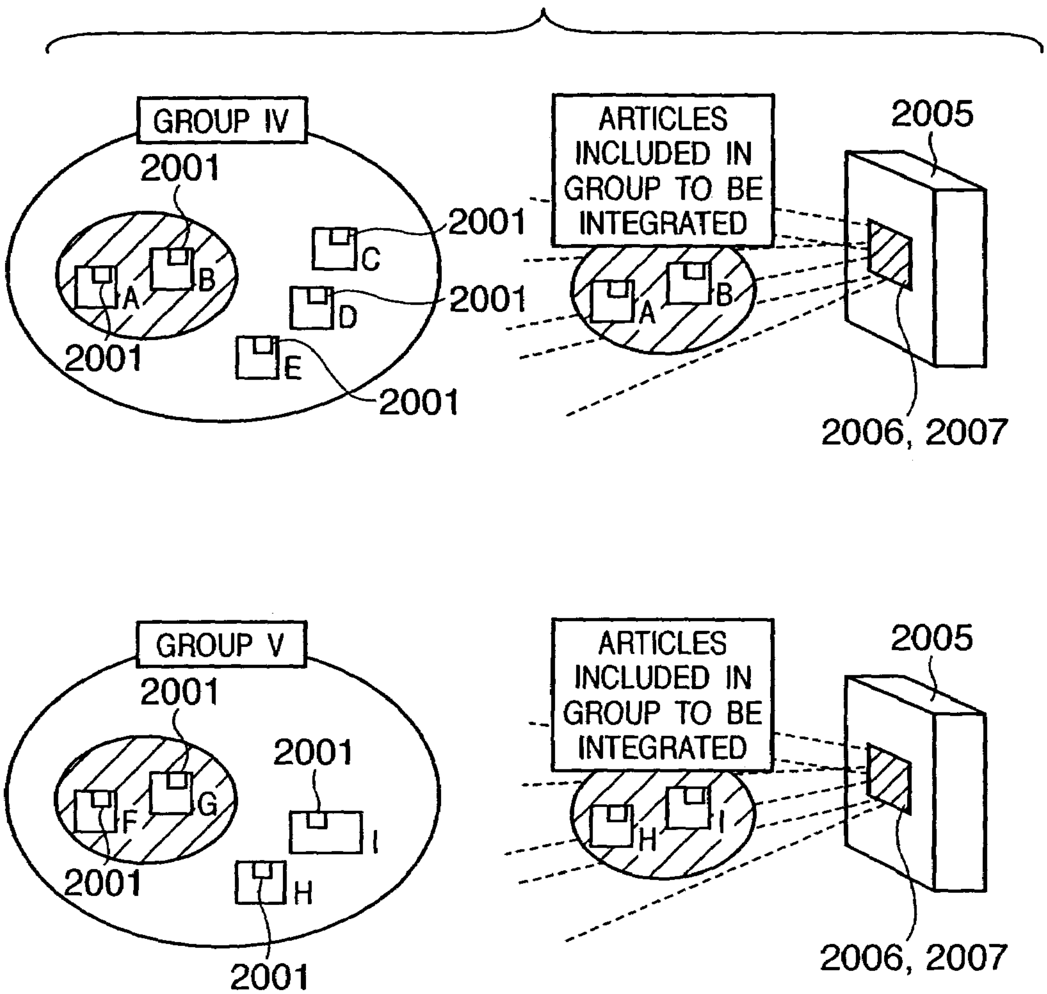
FIG. 32 is an explanatory view of the article management according to the fifth embodiment of the present invention.

As shown in FIG. 32, assume that the articles A, B, C, D, and E are grouped as a group IV, and the articles F, G, H, and I are grouped as a group V. The grouping operation is performed in the process described above by referring to the third embodiment. In the fifth embodiment, it is assumed that the groups IV and V are retrieved and integrated.

Figure 33:
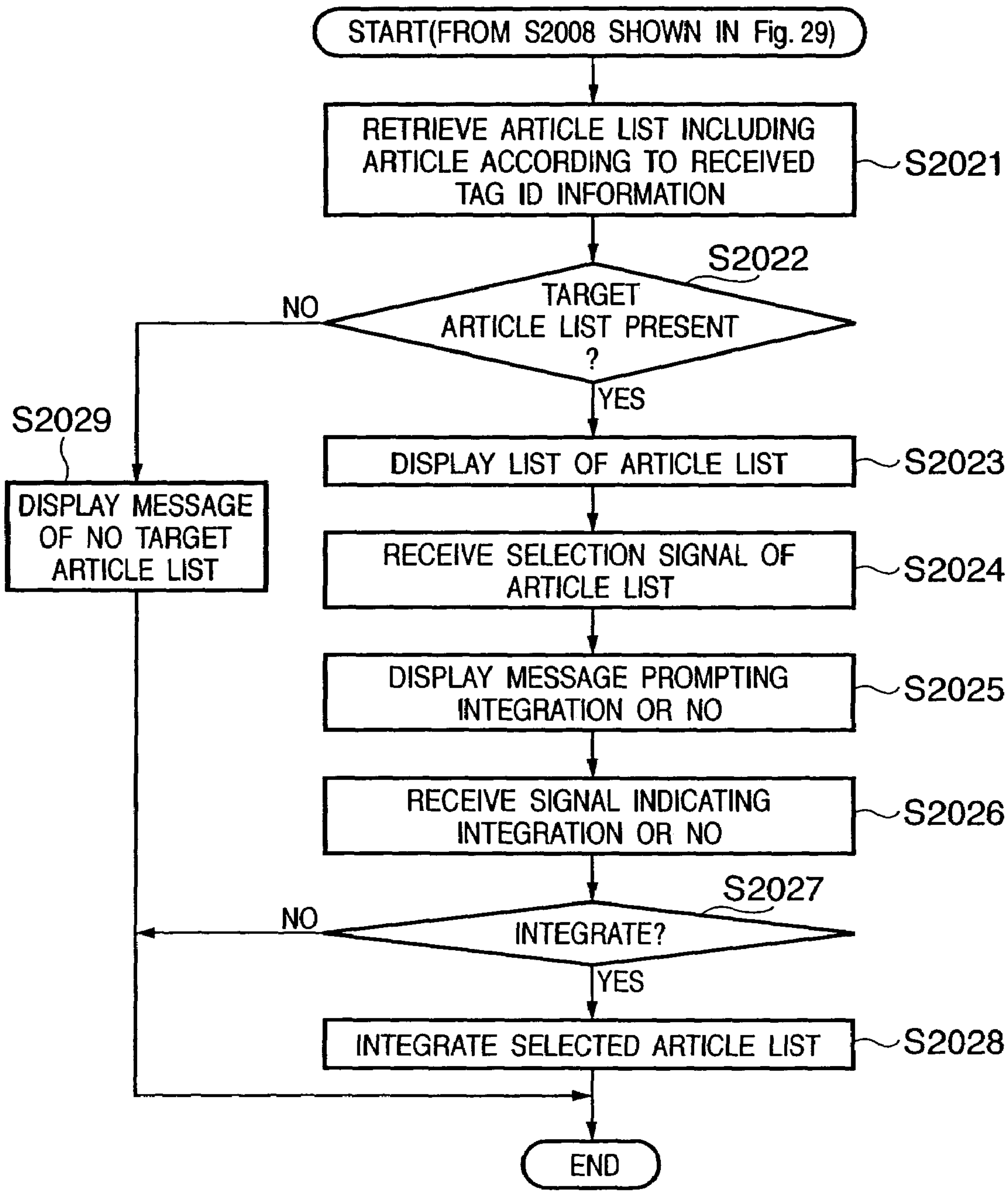
FIG. 33 is a flowchart for explanation of the operation of the article management system according to the fifth embodiment of the present invention.

FIG. 33 is a flowchart for explanation of the operation performed by the article management system according to the fifth embodiment of the present invention.

With the storage unit 2011 storing the article list containing a tag ID, the corresponding group information, and article information associated with one another (step S2008 shown in FIG. 29), the CPU 2012 receives through the reception unit 2007 the tag ID of the radio tag 2001 attached to the articles A and B contained in a group to be integrated, and the tag ID of the radio tag 2001 attached to the articles F and G contained in a group to be integrated at an integration signal from the operation unit 2010 as shown in FIG. 32, and retrieves an article list containing the articles A and B and the article list containing the articles F and G according to the received tag ID (S2021 and S2022). When any of the article list containing the articles A and B and the article list containing the articles F and G is missing, the message indicating the absence of a target article list is displayed on the display unit 2009 (S2029).

Figure 34:
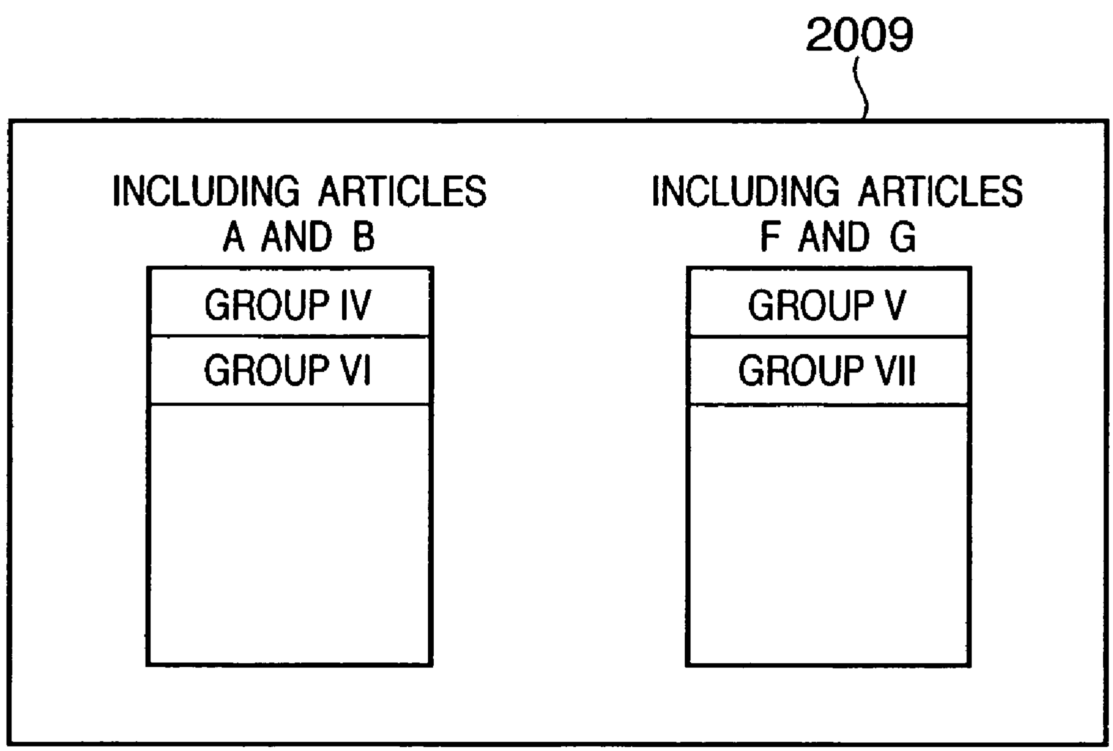
FIG. 34 shows an example of a display.

When there are the article list containing the articles A and B and the article list containing the articles F and G, and when, for example, the groups IV and VI contain the articles A and B and the groups V and VII contain the articles F and G as a retrieval result, the CPU 2012 displays the group names on the display unit 2009 as shown in FIG. 34 (S2023).

Then, the operator selects a group to be integrated, and the CPU 2012 receives a selection signal from the operation unit 2010, for example, a selection signal for selection of the group IV containing the articles A and B, and a selection signal for selection of the group V containing the articles F and G (S2024).

Then, the CPU 2012 displays on the display unit 2009 a message prompting to select whether or not the groups IV and V are to be integrated (S2025). After displaying the above-mentioned message, the CPU 2012 receives a signal from the operation unit 2010 operated by an operator, and determines the received signal (S2026, S2027). When a signal indicating integration is received, a new article group obtained by integrating the article lists of the groups IV and V (for example, a group VIII) is generated, and the storage unit 2011 is updated (S2028). When a signal indicating no integration is received, the integrating process is terminated.

Figure 35:
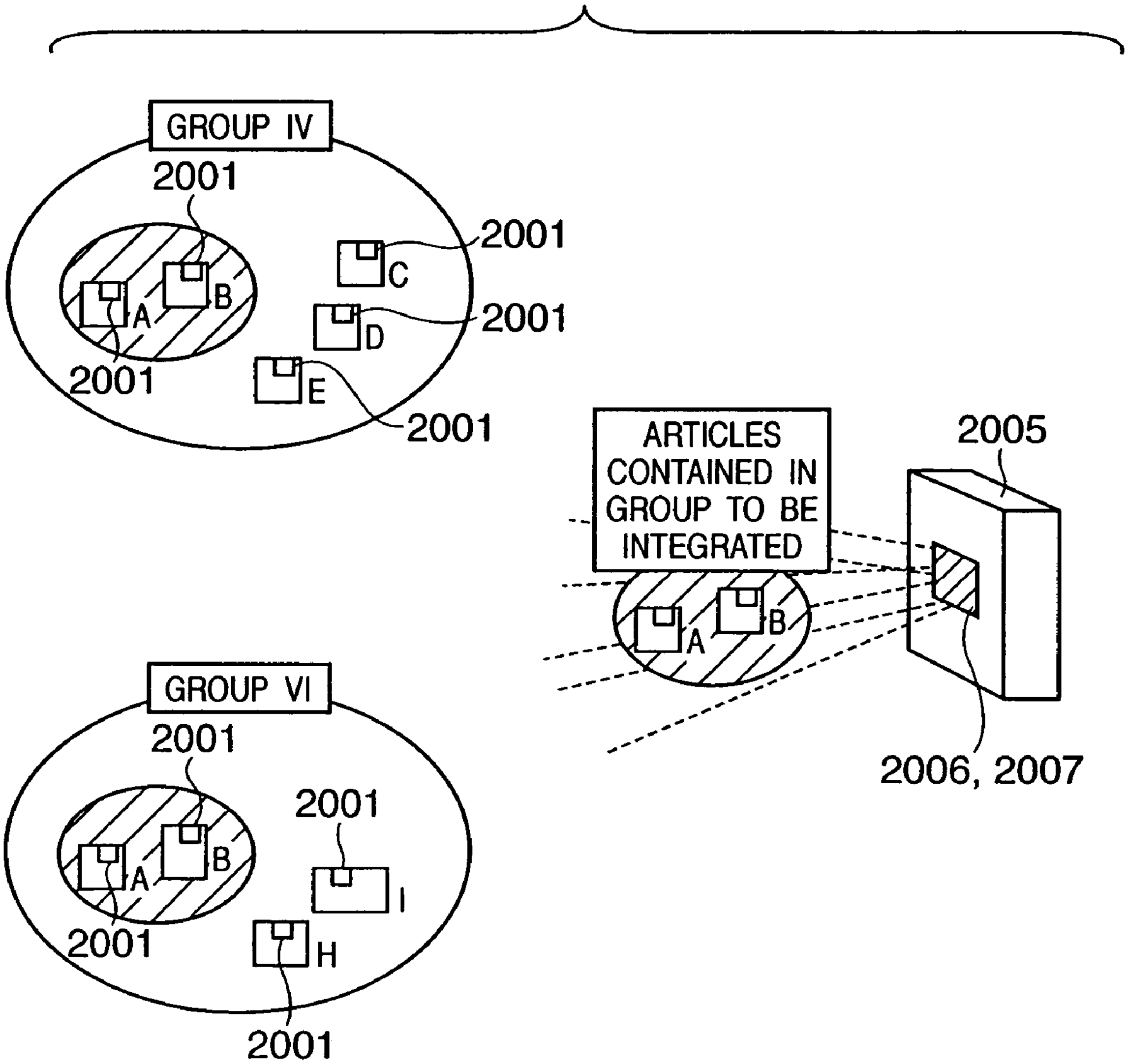
FIG. 35 is an explanatory view of the article management according to the fifth embodiment of the present invention.

Otherwise, assume that, as shown in FIG. 35, the articles A, B, C, D, and E are grouped as a group IV, and the articles A, B, H, and I are grouped as a group VI. Furthermore, assume that a tag ID of the radio tag 2001 attached to the articles A and B contained in the group to be integrated is received.

In this case, the CPU 2012 retrieves an article list containing the articles A and B based on the received tag ID (S2021, S2022). When there is no article list containing the articles A and B, or there is only one, the CPU 2012 displays on the display unit 2009 that there is no target article list (S2029).

Figure 36:
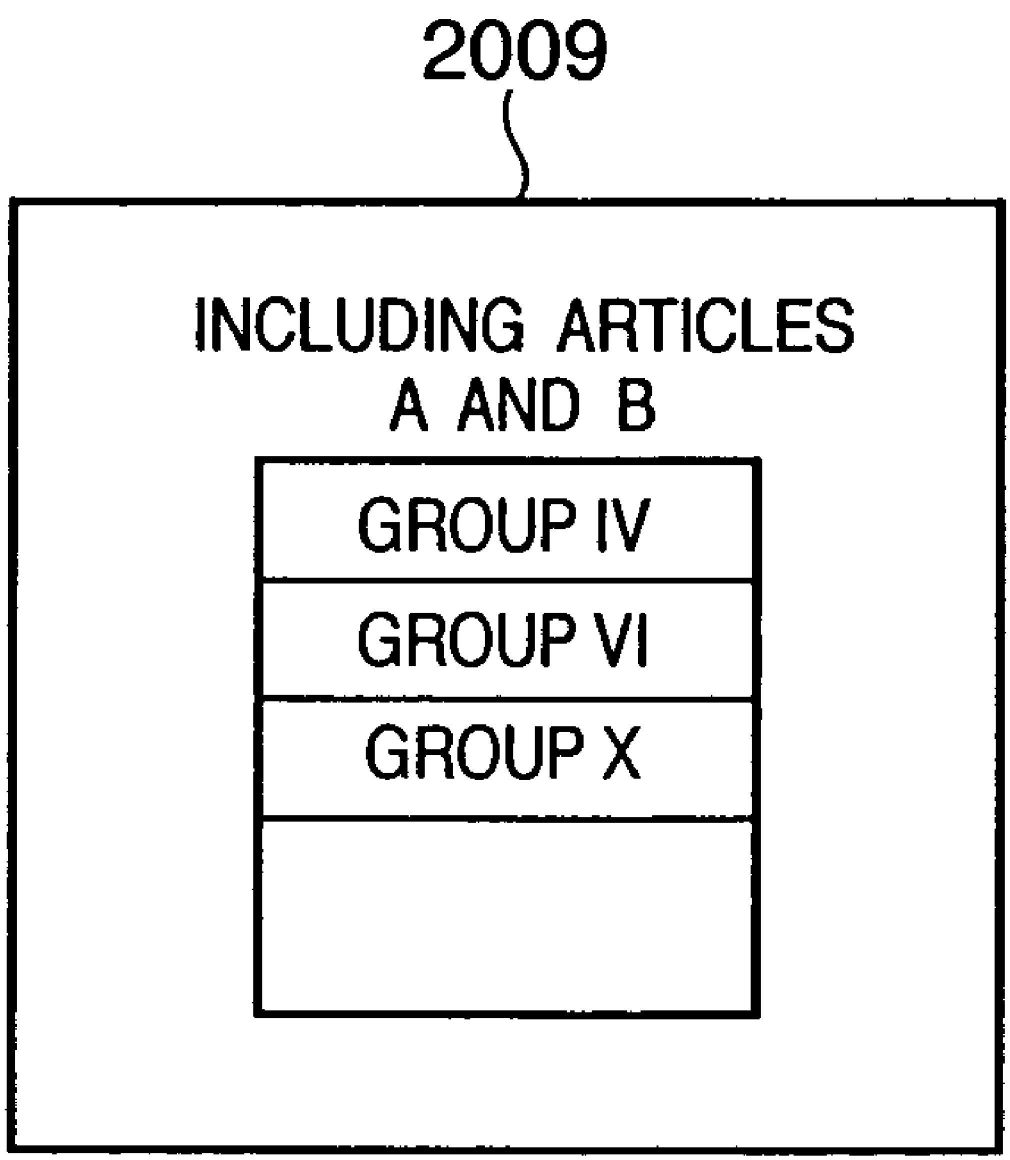
FIG. 36 shows an example of a display.

When there is an article list containing the articles A and B, for example, the groups IV, VI, and X contain the articles A and B, the CPU 2012 lists the group name on the display unit 2009 as shown in FIG. 36 (S2023).

Then, the group to be integrated is selected by the operator, and the CPU 2012 receives a selection signal, for example, a selection signal for selection of the groups IV and VI, from the operation unit 2010 (S2024).

Then, the CPU 2012 displays on the display unit 2009 a message prompting to select whether or not the groups IV and VI are to be integrated (S2025). After displaying the above-mentioned message, the CPU 2012 receives a signal from the operation unit 2010 operated by an operator, and determines the received signal (S2026, S2027). When a signal indicating integration is received, a new article group obtained by integrating the article lists of the groups IV and VI (for example, a group IX) is generated, and the storage unit 2011 is updated (S2028). When a signal indicating no integration is received, the integrating process is terminated.

As described above, in the fifth embodiment, article lists can be easily integrated (integration among groups). Practically, the integration can be effectively applied. For example, when a person travels for pleasure or on business, as described above by referring to the third embodiment, he or she prepares an article list of belongings. When he or she purchases articles or receives articles at a destination of a business trip, the purchased or received articles are entered as a group, and then integrated into the original article list, thereby centrally managing all articles including added articles. Furthermore, when purchased articles and received articles are stored in a refrigerator, etc., an article list of the articles to be added is integrated into the article list of the articles originally stored in the refrigerator, thereby centrally managing the articles in the refrigerator.

As described above by referring to the third to fifth embodiments, the article information stored in the DB 2008 can be grouped (generating an article list) based on the tag ID received from the radio tag attached to each article, and the editing process such as deleting an article from the article list (group) stored in the storage unit 2011, integrating article lists (groups), etc. can be easily performed.

Thus, since data is generated by receiving a tag ID from a radio tag, article information can be automatically entered, changed, and deleted by an easy operation such as pushing a button in the management apparatus 2005 and the tag ID detection terminal, etc. Furthermore, it is not necessary to provide a large keyboard having a number of keys or a small switch of poor operability for the management apparatus 2005. Additionally, programs for a large text inputting/editing process, various recognizing processes, an analyzing process, a format converting process, etc. are not required. Therefore, the requirements of work memory, etc. of the management apparatus 2005 can be reduced. Thus, the management apparatus 2005 can be successfully downsized, produced at a lower cost, and operated with low power consumption. In addition, since an operator of the management apparatus 2005 is not required to perform a key inputting operation or a laborious switching operation. Therefore, it is not necessary to read a large volume of manual or receive specific training because it is a simple article management system for every user.

[Sixth Embodiment]

The configuration of the article management system according to the sixth embodiment of the present invention is similar to that explained by referring to the third embodiment, and the same component is assigned the same reference numeral, and the detailed explanation is omitted here.

Figure 37:
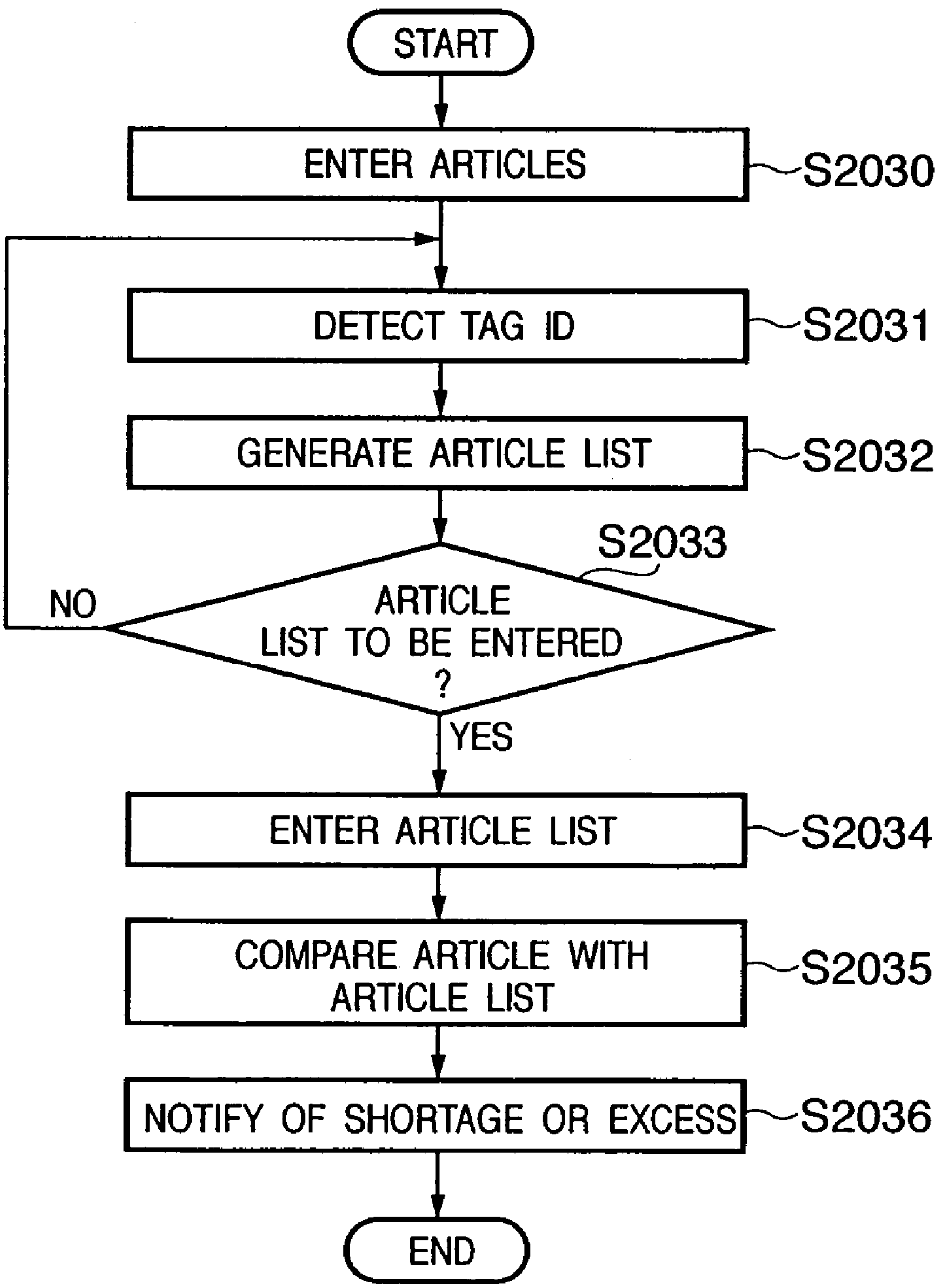
FIG. 37 is a flowchart for explanation of the article management according to the sixth embodiment of the present invention.

FIG. 37 is a flowchart for explanation of the process according to the sixth embodiment. In the sixth embodiment, a unique radio tag 2001 is attached to each article used in daily life, and the owner of an article enters the article, that is, generates the data of the DB 2007 (S2030).

For example, when an owner of an article goes out, the belongings to be carried with the owner are placed in a predetermined place, the management apparatus 2005 detects a tag ID from the radio tag 2001 attached to each article carried with the owner (S2031), and an article list is generated based on the detected tag ID (S2032).

The management apparatus 2005 displays an article list on the display unit 2009 a message prompting the owner to confirm the article list, and receives from the owner a signal as to whether or not an article list is to be generated (S2033). When a signal indicating that no article list is generated because, for example, the combination of articles is wrong, etc. is received, the management apparatus 2005 returns control to the process of detecting a tag ID in step S2031. When a signal that an article list is generated is received, the management apparatus 2005 stores an article list in the storage unit 2011 (S2034); When an article list is entered, the information indicating the attribute information about an article list, for example, the attribute information indicating "belongings when going out", "belongings of an outpatient when going to hospital" can be entered together so that a specific article list can be easily retrieved from the storage unit 2011 in which a plurality of article lists have been entered.

If an article is to be deleted from an article list, an article to be deleted is placed before the management apparatus 2005, etc., and deleted as in the method described above by referring to the fourth embodiment. When an article list is to be integrated, an article contained in the group to be integrated is placed before the management apparatus 2005, etc., and integrated as in the method described above by referring to the fifth embodiment.

When the owner goes out, the belongings are placed before the management apparatus 2005, etc., and a "belongings when going out" article list is selected through the operation unit 2010, and a check is specified (check signal is generated). The management apparatus 2005 compares the article list with the tag ID of a radio tag of the belongings (S2035), and the excess or shortage of the belongings are displayed on the display unit 2009 (S2036).

The attachment of the radio tag 2001 to an article is realized by an owner (person) of an article applying a radio tag to each article and by performing the method described by referring to the first embodiment, or by generating and managing data of the DB 2008 by inputting a tag ID and article information through a keyboard, etc. (in this case, an arbitrary database made by a person). Otherwise, a manufacturer or a seller of an article collectively applies the unique radio tag 2001 to all products and merchandise, and manages the tag ID and article information (in this case, a database contains united tag IDs).

Thus, articles can be grouped, group-released, and group-integrated in a simple operation. Therefore, a list of belongings for prevention of things left behind can be prepared within a short time, thereby efficiently preventing things left behind.

[Seventh Embodiment]

Described below is the article management according to the seventh embodiment. In the seventh embodiment, the component similar to that according to the first to third embodiments is assigned the same reference numeral, and the detailed explanation is omitted.

In the following explanation, a radio tag retrieval system for assigning a radio tag to an article, and checking the tag ID of the radio tag operated with a schedule and entered in advance is described. When a deficit is detected, the apparatus raises a warning tone or displays a list of deficient items.

[System Configuration]

Figure 38:
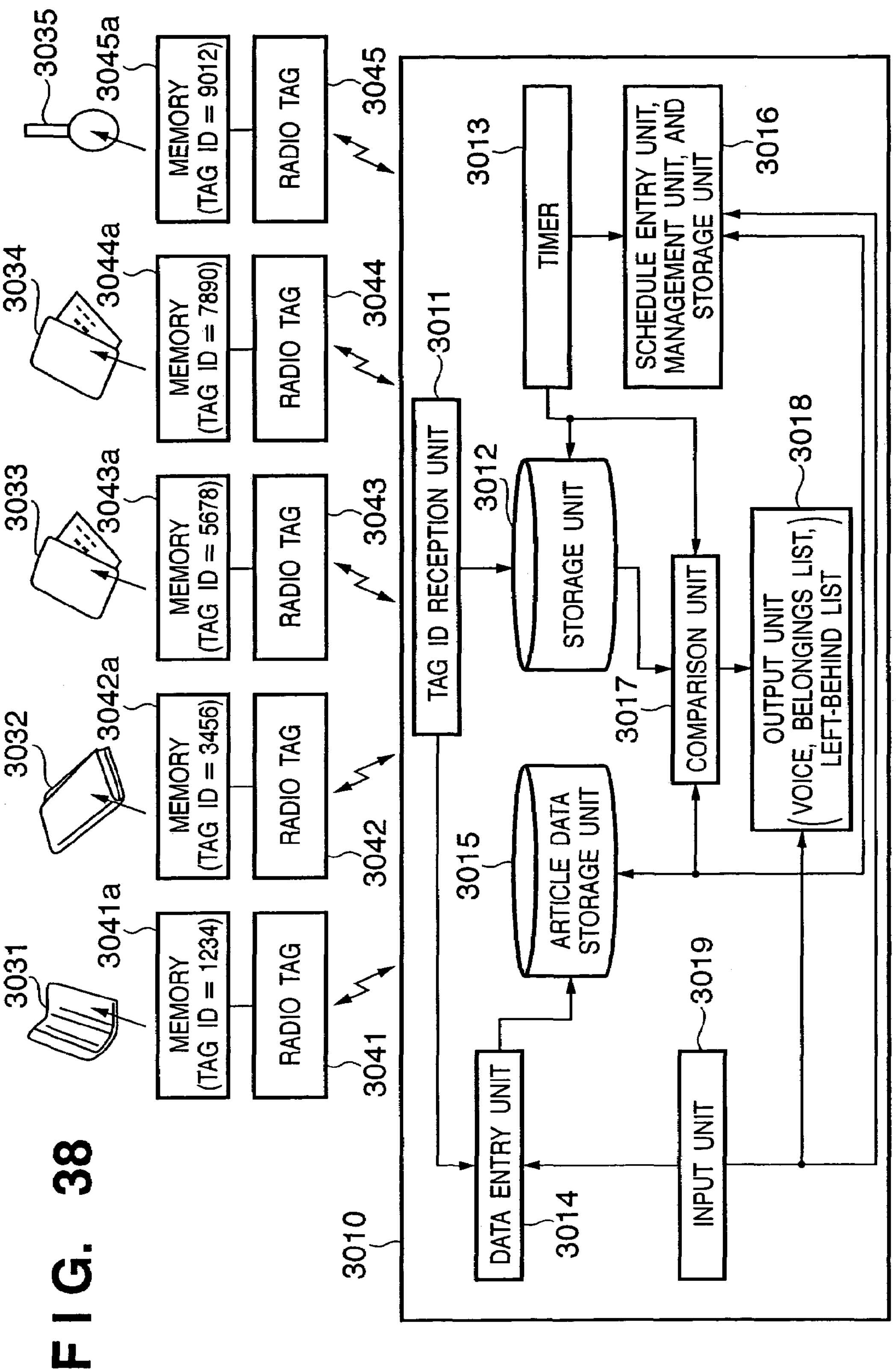
FIG. 38 shows the configuration of the radio tag retrieval system including the radio tag retrieval apparatus according to the seventh embodiment of the present invention.

FIG. 38 shows the configuration of the radio tag retrieval system including a radio tag retrieval apparatus 3010 according to the seventh embodiment.

Radio tags 3041 to 3045 are respectively applied to a wallet 3031, a notebook 3032, card cases 3033 and 3034, and a key 3035, and memory 3041*a* to 3045*a* store unique identification data (tag ID).

The radio tag retrieval 3010 comprises a tag ID reception unit 3011 for detecting a radio tag near the apparatus, and receiving a tag ID, a storage unit 3012 for storing the received tag ID, a timer 3013 for deleting storage information about the storage unit 3012 for each predetermined time (for example, 100 msec) according to time information, and providing the time information for a schedule management unit described later, a data entry unit 3014 for entering article data by associating a tag ID received by the reception unit 3011 with attribute information such as the name of an article, a class, etc., an article data storage unit 3015 for storing article data, a schedule storage unit 3016*a* for entering a schedule and necessary information in cooperation with the schedule, a schedule storage unit 3016*b* for storing each piece of information entered by the schedule entry unit 3016*a*, a schedule management unit 3016*c* for setting a flag indicating a target or a non-target of comparison in each piece of article data of the article data storage unit 3015 according to the schedule information stored in the schedule storage unit 3016*b* and the time information from the timer 3013, a comparison unit 3017 for reading a tag ID stored in the storage unit 3012 immediately before the storage information in the storage unit 3012 is cleared, and comparing by the algorithm described later the read tag ID with the article data stored in the article data storage unit 3015, and an output unit 3018 for displaying a comparison result, outputting voice, etc. for warning of the shortage if any shortage is detected, and displaying a list of articles whose radio tags are detected and a shortage list. If the deficit is replenished, and the articles are provided, then the warning is stopped. However, the warning is stopped by the input of the input section 3019, and a list of articles and a list of deficient items are not displayed.

[Operation of the Radio Tag Retrieval Apparatus]

Described below is the operation of the radio tag retrieval apparatus 3010 according to the seventh embodiment of the present invention.

FIG. 39 shows the configuration of the article data table recorded in the article data storage unit 3015. The operations from the inputting process to the entry process on the article data is explained below by referring to FIG. 39.

The user operates the input section 3019 to set the radio tag retrieval apparatus 3010 in the data entry mode, approaches the radio tag retrieval apparatus 3010 to the wallet 3031 to which the radio tag 3041 is applied, and has the apparatus read the tag ID. Then, the input section 3019 inputs the name of the article "wallet", and inputs the class of the wallet 3031. The data entry unit 3014 enters the article data including the received tag ID, the input name, and the class in the article data table. The input names of articles have to be unique, but the classes of articles can overlap. In the example shown in FIG. 39, the names of the card cases 3033 and 3034 are respectively a "card case A" and "card case B". That is, they have the same classes of "card".

The status shown in FIG. 39 is not directly input by the user, but the status is "OFF" immediately after article data is input. In the OFF status, a target of a comparison process in a comparison unit 3017 cannot be assumed. This status is switch-controlled by the schedule management unit 3016*c* among "ON", "class ON", "OFF", and "user stop". The "detection status" can be "present" when a corresponding tag ID is received, "absent" when it is not received, and "detection unnecessary" when it is not necessary to detect an article.

FIG. 40 shows the configuration of a schedule table recorded in the schedule storage unit 3016*b*. The operations from the inputting process to the entry process on the schedule table are described below by referring to FIG. 40.

The user operates the input section 3019 to put the radio tag retrieval apparatus 3010 in the schedule entry mode and input the starting time and date of a schedule. On the scheduled date, in addition to an absolute value (for example, Jan. 25, 2004), the day of week, the specified date, for example, the tenth day of every month, can be specified. Then, the contents of the schedule and the articles necessary for the schedule can be selected to input them in the "necessary articles" item. In the selection, the schedule entry unit 3016*a* reads the information entered in the "name" item of the article data table, and lists the information on the output unit 3018 for selection by the user. Furthermore, if there are a plurality of articles in the same classes, and an article belonging to the class is required, the user selects the class and inputs it in the "necessary class" item. In the selection, the schedule entry unit 3016*a* reads the information entered in the "class" item in the article data storage unit 3015 and lists it on the output unit 3018 for selection by the user. Thus, by referring to the recorded schedule table, the schedule management unit 3016*c* switch-controls among "ON", "classification ON", "OFF", and "user stop" of the "status" item of the article data table recorded in the article data storage unit 3015 every minute. The status "ON" indicates a corresponding article as a comparison target when a time entered in the schedule is reached. The status "class ON" indicates a corresponding class as a comparison target when a time entered in the schedule is reached. If there is any one article contained in the class, it is determined that there is a corresponding class. The status "user stop" indicates an article of a process target not to be warned of although it is in the schedule active status described later in the user operation. The status "OFF" does not indicate a corresponding article as a comparison target although a time entered in the schedule is reached.

Figure 41:
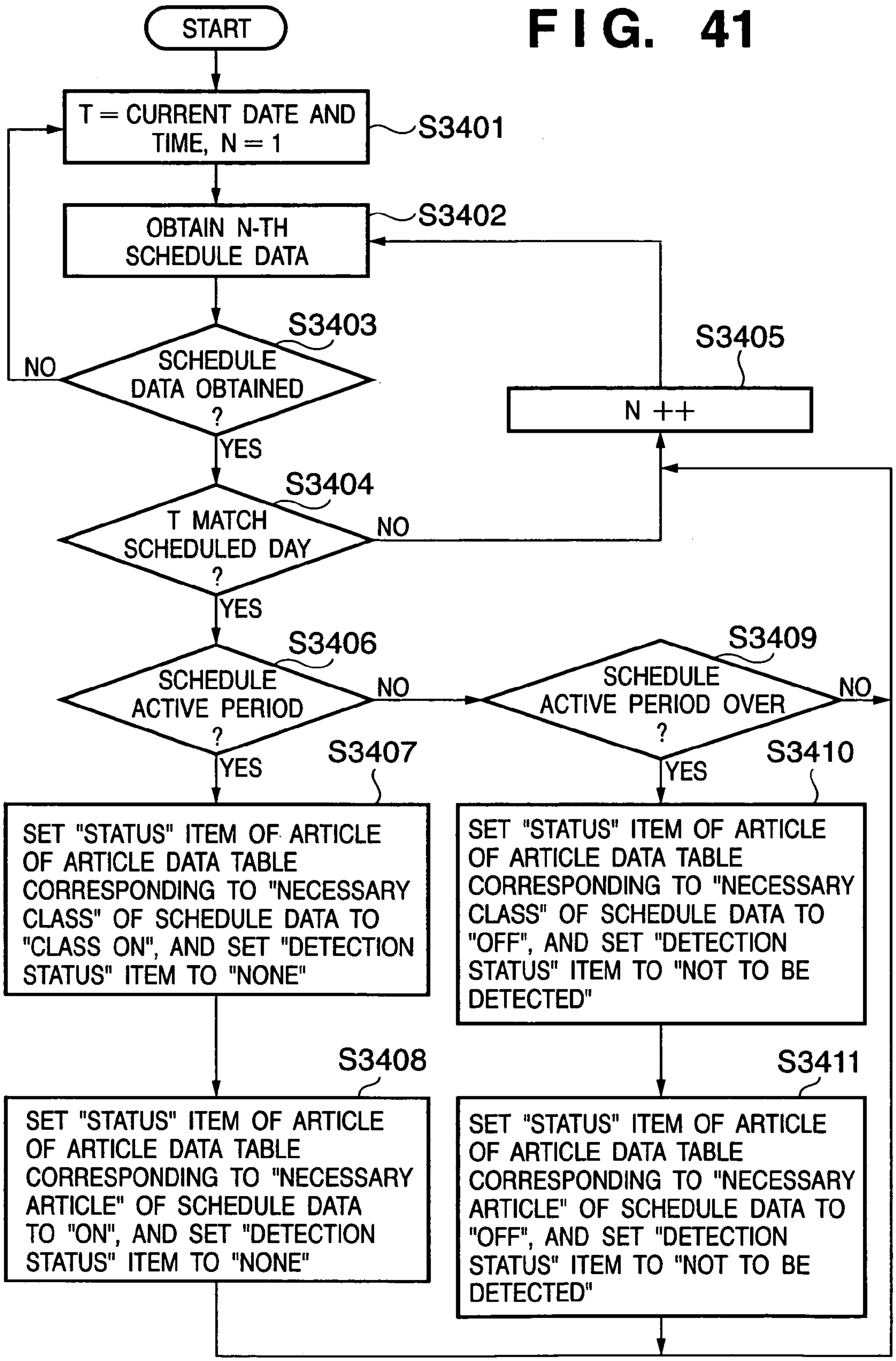
FIG. 41 is a flowchart showing the algorithm of the process performed by the schedule management unit of the radio tag retrieval apparatus according to the seventh embodiment of the present invention.

FIG. 41 is a flowchart of the algorithm of the process to be performed, for example, every minute by the schedule management unit 3016*c* of the radio tag retrieval apparatus 3010 according to the seventh embodiment of the present invention.

First, the current time is set to T, and the number N is set to I (S3401). Then, the schedule data entered as the N-th record is obtained from the schedule storage unit 3016*b* (S3402). Unless the schedule data is entered as the N-th record, then control is returned to step S3401 (S3403).

If the schedule data is entered as the N-th record, it is determined whether or not the scheduled day indicated by schedule data matches the current date (S3404). If they do not match, N is incremented (S3405), and then control is returned to step S3402.

If they match each other, it is checked whether or not the current time is, for example, within 10 minutes (schedule active period) from the schedule starting time indicated by the schedule data (S3406). When it is the schedule active period, all classes entered in the "necessary class" item in the N-th schedule data are read, and the "status" item of the articles corresponding to the classes is set as "class ON", and the "detection status" item is set as "absent" (S3407). In the case of the schedule data in line 1 (N=1) shown in FIG. 40, "card" is entered in the "necessary class" item. Therefore, the "status" item of the article in lines 3 and 4 of the article data table shown in FIG. 39 is set as "class ON".

Then, all articles entered in the "necessary article" item in the N-th schedule data are read, and the "status" item of the articles corresponding to the articles is set as "ON", and the "detection status" item is set as "absent" (S3408). Then, control is passed to step S3405.

FIG. 42 is an article data table updated for a schedule active period. As described later, since the article whose "status" item in the article data table is "ON" or "class ON" is a comparison target, a list of the articles compared and detected by the comparison unit 3017 and a list of and deficient items are displayed. When a list of deficient items is displayed, a warning is also issued. When deficient items are replenished and necessary articles are supplied, the warning is stopped. However, when the user performs a confirming operation, the warning can be stopped although necessary articles are not supplied, thereby putting the list of data file in the non-display status. At this time, in the method described later, the "status" item of article data of "ON" or "class ON" is defined as "user stop". As described above, it is necessary that a warning is stopped when, for example, 10 minutes pass (termination of schedule active period) after the scheduled time, and the list is put in the non-display status.

In FIG. 41, when the schedule active period terminates, control is passed to step S409, and all classes entered in the "necessary class" item in the N-th schedule data are read, and the "status" item of the articles corresponding to the classes is set as "OFF", and the "detection status" item is set as "detection unnecessary" (S3410).

Then, all articles entered in the "necessary article" item in the N-th schedule data are read, and the "status" item of the articles corresponding to the articles is set as "OFF", and the "detection status" item is set as "detection unnecessary" (S3411). Then, control is passed to step S3405. Thus, an article as a comparison target is specified in a predetermined period after a predetermined schedule starting time.

Figure 43:
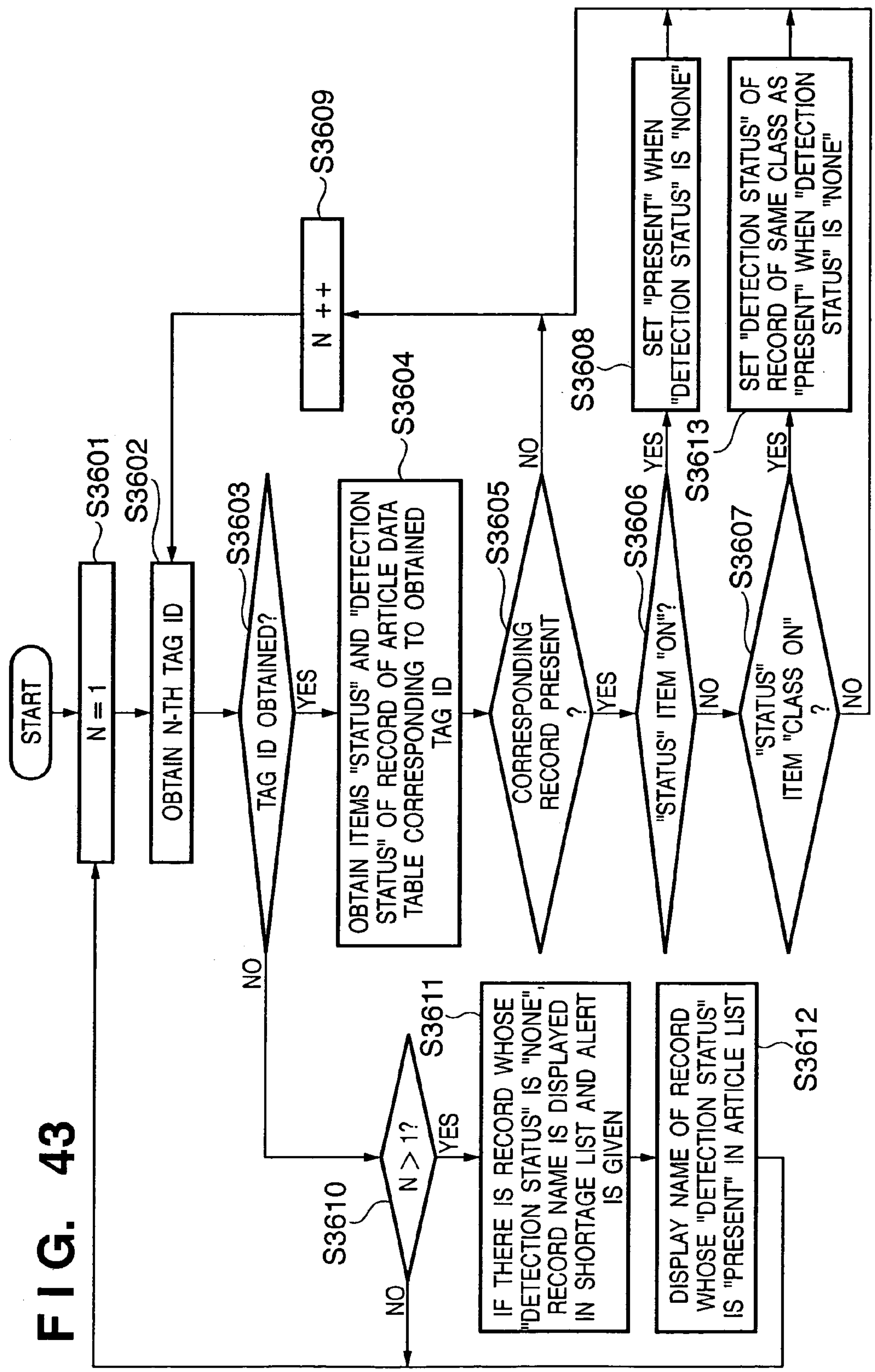
FIG. 43 is a flowchart showing the algorithm of the comparing unit performed at each predetermined timing.

FIG. 43 is a flowchart of the algorithm of the comparison unit 3017 performed at every predetermined timing (for example, every 100 msec.).

First, N=1 is set (S3601), and a tag ID stored as the N-th data in the storage unit 3012 is obtained (S3602). The storage unit 3012 assigns a sequential number from 1 in the detection order to all tag IDs detected at hand, and the tag ID is obtained by the comparison unit 3017, thereby deleting the tag ID. Although a tag ID is deleted, it can be recorded again in the storage unit 3012 if it detected again. If the N-th record is present (S3603), control is passed to step S3604. If there is no record, control is passed to step S3610.

Then, the "status" and "detection status" items of the article (record) corresponding to the obtained tag ID are obtained from the article data table (S3604). Then, by the determination in step S3605, control is passed to step S3606 if there is a record. If there is no record, then N is incremented in step S3609, and control is returned to step S3602.

If the obtained "status" item is "ON" (S3606) and the obtained "detection status" is "absent", then the "detection status" of the record is changed into "present" (S3608). Furthermore, if the obtained "status" item is "class ON" (S3607), and the "detection status" item is "absent", then the "detection status" item of a record of the same class as the corresponding record is changed into "present" (S3613). Then, N is incremented (S3609), and control is returned to step S3602.

If one or more tag IDs (N>1) are detected in the storage unit 3012 in step S3610 after performing the above-mentioned processes on all identified radio tag data stored in the storage unit 3012, then a record whose "detection status" item is "absent" is retrieved from the article data table, the names of the records are displayed on the output unit 3018 as a list of deficient items, and a warning is issued (S3611). Then, a record whose "detection status" item is "present" is retrieved from the article data table, and the names of the records are displayed on the output unit 3018 as a list of articles (S3612). Then, control is returned to step S3601.

The display of a warning, a list of deficient items, and a list of articles continues until a user confirming operation is performed using the input section 3019 or the schedule active time has passed. The user confirming operation is performed by pressing a confirmation switch of the input section 3019. When the schedule management unit 3016*c* obtains the confirmation signal, the "status" item of all records in the article data table is changed into "user stop", and the "detection status" item is changed into "detection unnecessary", thereby stopping the comparison unit 3017 from performing the next comparing operation, thereby stopping displaying a warning and a list.

As described above, a user can immediately determine when a schedule is started whether or not any deficient items (things left behind) are detected by entering in the radio tag retrieval apparatus 3010 the tag ID and the name of an article to which a radio tag is attached in advance. Thus, things left behind can be reduced when, for example, the user goes out to his office.

[Eighth Embodiment]

The eighth embodiment is described below. In the seventh embodiment, a predetermined necessary article is automatically compared at a predetermined date and time. In the eighth embodiment, a user inputs a code number corresponding to the radio tag retrieval apparatus 3010 by manual input for comparison with the article entered corresponding to the code number. Therefore, in the eighth embodiment, the schedule table shown in FIG. 40 is replaced with a table (FIG. 44) in which a "necessary article" item and a "necessary class" item are associated with code numbers. Other configurations and operations are similar to those according to the seventh embodiment.

Practically, the radio tag retrieval apparatus 3010 comprises a table in which a comparison number (code number) is associated with a class which can contain one or more articles, and an article belonging to a class corresponding to a code number is compared with the user's belongings by appropriately inputting the code number by the user. Thus, a user can confirm whether or not the article of the class corresponding to the code number specified by the user is completely owned by the user.

As described above, according to the seventh and eighth embodiments, for example, it can be easily determined using a radio system whether or not the combination of articles of a user is appropriate. Therefore, for example, things left behind can be reduced, and necessary article set can be quickly confirmed.

<Other Embodiment>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore, to apprise the public of the scope of the present invention, the following claims are made.

What is claimed is:

1. A managing apparatus for managing articles, comprising:

an image input device, arranged to capture an image of an article to which a radio tag is attached;

a receiver, arranged to receive an ID of a radio tag attached to an article in a range of vision of said image input device;

a managing section, arranged to associate an image captured by said image input device with the ID of the radio tag received by said receiver, and manage the image and the ID as a managed image and a managed ID; and an editor, arranged to add attribute information to at least the managed image and the managed ID using the managed image, and edit the attribute information.

2. The apparatus according to claim 1, further comprising:

a selector, arranged to select one piece of the attribute information; and a notifying section, arranged to allow said receiver to receive an ID of a radio tag, and notifies a user of a result of comparison between the received ID and the managed ID to which the selected attribute information is added.

3. The apparatus according to claim 2, wherein said notifying section gives a notification by displaying an image associated with a detection failure ID with the managed ID not contained in the received ID defined as the detection failure ID.

4. The apparatus according to claim 1, further comprising:

a display, arranged to display the managed image and an user interface; and a synthesizer, arranged to generate a synthesized image obtained by combining a plurality of images selected from an image displayed on said display in a synthesizing method specified by the user interface, wherein said managing section manages the synthesized images, the configuration images, and the managed IDs corresponding to the configuration images as a group respectively.

5. The apparatus according to claim 4, wherein said managing section releases group management for synthesized images selected from the image displayed on said display when the release of the group management is specified through the user interface.

6. A computer program storing a computer readable medium comprising a computer program code, for a method of managing articles, the method comprising the steps of:

capturing an image of an article to which a radio tag is attached;

receiving an ID of a radio tag attached to an article of the predetermined range of vision;

managing the captured image associated with the received ID of the radio tag;

editing the attribute information added to an article using an image associated with an ID of a radio tag by said managing section;

selecting one piece of the attribute information; and allowing said receiver to receive an ID of a radio tag, and notifying a user of a result of comparison between the received ID and the managed ID to which the selected attribute information is added.

7. A managing apparatus for managing articles, comprising:

a receiver, arranged to receive an ID of a radio tag attached to an article;

a database, arranged to store an ID of a radio tag and an image of an article associated with each other; and a managing section, arranged to refer to an ID of a radio tag received in one receiving operation, and the database, and generate an article list of entered information about an article associated with the received ID.

8. The apparatus according to claim 7, wherein when instructed to edit the article list, said managing section retrieves an article list containing an ID of a radio tag received by said receiver, and edits the article list based on a retrieval result.

9. The apparatus according to claim 7, wherein said managing section retrieves an article list containing an ID of a radio tag received by said receiver when release of an article is specified from the article list, and deletes the received ID and a corresponding article information from the specified article list in the retrieved article lists.

10. The apparatus according to claim 7, wherein said managing section retrieves an article list containing an ID of a radio tag received by said receiver when release of an article is specified from the article list, and deletes all IDs and article information from the specified article list in the retrieved article lists.

11. The apparatus according to claim 7, wherein said managing section retrieves an article list including an ID of a radio tag received by said receiver when integration of the article list is specified, and integrates a specified article list in the retrieved article lists.

12. The apparatus according to claim 7, wherein said managing section compares an ID of a radio tag received in one receiving operation by said receiver with an ID entered in the article list when a comparison is specified, and reports a comparison result.

13. A managing apparatus for managing articles, comprising:

a receiver, arranged to receive an ID of radio tag attached to an article at predetermined time intervals, and store a received ID in memory;

an input section, arranged to input article information and a schedule;

a register, arranged to store in article data storage unit article data associating an ID of a radio tag received by said receiver with article data associated with article information input from said input section;

a scheduler, arranged to associate a schedule input from said input section with article information and store the schedule and the information in a schedule storage unit, and activate article data in said article data storage unit corresponding to an article associated with the schedule in an active period of a schedule stored in the schedule storage unit; and a comparator, arranged to check the ID of a radio tag of the article data in the article data storage unit with the received ID stored in the memory and output the check result.

14. The apparatus according to claim 13, wherein class information about an article can be input by said input section, and said scheduler activates article data of the article data storage unit for class information associated with the schedule in the activated period when the schedule is associated with the class information.

15. The apparatus according to claim 14, wherein when a piece of article data activated by the class information is matching data, said comparator assumes that another piece of article data activated by the class information is also matching data.

16. A managing method of managing articles, comprising the steps of:

receiving an ID of a radio tag attached to an article at a predetermined time intervals, and storing a received ID in memory;

inputting article information and a schedule;

storing in an article data storage unit article data containing a received ID of a radio tag and associated input article information;

storing in a schedule storage unit with an input schedule associated with article information;

activating article data of said article data storage unit for an article associated with the schedule in an active period of a schedule stored in said schedule storage unit; and comparing an ID of a radio tag of active article data of said data storage unit with a received ID stored in the memory, and outputting a comparison result.

17. A computer program product storing a computer readable medium comprising a computer program code, for a method of managing articles, the method comprising the steps of:

receiving an ID of a radio tag attached to an article at a predetermined time intervals, and storing a received ID in memory;

inputting article information and a schedule;

storing in an article data storage unit article data containing a received ID of a radio tag and associated input article information;

storing in a schedule storage unit with an input schedule associated with article information;

activating article data of said article data storage unit for an article associated with the schedule in an active period of a schedule stored in said schedule storage unit; and comparing an ID of a radio tag of active article data of said data storage unit with a received ID stored in the memory, and outputting a comparison result.

* * * * *